(12) United States Patent
Liao et al.

(10) Patent No.: US 12,189,095 B2
(45) Date of Patent: *Jan. 7, 2025

(54) IMAGE CAPTURING LENS ASSEMBLY, IMAGE CAPTURING DEVICE AND ELECTRONIC DEVICE

(71) Applicant: LARGAN PRECISION CO., LTD., Taichung (TW)

(72) Inventors: Lin-Yao Liao, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/428,158

(22) Filed: Jan. 31, 2024

(65) Prior Publication Data

US 2024/0176108 A1   May 30, 2024

Related U.S. Application Data

(63) Continuation of application No. 17/735,179, filed on May 3, 2022, now Pat. No. 11,921,262, which is a
(Continued)

(30) Foreign Application Priority Data

Feb. 17, 2015   (TW) ................. 104105632

(51) Int. Cl.
*G02B 3/02*   (2006.01)
*G02B 5/20*   (2006.01)
(Continued)

(52) U.S. Cl.
CPC ......... *G02B 13/0045* (2013.01); *G02B 5/208* (2013.01); *G02B 9/60* (2013.01); *G02B 27/0025* (2013.01); *H04M 1/0264* (2013.01)

(58) Field of Classification Search
CPC .......... G02B 13/18; G02B 9/60; G02B 13/00; G02B 9/34; G02B 13/02; G02B 21/02
(Continued)

(56) References Cited

U.S. PATENT DOCUMENTS

| 2,298,993 A | 10/1942 | Warmisham |
| 2,587,347 A | 2/1952 | Lowenthal |

(Continued)

FOREIGN PATENT DOCUMENTS

| CN | 203324564 U | 12/2013 |
| CN | 105467563 A | 4/2016 |

(Continued)

*Primary Examiner* — Dawayne Pinkney
(74) *Attorney, Agent, or Firm* — McClure, Qualey & Rodack, LLP

(57) ABSTRACT

An image capturing lens assembly includes, in order from an object side to an image side, a first lens element, a second lens element, a third lens element, a fourth lens element and a fifth lens element. The first lens element with positive refractive power has a convex object-side surface. The second lens element has refractive power. The third lens element has refractive power, and an object-side surface and an image-side surface thereof being aspheric. The fourth lens element has negative refractive power, and an object-side surface and an image-side surface thereof are aspheric. The fifth lens element with negative refractive power has a concave object-side surface, and the object-side surface and an image-side surface thereof are aspheric.

29 Claims, 30 Drawing Sheets

Related U.S. Application Data continuation of application No. 16/837,297, filed on Apr. 1, 2020, now Pat. No. 11,353,688, which is a continuation of application No. 16/430,563, filed on Jun. 4, 2019, now Pat. No. 10,642,004, which is a continuation of application No. 15/403,352, filed on Jan. 11, 2017, now Pat. No. 10,353,177, which is a continuation of application No. 14/727,185, filed on Jun. 1, 2015, now Pat. No. 9,581,789.

(51) Int. Cl.

| | | |
|---|---|---|
| G02B 9/34 | (2006.01) | |
| G02B 9/60 | (2006.01) | |
| G02B 9/62 | (2006.01) | |
| G02B 13/00 | (2006.01) | |
| G02B 13/02 | (2006.01) | |
| G02B 21/02 | (2006.01) | |
| G02B 27/00 | (2006.01) | |
| H04M 1/02 | (2006.01) | |

(58) Field of Classification Search
USPC ....... 359/714, 763, 764, 756, 757, 773, 746, 359/753, 659
See application file for complete search history.

(56) References Cited

U.S. PATENT DOCUMENTS

| | | |
|---|---|---|
| 2,600,208 A | 6/1952 | Henry et al. |
| 2,637,245 A | 5/1953 | Ludewig |
| 2,660,095 A | 11/1953 | Henry et al. |
| 2,694,959 A | 11/1954 | Baker et al. |
| 2,910,914 A | 11/1959 | Rudolf et al. |
| 3,128,329 A | 4/1964 | Muller |
| 3,388,956 A | 6/1968 | Eggert |
| 3,790,254 A | 2/1974 | Rybicki et al. |
| 4,173,396 A | 11/1979 | Yokota |
| 4,264,136 A | 4/1981 | Ogino |
| 4,266,848 A | 5/1981 | Schlegel |
| 4,699,476 A | 10/1987 | Clarke |
| 4,733,953 A | 3/1988 | Yamamoto et al. |
| 4,757,354 A | 7/1988 | Sato |
| 4,770,513 A | 9/1988 | Fujie et al. |
| 4,787,721 A | 11/1988 | Fukushima |
| 4,810,075 A | 3/1989 | Fukuda |
| 4,838,670 A | 6/1989 | Ueda et al. |
| 4,929,068 A | 5/1990 | Tsuji |
| 4,933,599 A | 6/1990 | Fukuda |
| 4,993,817 A | 2/1991 | Hoogland |
| 4,999,007 A | 3/1991 | Aoki et al. |
| 5,026,149 A | 6/1991 | Braat |
| 5,134,522 A | 7/1992 | Ueda |
| 5,386,312 A | 1/1995 | Spencer |
| 5,663,837 A | 9/1997 | Ohtake et al. |
| 5,663,838 A | 9/1997 | Hasushita et al. |
| 5,796,518 A | 8/1998 | Kato |
| 5,805,348 A | 9/1998 | Estelle et al. |
| 5,889,620 A | 3/1999 | Furuta |
| 7,301,578 B2 | 11/2007 | Ohzawa et al. |
| 7,911,711 B1 | 3/2011 | Tang et al. |
| 8,559,118 B2 | 10/2013 | Engelhardt et al. |
| 8,599,498 B2 | 12/2013 | Huang |
| 8,605,368 B2 | 12/2013 | Tsai et al. |
| 8,724,238 B2 | 5/2014 | Tsai |
| 9,052,491 B2 | 6/2015 | Tang et al. |
| 9,201,215 B2 | 12/2015 | Hsu et al. |
| 9,239,514 B2 | 1/2016 | Baba |
| 9,291,801 B2 | 3/2016 | Kubota et al. |
| 9,310,590 B1 | 4/2016 | Liao |
| 10,120,164 B2 | 11/2018 | Dai et al. |
| 10,228,536 B2 | 3/2019 | Shigemitsu |
| 10,330,888 B2 | 6/2019 | Baba |
| 2002/0135831 A1 | 9/2002 | Park |
| 2004/0257671 A1 | 12/2004 | Kim |
| 2010/0188555 A1 | 7/2010 | Hirao |
| 2010/0214467 A1 | 8/2010 | Ohtsu |
| 2010/0321794 A1 | 12/2010 | Hirao |
| 2011/0001865 A1 | 1/2011 | Hirao |
| 2012/0194920 A1 | 8/2012 | Huang |
| 2014/0049839 A1 | 2/2014 | Shinohara |
| 2014/0204480 A1 | 7/2014 | Jo et al. |
| 2014/0313597 A1 | 10/2014 | Shinohara |
| 2015/0029601 A1 | 1/2015 | Dror et al. |
| 2015/0085380 A1 | 3/2015 | Choi et al. |
| 2015/0098010 A1 | 4/2015 | Hsu et al. |
| 2015/0116569 A1 | 4/2015 | Mercado |
| 2015/0146306 A1 | 5/2015 | Yonezawa et al. |
| 2015/0168687 A1 | 6/2015 | Kondo et al. |
| 2015/0253647 A1 | 9/2015 | Mercado |
| 2016/0004034 A1 | 1/2016 | Nishihata et al. |
| 2016/0085056 A1 | 3/2016 | Dror et al. |
| 2016/0085059 A1 | 3/2016 | Mercado |
| 2016/0195694 A1 | 7/2016 | Tang et al. |
| 2016/0195697 A1 | 7/2016 | Tang et al. |
| 2016/0202454 A1 | 7/2016 | Chang |
| 2016/0291293 A1 | 10/2016 | Dror et al. |
| 2017/0146777 A1 | 5/2017 | Dror et al. |
| 2017/0353645 A1 | 12/2017 | Shabtay et al. |

FOREIGN PATENT DOCUMENTS

| | | |
|---|---|---|
| JP | S5346729 A | 4/1978 |
| JP | S54622 A | 1/1979 |
| JP | S6023814 A | 2/1985 |
| JP | 61-090117 A | 5/1986 |
| JP | 6363012 A | 3/1988 |
| JP | H01154114 A | 6/1989 |
| JP | H01179007 A | 7/1989 |
| JP | H02167516 A | 6/1990 |
| JP | H04-298709 A | 10/1992 |
| JP | H06130298 A | 5/1994 |
| JP | H06175045 A | 6/1994 |
| JP | H07253540 A | 10/1995 |
| JP | H07318798 A | 12/1995 |
| JP | H0876014 A | 3/1996 |
| JP | H0876192 A | 3/1996 |
| JP | H0943508 A | 2/1997 |
| JP | H11-133315 A | 5/1999 |
| JP | 2001-166207 A | 6/2001 |
| JP | 2001174698 A | 6/2001 |
| JP | 2006030290 A | 2/2006 |
| JP | 2006113087 A | 4/2006 |
| JP | 2010145648 A | 7/2010 |
| JP | 2010-256608 A | 11/2010 |
| JP | 2012203274 A | 10/2012 |
| JP | 2013-145399 A | 7/2013 |
| JP | 2013156457 A | 8/2013 |
| JP | 2013-254210 A | 12/2013 |
| JP | 2014-123034 A | 7/2014 |
| JP | 2015-038538 A | 2/2015 |
| KR | 1020130056698 A | 5/2013 |
| WO | 2012147841 A1 | 11/2012 |
| WO | 2015/001440 A1 | 1/2015 |
| WO | 2015151697 A1 | 10/2015 |
| WO | 2016-110883 A1 | 7/2016 |
| WO | 2016197604 A1 | 12/2016 |

IMAGE CAPTURING LENS ASSEMBLY, IMAGE CAPTURING DEVICE AND ELECTRONIC DEVICE

RELATED APPLICATIONS

This application is a continuation of U.S. application Ser. No. 17/735,179, filed on May 3, 2022, which is a continuation of U.S. application Ser. No. 16/837,297, filed on Apr. 1, 2020, U.S. Pat. No. 11,353,688 issued on Jun. 7, 2022, which is a continuation of U.S. application Ser. No. 16/430,563, filed on Jun. 4, 2019, U.S. Pat. No. 10,642,004 issued on May 5, 2020, which is a continuation of U.S. application Ser. No. 15/403,352, filed on Jan. 11, 2017, U.S. Pat. No. 10,353,177 issued on Jul. 16, 2019, which is a continuation of U.S. application Ser. No. 14/727,185, filed on Jun. 1, 2015, U.S. Pat. No. 9,581,789 issued on Feb. 28, 2017, which claims priority to Taiwan Application Serial Number 104105632, filed Feb. 17, 2015, all of which are herein incorporated by reference.

BACKGROUND

Technical Field

The present disclosure relates to an image capturing lens assembly and an image capturing device. More particularly, the present disclosure relates to a compact image capturing lens assembly and image capturing device applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure or a five-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Taking a telephoto optical system with five-element lens structure for example, the telephoto optical system usually adopts glass lens elements with spherical surfaces. However, the volume of the telephoto optical system is excessively large, and the price thereof is too high that deters consumers from purchasing the telephoto optical system. Thus, the conventional optical systems cannot satisfy the convenient and multi-functional requirements of photography demanded by the consumers.

SUMMARY

According to one aspect of the present disclosure, an image capturing lens assembly includes, in order from an object side to an image side, a first lens element, a second lens element, a third lens element, a fourth lens element and a fifth lens element. The first lens element with positive refractive power has a convex object-side surface. The second lens element has refractive power. The third lens element has refractive power, wherein an object-side surface and an image-side surface of the third lens element are aspheric. The fourth lens element has negative refractive power, wherein an object-side surface and an image-side surface of the fourth lens element are aspheric. The fifth lens element with negative refractive power has a concave object-side surface, wherein the object-side surface and an image-side surface of the fifth lens element are aspheric. The image capturing lens assembly has a total of five lens elements with refractive power. When a focal length of the image capturing lens assembly is f, a focal length of the first lens element is f1, a focal length of the fourth lens element is f4, a curvature radius of the object-side surface of the first lens element is R1, a curvature radius of an image-side surface of the first lens element is R2, and a central thickness of the first lens element is CT1, the following relationships are satisfied:

$3.4 < (f/R1) - (f/R2) + ((f \times CT1)/(R1 \times R2)) < 7.5$;

$-1.0 < f1/f4 < 0$; and $3.4 < f/R1$.

According to another aspect of the present disclosure, an image capturing device includes the image capturing lens assembly according to the aforementioned aspect and an image sensor, wherein the image sensor is disposed on an image surface of the image capturing lens assembly.

According to further another aspect of the present disclosure, an image capturing device includes the image capturing lens assembly according to the aforementioned aspect, a prism and an image sensor. The prism is disposed at an optical path between an object and an image surface of the image capturing lens assembly, and the image sensor is disposed on the image surface of the image capturing lens assembly.

According to yet another aspect of the present disclosure, an electronic device includes the image capturing device according to the aforementioned aspect.

According to still another aspect of the present disclosure, an image capturing lens assembly includes, in order from an object side to an image side, a first lens element, a second lens element, a third lens element, a fourth lens element and a fifth lens element. The first lens element with positive refractive power has a convex object-side surface. The second lens element has refractive power. The third lens element has refractive power, wherein an object-side surface and an image-side surface of the third lens element are aspheric. The fourth lens element with negative refractive power has a concave image-side surface, wherein an object-side surface and the image-side surface of the fourth lens element are aspheric. The fifth lens element has negative refractive power, wherein an object-side surface and an image-side surface of the fifth lens element are aspheric. The image capturing lens assembly has a total of five lens elements with refractive power. When a focal length of the image capturing lens assembly is f, a focal length of the first lens element is f1, a focal length of the fourth lens element is f4, a curvature radius of the object-side surface of the first lens element is R1, a curvature radius of an image-side surface of the first lens element is R2, and a central thickness of the first lens element is CT1, the following relationships are satisfied:

$3.4<(f/R1)-(f/R2)+((f\times CT1)/(R1\times R2))<7.5$;
$-1.0<f1/f4<0$; and
$3.4<f/R1$.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
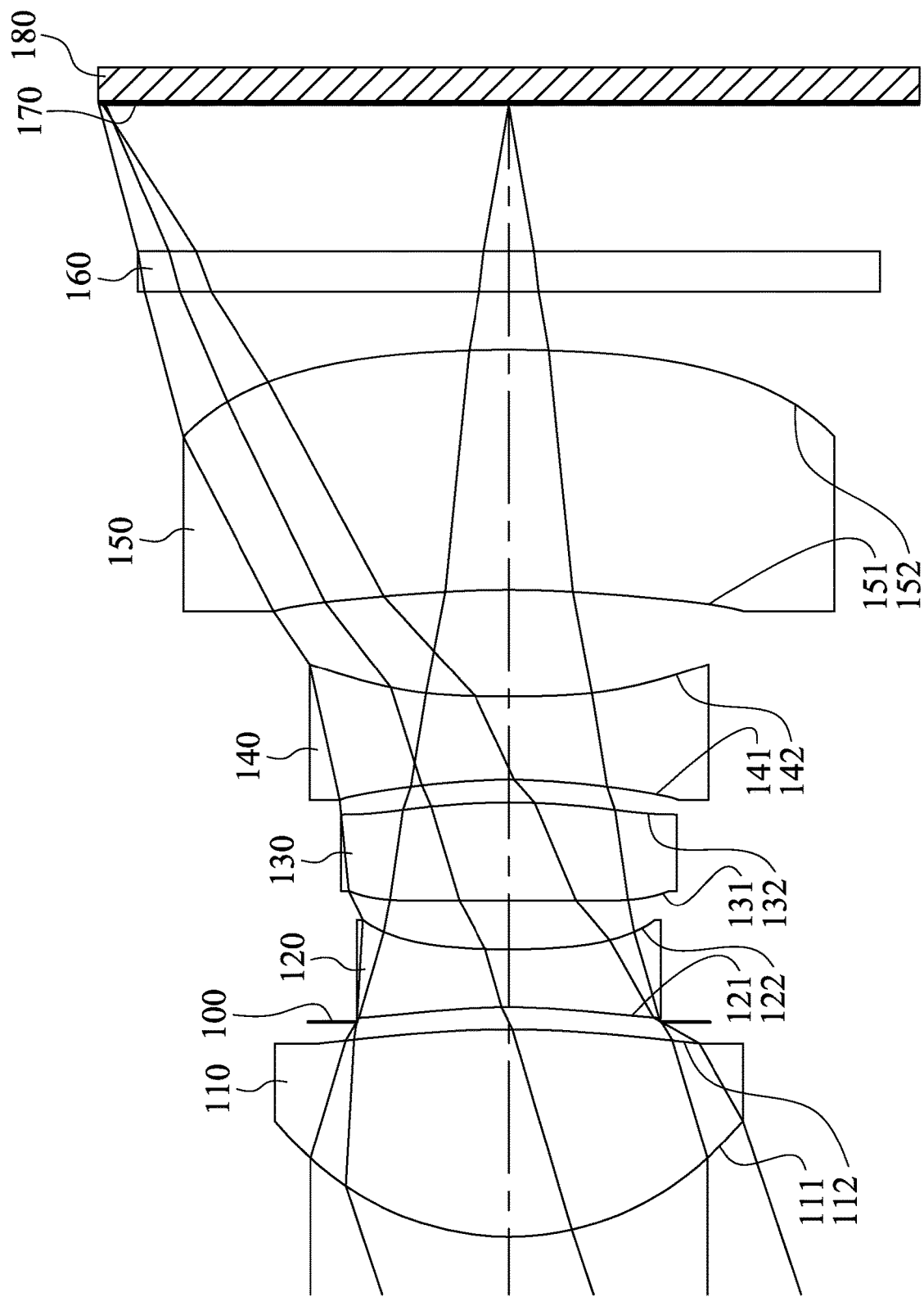
FIG. 1 is a schematic view of an image capturing device according to the 1st embodiment of the present disclosure.

An image capturing lens assembly includes, in order from an object side to an image side, a first lens element, a second lens element, a third lens element, a fourth lens element and a fifth lens element. The image capturing lens assembly has a total of five lens elements with refractive power.

There is an air space between any two lens elements of the first lens element, the second lens element, the third lens element, the fourth lens element and the fifth lens element adjacent to each other. That is, each of the first through fifth lens elements is a single and non-cemented lens element, any two lens elements adjacent to each other are not cemented, and there is a space between the two lens elements. In other words, of the first lens element, the second lens element, the third lens element, the fourth lens element and the fifth lens element of the image capturing lens assembly, there is a space in a paraxial region between any two lens elements that are adjacent to each other. Moreover, the manufacturing process of the cemented lenses is more complex than the non-cemented lenses. In particular, a second surface of one lens element and a first surface of the following lens element need to have accurate curvature to ensure these two lens elements will be highly cemented. However, during the cementing process, those two lens elements might not be highly cemented due to displacement and it is thereby not favorable for the image quality of the image capturing lens assembly. Therefore, according to the image capturing lens assembly of the present disclosure, an air space in a paraxial region between any two of the first lens element, the second lens element, the third lens element, the fourth lens element and the fifth lens element that are adjacent to each other improves the problem generated by the cemented lens elements.

The first lens element with positive refractive power has a convex object-side surface, and can have a convex image-side surface. Therefore, the light converging ability of the image capturing lens assembly can be concentrated at the object side, which is favorable for controlling the size of the image capturing lens assembly for enhancing portability.

The second lens element can have negative refractive power. Therefore, the aberration of the image capturing lens assembly can be corrected so as to improve the image quality.

The third lens element can have positive refractive power and a convex image-side surface. Therefore, the distribution of the positive refractive power of the image capturing lens assembly can be balanced so as to reduce the sensitivity of refractive power distribution thereof.

The fourth lens element with negative refractive power can have a concave object-side surface and a concave image-side surface. Therefore, the principal point of the image capturing lens assembly can be positioned away from the image side so as to effectively control the back focal length, and the compact size can be maintained. Furthermore, the aberration of the image capturing lens assembly can be effectively corrected so as to improve the image quality.

The fifth lens element with negative refractive power can have a concave object-side surface and a convex image-side surface. Therefore, the principal point of the image capturing lens assembly can be positioned away from the image side so as to effectively control the back focal length, and the compact size can be maintained. Furthermore, the astigmatism of the image capturing lens assembly can be effectively corrected so as to improve the image quality.

When a focal length of the image capturing lens assembly is f, a curvature radius of the object-side surface of the first lens element is R1, a curvature radius of the image-side surface of the first lens element is R2, and a central thickness of the first lens element is CT1, the following relationship is satisfied: $3.4<(f/R1)-(f/R2)+((f \times CT1)/(R1 \times R2))<7.5$. Therefore, the relationship between the entire image capturing lens assembly and the surface shape and thickness of the first lens element can be balanced, and a preferable effect can be provided by the first lens element. Thus, the photographing range can be controlled so as to obtain a satisfying image quality of the long-shot. Preferably, the following relationship can be satisfied: $3.7<(f/R1)-(f/R2)+((f \times CT1)/(R1 \times R2))<6.0$.

When a focal length of the first lens element is f1, and a focal length of the fourth lens element is f4, the following relationship is satisfied: $-1.0<f1/f4<0$. Therefore, the degree of light deflection at the object side of the image capturing lens assembly can be enhanced, which enhances the magnification of the image capturing lens assembly within a limited space, and more light rays are received in the same image range.

When the focal length of the image capturing lens assembly is f, and the curvature radius of the object-side surface of the first lens element is R1, the following relationship is satisfied: $3.4<f/R1$. Therefore, the photographing range can be effectively controlled, so that the image quality of a portion of the image is featured with a higher resolution.

The image capturing lens assembly can further include a stop, such as an aperture stop. The stop is disposed between the first lens element and the third lens element. When an axial distance between the stop and the image-side surface of the fifth lens element is SD, and an axial distance between the object-side surface of the first lens element and the image-side surface of the fifth lens element is TD, the following relationship can be satisfied: $0.65<SD/TD<1.0$. Therefore, the telecentricity and the wide-angle character of the image capturing lens assembly can be balanced. Preferably, the following relationship can be satisfied: $0.65<SD/TD<0.87$.

When a curvature radius of the image-side surface of the fourth lens element is R8, and a curvature radius of the object-side surface of the fifth lens element is R9, the following relationship can be satisfied: $-0.1<(R8+R9)/(R8-R9)$. Therefore, the air space between the fourth lens element and the fifth lens element can be controlled so as to control the degree of light deflection between the fourth lens element and the fifth lens element, and the light converging ability at the paraxial field and the off-axis field can be balanced.

When the curvature radius of the object-side surface of the first lens element is R1, and the curvature radius of the image-side surface of the first lens element is R2, the following relationship can be satisfied: $-1.5<(R1+R2)/(R1-R2)<0$. Therefore, the generation of the aberration and the astigmatism can be reduced, and the photographing range can be controlled so as to obtain a satisfying image quality of the long-shot.

When a refractive index of the first lens element is N1, a refractive index of the second lens element is N2, a refractive index of the third lens element is N3, a refractive index of the fourth lens element is N4, a refractive index of the fifth lens element is N5, and a maximum of N1, N2, N3, N4 and N5 is Nmax, the following relationship can be satisfied: $1.50<Nmax<1.70$. Therefore, the configuration of the refractive index is proper for reducing the chromatic aberration, and the image quality can be enhanced.

At least one lens element of the first lens element, the second lens element, the third lens element, the fourth lens element and the fifth lens element can have positive refractive power, and an Abbe number of the lens element with positive refractive power is less than 30. Therefore, the distribution of the positive refractive power of the image capturing lens assembly can be balanced, so that the sensitivity of refractive power distribution can be reduced, and the chromatic aberration can be corrected.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, T45 can be greater than T12, T23 and T34. Therefore, the space in the image capturing lens assembly is sufficient for controlling optical paths of the light rays entering into the image capturing lens assembly, and the image height can be increased.

When the focal length of the image capturing lens assembly is f, and a maximum image height of the image capturing lens assembly is ImgH, the following relationship can be satisfied: $2.3<f/ImgH<6.0$. Therefore, the size of the image capturing lens assembly can be effectively controlled so as to maintain the compact size, and the portability can be enhanced.

When an entrance pupil diameter of the image capturing lens assembly is EPD, and the maximum image height of the image capturing lens assembly is ImgH, the following relationship can be satisfied: $0.7<EPD/ImgH<2.0$. Therefore, the light rays entering into the image capturing lens assembly can be increased so as to obtain a higher resolving power.

At least one of the first lens element, the second lens element, the third lens element, the fourth lens element and the fifth lens element can have at least one inflection point, so that the aberration of the off-axis field can be corrected, and the image quality at the periphery of the image can be improved.

When the focal length of the image capturing lens assembly is f, and an axial distance between the object-side surface of the first lens element and an image surface is TL, the following relationship can be satisfied: $0.75<TL/f<1.0$. Therefore, the space allocation for the lens elements of the image capturing lens assembly can be effectively controlled, and the long-shot ability can be enhanced.

When the axial distance between the object-side surface of the first lens element and the image surface is TL, the following relationship can be satisfied: $TL<7.5$ mm. Therefore, the compact size of the image capturing lens assembly can be maintained.

The refractive power of the first lens element is stronger than the refractive power of the second lens element, the third lens element, the fourth lens element and the fifth lens element. (The result is obtained from comparing the absolute values of the refractive power of the first lens element, the second lens element, the third lens element, the fourth lens element and the fifth lens element. When the refractive power is stronger, the absolute value of the refractive power is larger. Similarly, when the refractive power is weaker, the absolute value of the refractive power is smaller.) Therefore, the light converging ability of the first lens element can be enhanced, and the total track length of the image capturing lens assembly can be reduced.

When the focal length of the fourth lens element is f4, and a focal length of the fifth lens element is f5, the following relationship can be satisfied: $0<f4/f5$. Therefore, the principal point of the image capturing lens assembly can be positioned away from the image side so as to effectively control the back focal length, and the compact size can be maintained.

When the axial distance between the third lens element and the fourth lens element is T34, and the axial distance between the fourth lens element and the fifth lens element is T45, the following relationship can be satisfied: $T34/T45<1.2$. Therefore, the third lens element and the fourth lens element can be disposed more tightly for mutually eliminating the aberration while maintaining a sufficient space between the fourth lens element and the fifth lens element.

When the axial distance between the object-side surface of the first lens element and the image surface is TL, and the maximum image height of the image capturing lens assembly is ImgH, the following relationship can be satisfied: $2.0<TL/ImgH<3.5$. Therefore, the total track length of the image capturing lens assembly can be reduced, and the compact size thereof can be maintained.

When an Abbe number of the fourth lens element is V4, and an Abbe number of the fifth lens element is V5, the following relationship can be satisfied: $90<V4+V5<130$. Therefore, the chromatic aberration of the image capturing lens assembly can be corrected.

When a half of a maximal field of view of the image capturing lens assembly is HFOV, the following relationship can be satisfied: $0.3<\tan(2\times HFOV)<1.1$. Therefore, the field of view and the imaging range are proper, and the stray light rays can be reduced.

When a composite focal length of the first lens element and the second lens element is f12, and a composite focal length of the fourth lens element and the fifth lens element is f45, the following relationship can be satisfied: $-2.0<f12/f45<0$. Therefore, it is favorable for forming a telephoto optical system having positive refractive near the object side and negative refractive near the image side, and a long-shot scene can be clearly imaged on the image surface.

According to the image capturing lens assembly of the present disclosure, the lens elements thereof can be made of glass or plastic material. When the lens elements are made of plastic material, the manufacturing cost can be effectively reduced. When the lens elements are made of glass material, the distribution of the refractive powers of the image capturing lens assembly may be more flexible to design. Furthermore, surfaces of each lens element can be arranged to be aspheric (ASP), since the aspheric surface of the lens element is easy to form a shape other than spherical surface so as to have more controllable variables for eliminating the aberration thereof, and to further decrease the required number of the lens elements. Therefore, the total track length of the image capturing lens assembly can also be reduced.

According to the image capturing lens assembly of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, if not stated otherwise, when the lens element has a convex surface, it indicates that the surface is convex in the paraxial region thereof; when the lens element has a concave surface, it indicates that the surface is concave in the paraxial region thereof. According to the image capturing lens assembly of the present disclosure, the positive refractive power or the negative refractive power of a lens element or the focal length of the lens element, that is, refers to the refractive power or the focal length in the paraxial region of the lens element.

According to the image capturing lens assembly of the present disclosure, the image surface of the image capturing lens assembly, based on the corresponding image sensor, can be flat or curved. In particular, the image surface can be a curved surface being concave facing towards the object side.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, an aperture stop can be configured as a front stop or a middle stop. The front stop disposed between an imaged object and the first lens element can provide a longer distance between an exit pupil of the image capturing lens assembly and the image surface and thereby improves the image-sensing efficiency of an image sensor. A middle stop disposed between the first lens element and the image surface is favorable for enlarging the field of view of the image capturing lens assembly and thereby provides a wider field of view for the same.

According to the image capturing lens assembly of the present disclosure, the image capturing lens assembly can be optionally applied to moving focus optical systems, and is featured with good ability for correcting aberration and high image quality. The image capturing lens assembly of the present disclosure also can be applied to 3D (three-dimensional) image capturing applications, in products such as digital cameras, mobile devices, digital tablets, smart TV, internet monitoring device, game consoles with motion sensing function, driving recording systems, rear view camera systems, and wearable devices.

According to the present disclosure, an image capturing device is provided. The image capturing device includes the aforementioned image capturing lens assembly and an image sensor, wherein the image sensor is disposed at the image side of the aforementioned image capturing lens assembly, that is, the image sensor can be disposed on or near the image surface of the aforementioned image capturing lens assembly. In the image capturing device, the first lens element has positive refractive power, so that the light converging ability of the image capturing lens assembly can be concentrated at the object side, which is favorable for controlling the size of the image capturing lens assembly for enhancing portability. Furthermore, both of the fourth lens element and the fifth lens element have negative refractive power, so that the principal point of the image capturing lens assembly can be positioned away from the image side thereof so as to effectively control the back focal length, and the compact size can be maintained. Preferably, the image capturing device can further include a barrel member, a holding member or a combination thereof.

Figure 28:
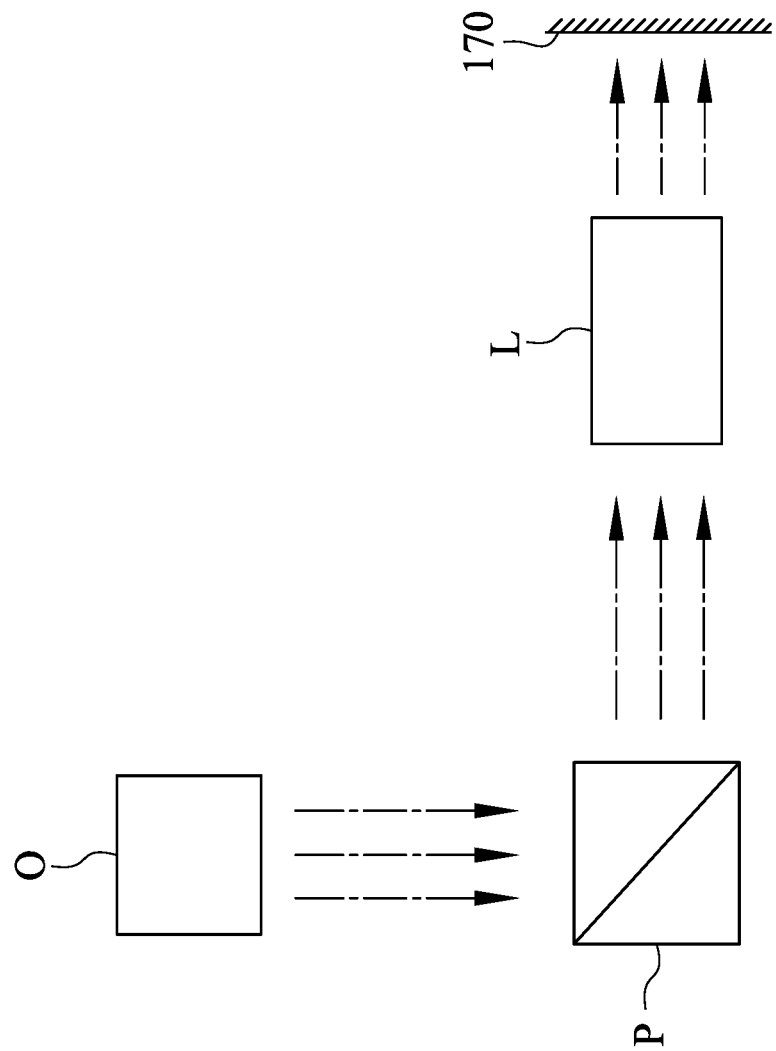
FIG. 28 shows a schematic view of another arrangement of the image capturing lens assembly, a prism, the object and the image surface according to the 1st embodiment of FIG. 1.

The image capturing device can further include a prism disposed at an optical path between an object and the image surface of the image capturing lens assembly. That is, the prism can be disposed between the object and the image capturing lens assembly (as shown in FIG. 28), disposed inside the image capturing lens assembly (not shown), or disposed between the image capturing lens assembly and the image surface (not shown). Therefore, the direction of the incident light rays can be changed by the prism according to practical needs, and the demanded height of the image capturing lens assembly can be reduced. Accordingly, it is favorable for maintaining the compact size of the image capturing device or an electronic device equipped with the image capturing device.

According to the present disclosure, an electronic device is provided. The electronic device includes the aforementioned image capturing device. Therefore, the image quality of the long-shot can be improved while maintaining the compact size of the electronic device. Preferably, the electronic device can further include but not limited to a control unit, a display, a storage unit, a random access memory unit (RAM), a read only memory unit (ROM) or a combination thereof.

According to the above description of the present disclosure, the following 1st-16th specific embodiments are provided for further explanation.

1st Embodiment

Figure 2:
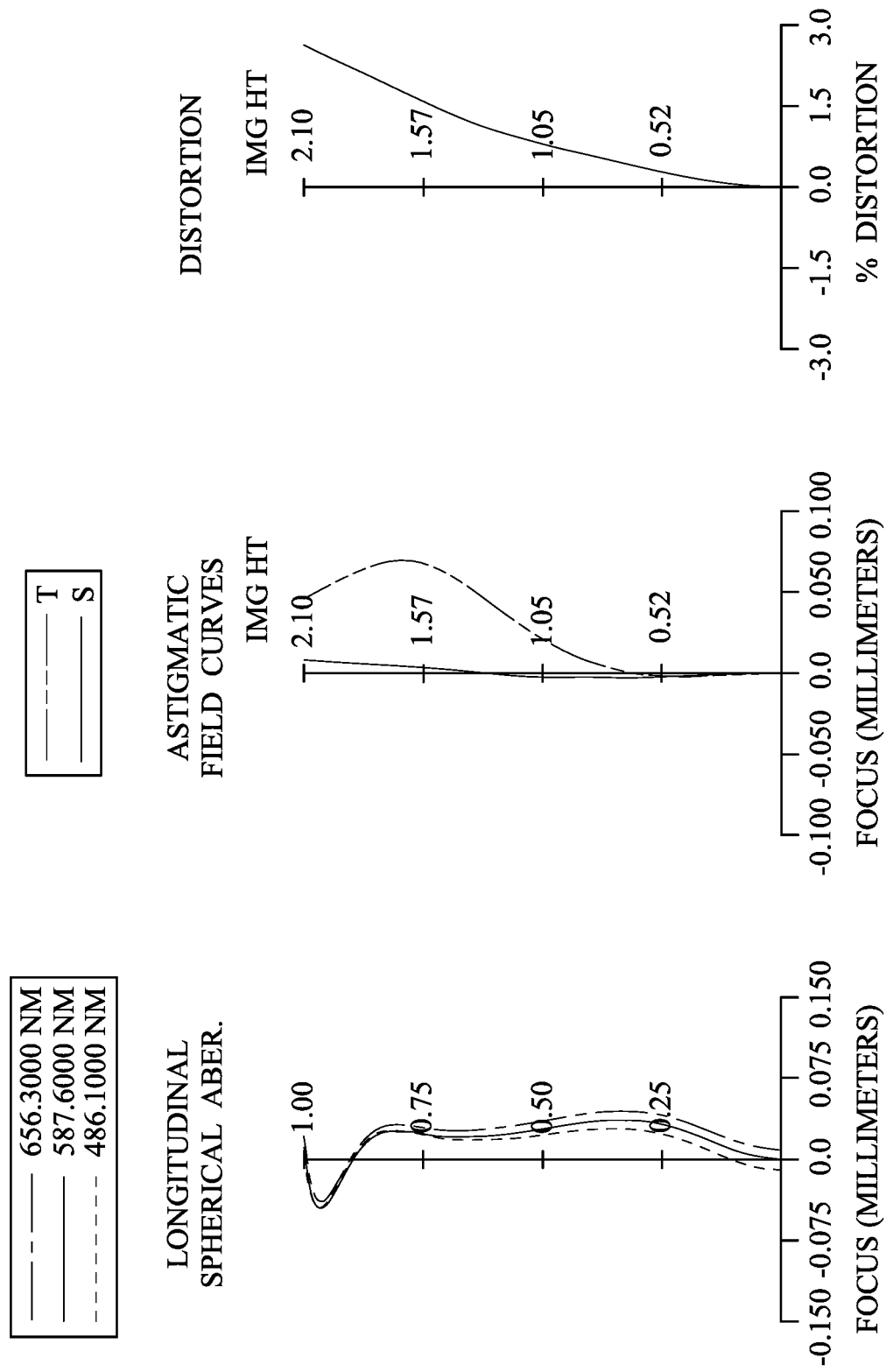
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an image capturing lens assembly (its reference numeral is omitted) and an image sensor 180. The image capturing lens assembly includes, in order from an object side to an image side, a first lens element 110, an aperture stop 100, a second lens element 120, a third lens element 130, a fourth lens element 140, a fifth lens element 150, an IR-cut filter 160 and an image surface 170, wherein the image sensor 180 is disposed on the image surface 170 of the image capturing lens assembly. The image capturing lens assembly has a total of five lens elements (110-150) with refractive power. There is an air space between any two of the first lens element 110, the second lens element 120, the third lens element 130, the fourth lens element 140 and the fifth lens element 150 that are adjacent to each other.

The first lens element 110 with positive refractive power has a convex object-side surface 111 and a convex image-side surface 112. The first lens element 110 is made of plastic material and has the object-side surface 111 and the image-side surface 112 being both aspheric. Furthermore, the object-side surface 111 of the first lens element 110 has at least one inflection point.

The second lens element 120 with negative refractive power has a concave object-side surface 121 and a concave image-side surface 122. The second lens element 120 is made of plastic material and has the object-side surface 121 and the image-side surface 122 being both aspheric. Furthermore, the object-side surface 121 of the second lens element 120 has at least one inflection point.

The third lens element 130 with positive refractive power has a concave object-side surface 131 and a convex image-side surface 132. The third lens element 130 is made of plastic material and has the object-side surface 131 and the image-side surface 132 being both aspheric. Furthermore, the object-side surface 131 and the image-side surface 132 of the third lens element 130 both have at least one inflection point.

The fourth lens element 140 with negative refractive power has a concave object-side surface 141 and a concave image-side surface 142. The fourth lens element 140 is made of plastic material and has the object-side surface 141 and the image-side surface 142 being both aspheric. Furthermore, the image-side surface 142 of the fourth lens element 140 has at least one inflection point.

The fifth lens element 150 with negative refractive power has a concave object-side surface 151 and a convex image-side surface 152. The fifth lens element 150 is made of plastic material and has the object-side surface 151 and the image-side surface 152 being both aspheric.

Moreover, the refractive power of the first lens element 110 is stronger than the refractive power of the second lens element 120, the third lens element 130, the fourth lens element 140 and the fifth lens element 150.

The IR-cut filter 160 is made of glass material and disposed between the fifth lens element 150 and the image surface 170, and will not affect a focal length of the image capturing lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens assembly according to the 1st embodiment, when a focal length of the image capturing lens assembly is f, an f-number of the image capturing lens assembly is Fno, and half of a maximal field of view of the image capturing lens assembly is HFOV, these parameters have the following values: f=6.07 mm; Fno=2.95; and HFOV=18.5 degrees.

In the image capturing lens assembly according to the 1st embodiment, when a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, and a maximum of N1, N2, N3, N4 and N5 is Nmax, the following relationship is satisfied: Nmax=1.639.

In the image capturing lens assembly according to the 1st embodiment, when an Abbe number of the fourth lens element 140 is V4, and an Abbe number of the fifth lens element 150 is V5, the following relationship is satisfied: V4+V5=111.8.

In the image capturing lens assembly according to the 1st embodiment, when an axial distance between the third lens element 130 and the fourth lens element 140 is T34, and an axial distance between the fourth lens element 140 and the fifth lens element 150 is T45, the following relationship is satisfied: T34/T45=0.21.

In the image capturing lens assembly according to the 1st embodiment, when the focal length of the image capturing lens assembly is f, and a curvature radius of the object-side surface 111 of the first lens element 110 is R1, the following relationship is satisfied: f/R1=4.10.

In the image capturing lens assembly according to the 1st embodiment, when the curvature radius of the object-side surface 111 of the first lens element 110 is R1, a curvature radius of the image-side surface 112 of the first lens element 110 is R2, a curvature radius of the image-side surface 142 of the fourth lens element 140 is R8, and a curvature radius of the object-side surface 151 of the fifth lens element 150 is R9, the following relationships are satisfied: (R1+R2)/(R1−R2)=−0.58; and (R8+R9)/(R8−R9)=0.22.

In the image capturing lens assembly according to the 1st embodiment, when a focal length of the first lens element 110 is f1, a focal length of the fourth lens element 140 is f4, a focal length of the fifth lens element 150 is f5, a composite focal length of the first lens element 110 and the second lens element 120 is f12, and a composite focal length of the fourth lens element 140 and the fifth lens element 150 is f45, the following relationships are satisfied: f1/f4=−0.56; f4/f5=0.08; and f12/f45=−1.19.

In the image capturing lens assembly according to the 1st embodiment, when the focal length of the image capturing lens assembly is f, the curvature radius of the object-side surface 111 of the first lens element 110 is R1, the curvature radius of the image-side surface 112 of the first lens element 110 is R2, and a central thickness of the first lens element 110 is CT1, the following relationship is satisfied: (f/R1)−(f/R2)+((f×CT1)/(R1×R2))=4.40.

In the image capturing lens assembly according to the 1st embodiment, when the half of the maximal field of view of the image capturing lens assembly is HFOV, the following relationship is satisfied: tan(2×HFOV)=0.75.

In the image capturing lens assembly according to the 1st embodiment, when an axial distance between the aperture stop 100 and the image-side surface 152 of the fifth lens element 150 is SD, and an axial distance between the object-side surface 111 of the first lens element 110 and the image-side surface 152 of the fifth lens element 150 is TD, the following relationship is satisfied: SD/TD=0.76.

In the image capturing lens assembly according to the 1st embodiment, when the focal length of the image capturing lens assembly is f, a maximum image height of the image capturing lens assembly is ImgH, and an entrance pupil diameter of the image capturing lens assembly is EPD, the following relationships are satisfied: f/ImgH=2.89; and EPD/ImgH=0.98.

In the image capturing lens assembly according to the 1st embodiment, when an axial distance between the object-side surface 111 of the first lens element 110 and the image surface 170 is TL, the focal length of the image capturing lens assembly is f, and the maximum image height of the image capturing lens assembly is ImgH, the following relationships are satisfied: TL=5.89; TL/f=0.97; and TL/ImgH=2.81.

The detailed optical data of the 1st embodiment are shown in Table 1 and the aspheric surface data are shown in Table 2 below.

TABLE 1

1st Embodiment
f = 6.07 mm, Fno = 2.95, HFOV = 18.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.481 | ASP | 1.076 | Plastic | 1.544 | 55.9 | 2.27 |
| 2 | | −5.535 | ASP | 0.039 | | | | |
| 3 | Ape. Stop | Plano | | 0.076 | | | | |
| 4 | Lens 2 | −3.792 | ASP | 0.300 | Plastic | 1.639 | 23.5 | −2.91 |
| 5 | | 3.770 | ASP | 0.257 | | | | |
| 6 | Lens 3 | −453.707 | ASP | 0.508 | Plastic | 1.639 | 23.5 | 6.44 |
| 7 | | −4.080 | ASP | 0.118 | | | | |
| 8 | Lens 4 | −3.069 | ASP | 0.430 | Plastic | 1.544 | 55.9 | −4.03 |
| 9 | | 8.031 | ASP | 0.555 | | | | |
| 10 | Lens 5 | −5.163 | ASP | 1.247 | Plastic | 1.544 | 55.9 | −48.36 |
| 11 | | −6.970 | ASP | 0.300 | | | | |
| 12 | IR-cut filter | Plano | | 0.210 | Glass | 1.517 | 64.2 | — |
| 13 | | Plano | | 0.772 | | | | |
| 14 | Image | Plano | | — | | | | |

Note:
Reference wavelength is 587.6 nm (d-line).

TABLE 2

Aspheric Coefficients

| Surface # | 1 | 2 | 4 | 5 | 6 |
|---|---|---|---|---|---|
| k= | −6.9873E+00 | −8.0968E+01 | −2.3206E+01 | −1.4045E+01 | −9.0000E+01 |
| A4= | 2.5541E−01 | −7.7500E−02 | −4.3229E−02 | 1.0824E−01 | −9.3787E−02 |
| A6= | −2.3667E−01 | 1.3874E−01 | 1.3520E−01 | 5.3751E−02 | 3.6266E−01 |
| A8= | 2.5275E−01 | −5.4777E−02 | 6.3171E−01 | 1.5343E+00 | −4.0357E−01 |
| A10= | −1.9345E−01 | −4.6177E−02 | −2.4918E+00 | −4.9947E+00 | 8.8277E−01 |
| A12= | 9.4570E−02 | 2.6235E−02 | 3.4115E+00 | 8.0258E+00 | −6.7334E−01 |
| A14= | −2.1153E−02 | 1.9462E−03 | −1.7338E+00 | −5.0329E+00 | |

| Surface # | 7 | 8 | 9 | 10 | 11 |
|---|---|---|---|---|---|
| k= | −9.0000E+01 | −3.5655E+01 | −8.7165E+01 | −7.8356E+01 | −4.6529E+01 |
| A4= | −3.6485E−01 | −1.8470E−01 | 2.0722E−01 | −3.0083E−02 | −2.6346E−02 |
| A6= | 1.5094E+00 | 1.1481E+00 | 1.7686E−01 | 6.6145E−02 | −1.5986E−02 |
| A8= | −3.5943E+00 | −2.7288E+00 | −9.4692E−01 | −5.0095E−02 | 1.6605E−02 |
| A10= | 4.7787E+00 | 1.7985E+00 | 1.1989E+00 | 9.6423E−03 | −8.3533E−03 |
| A12= | −2.4502E+00 | 1.6724E+00 | −6.7100E−01 | 9.4870E−05 | 1.9654E−03 |
| A14= | | −1.9421E+00 | 1.4261E−01 | −3.8493E−05 | −2.0119E−04 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1 st embodiment. Therefore, an explanation in this regard will not be provided again.

Furthermore, as shown in Table 1, the third lens element 130 has positive refractive power, and the Abbe number thereof is less than 30.

Moreover, as shown in Table 1, when an axial distance between the first lens element 110 and the second lens element 120 is T12, an axial distance between the second lens element 120 and the third lens element 130 is T23, the axial distance between the third lens element 130 and the fourth lens element 140 is T34, and the axial distance between the fourth lens element 140 and the fifth lens element 150 is T45, T45 is greater than T12, T23 and T34.

Figure 27:
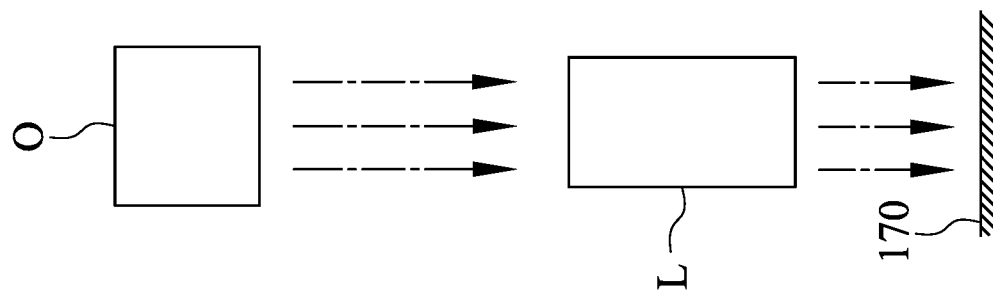
FIG. 27 shows a schematic view of one arrangement of an image capturing lens assembly, an object and an image surface according to the 1st embodiment of FIG. 1.

FIG. 27 shows a schematic view of one arrangement of the image capturing lens assembly L, an object O and the image surface 170 according to the 1st embodiment of FIG. 1. In FIG. 27, the incident light rays straightly enter into the image capturing lens assembly L from the object O, and are imaged on the image surface 170.

FIG. 28 shows a schematic view of another arrangement of the image capturing lens assembly L, a prism P, the object O and the image surface 170 according to the 1st embodiment of FIG. 1. In FIG. 28, the image capturing device further includes a prism P disposed at the optical path between the object O and the image surface 170 of the image capturing lens assembly L. The arrangement of the prism P can change the direction of the incident light rays, so that the demanded height of the image capturing lens assembly L can be reduced. Accordingly, it is favorable for maintaining the compact size of the image capturing device or an electronic device equipped with the image capturing device.

The following embodiments can be applied to the arrangement of FIGS. 27 and 28, and will not describe again herein.

2nd Embodiment

Figure 3:
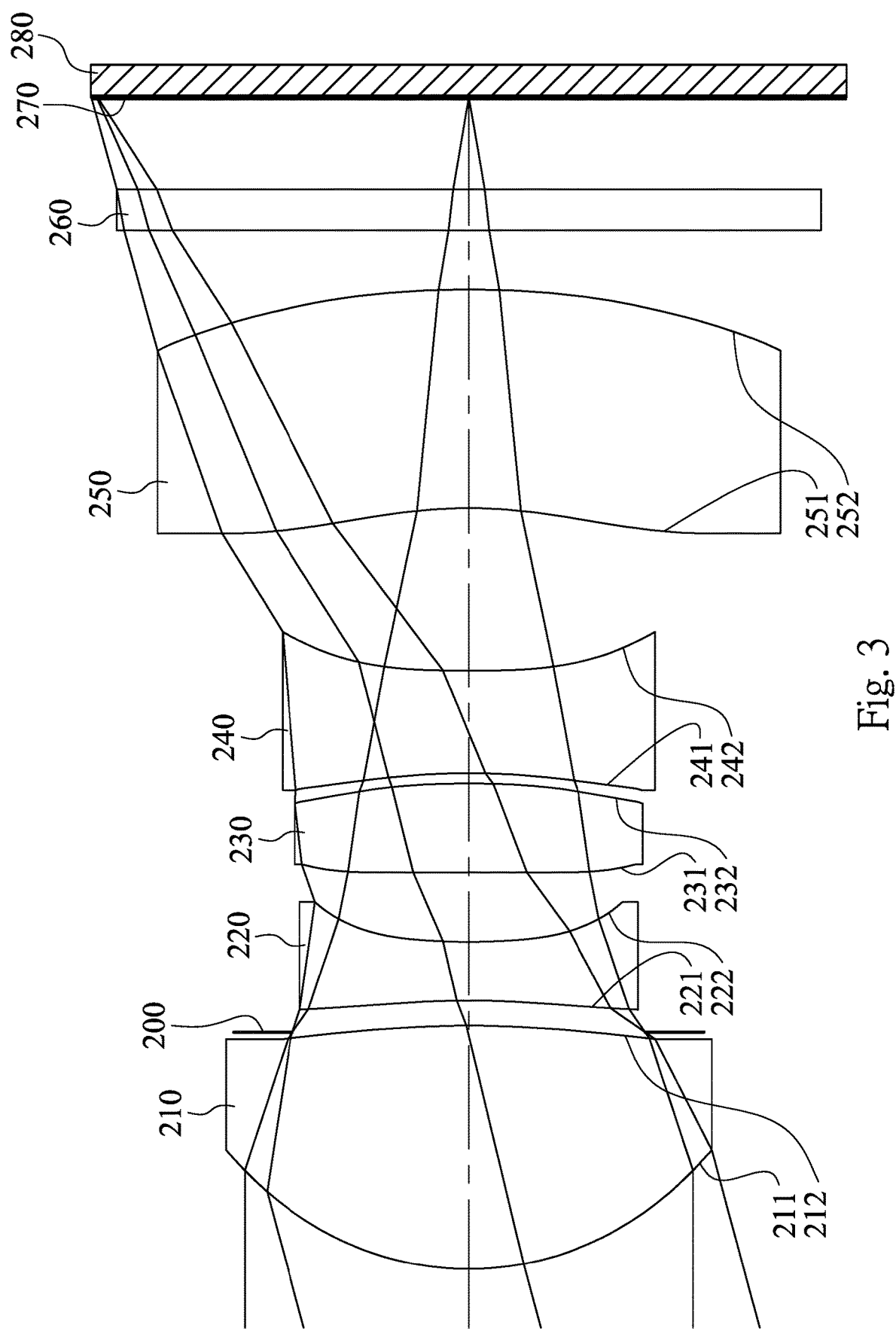
FIG. 3 is a schematic view of an image capturing device according to the 2nd embodiment of the present disclosure.
Figure 4:
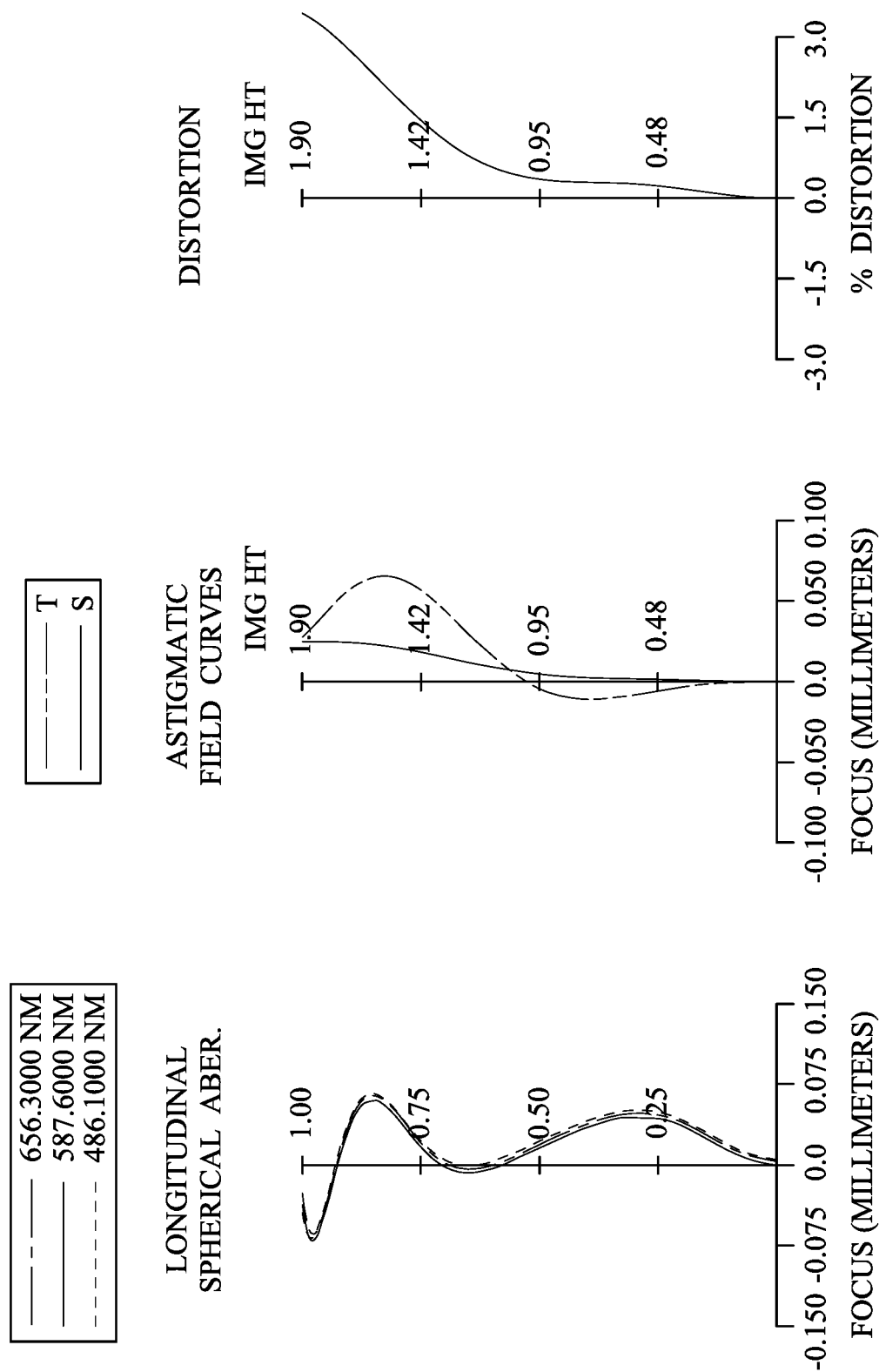
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an image capturing lens assembly (its reference numeral is omitted) and an image sensor 280. The image capturing lens assembly includes, in order from an object side to an image side, a first lens element 210, an aperture stop 200, a second lens element 220, a third lens element 230, a fourth lens element 240, a fifth lens element 250, an IR-cut filter 260 and an image surface 270, wherein the image sensor 280 is disposed on the image surface 270 of the image capturing lens assembly. The image capturing lens assembly has a total of five lens elements (210-250) with refractive power. There is an air space between any two of the first lens element 210, the second lens element 220, the third lens element 230, the fourth lens element 240 and the fifth lens element 250 that are adjacent to each other.

The first lens element 210 with positive refractive power has a convex object-side surface 211 and a convex image-side surface 212. The first lens element 210 is made of plastic material and has the object-side surface 211 and the image-side surface 212 being both aspheric. Furthermore, the object-side surface 211 of the first lens element 210 has at least one inflection point.

The second lens element 220 with negative refractive power has a concave object-side surface 221 and a concave image-side surface 222. The second lens element 220 is made of plastic material and has the object-side surface 221 and the image-side surface 222 being both aspheric. Furthermore, the object-side surface 221 of the second lens element 220 has at least one inflection point.

The third lens element 230 with positive refractive power has a convex object-side surface 231 and a convex image-side surface 232. The third lens element 230 is made of plastic material and has the object-side surface 231 and the image-side surface 232 being both aspheric. Furthermore, the object-side surface 231 of the third lens element 230 has at least one inflection point.

The fourth lens element 240 with negative refractive power has a concave object-side surface 241 and a concave image-side surface 242. The fourth lens element 240 is made of plastic material and has the object-side surface 241 and the image-side surface 242 being both aspheric.

The fifth lens element 250 with negative refractive power has a concave object-side surface 251 and a convex image-side surface 252. The fifth lens element 250 is made of plastic material and has the object-side surface 251 and the image-side surface 252 being both aspheric. Furthermore, the object-side surface 251 of the fifth lens element 250 has at least one inflection point.

Moreover, the refractive power of the first lens element 210 is stronger than the refractive power of the second lens element 220, the third lens element 230, the fourth lens element 240 and the fifth lens element 250.

The IR-cut filter 260 is made of glass material and disposed between the fifth lens element 250 and the image surface 270, and will not affect a focal length of the image capturing lens assembly.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.78 | f4/f5 | 0.41 |
| Fno | 3.00 | f12/f45 | −1.33 |
| HFOV [deg.] | 15.1 | (f/R1) − (f/R2) + ((f × CT1)/(R1 × R2)) | 4.70 |
| Nmax | 1.650 | tan (2 × HFOV) | 0.58 |
| V4 + V5 | 111.8 | SD/TD | 0.76 |
| T34/T45 | 0.06 | f/ImgH | 3.57 |

TABLE 3

2nd Embodiment
f = 6.78 mm, Fno = 3.00, HFOV = 15.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.510 | ASP | 1.241 | Plastic | 1.544 | 55.9 | 2.33 |
| 2 | | −5.633 | ASP | −0.033 | | | | |
| 3 | Ape. Stop | Plano | | 0.162 | | | | |
| 4 | Lens 2 | −4.452 | ASP | 0.300 | Plastic | 1.650 | 21.5 | −2.84 |
| 5 | | 3.250 | ASP | 0.355 | | | | |
| 6 | Lens 3 | 536.247 | ASP | 0.453 | Plastic | 1.650 | 21.5 | 8.96 |
| 7 | | −5.890 | ASP | 0.052 | | | | |
| 8 | Lens 4 | −3.844 | ASP | 0.525 | Plastic | 1.544 | 55.9 | −4.98 |
| 9 | | 9.608 | ASP | 0.827 | | | | |
| 10 | Lens 5 | −2.540 | ASP | 1.117 | Plastic | 1.544 | 55.9 | −12.08 |
| 11 | | −4.782 | ASP | 0.300 | | | | |
| 12 | IR-cut filter | Plano | | 0.210 | Glass | 1.517 | 64.2 | — |
| 13 | | Plano | | 0.472 | | | | |
| 14 | Image | Plano | | — | | | | |

Note:
Reference wavelength is 587.6 nm (d-line).

TABLE 4

Aspheric Coefficients

| Surface # | 1 | 2 | 4 | 5 | 6 |
|---|---|---|---|---|---|
| k= | −7.2845E+00 | −9.0000E+01 | −3.1962E+01 | 1.3730E+00 | 9.0000E+01 |
| A4= | 2.5092E−01 | −7.7036E−02 | −3.3640E−02 | 1.3005E−01 | −7.8775E−02 |
| A6= | −2.3675E−01 | 1.3754E−01 | 1.5643E−01 | 8.3933E−02 | 3.3494E−01 |
| A8= | 2.5124E−01 | −5.5272E−02 | 6.1690E−01 | 1.5222E+00 | −4.3181E−01 |
| A10= | −1.9415E−01 | −4.6495E−02 | −2.5667E+00 | −5.0496E+00 | 8.6293E−01 |
| A12= | 9.4743E−02 | 2.5199E−02 | 3.3597E+00 | 7.9896E+00 | −6.9080E−01 |
| A14= | −2.0697E−02 | −2.4449E−04 | −1.5803E+00 | −5.0837E+00 | |

| Surface # | 7 | 8 | 9 | 10 | 11 |
|---|---|---|---|---|---|
| k= | 1.5718E+01 | −1.8102E+00 | 8.6624E+01 | −7.2613E+00 | −5.0467E+01 |
| A4= | −3.8909E−01 | −1.5562E−01 | 2.5786E−01 | 1.0686E−02 | −5.4627E−02 |
| A6= | 1.5133E+00 | 1.1642E+00 | 1.7743E−01 | 7.2757E−02 | 8.3536E−03 |
| A8= | −3.6035E+00 | −2.7019E+00 | −9.4477E−01 | −4.8560E−02 | 1.3892E−02 |
| A10= | 4.7696E+00 | 1.8117E+00 | 1.1950E+00 | 1.0149E−02 | −8.9891E−03 |
| A12= | −2.4518E+00 | 1.6668E+00 | −6.7604E−01 | 2.6620E−04 | 1.9590E−03 |
| A14= | | −1.9525E+00 | 1.3497E−01 | −1.1990E−04 | −1.5119E−04 |

-continued

| 2nd Embodiment | | | |
|---|---|---|---|
| f/R1 | 4.49 | EPD/ImgH | 1.19 |
| (R1 + R2)/(R1 − R2) | −0.58 | TL [mm] | 5.98 |
| (R8 + R9)/(R8 − R9) | 0.58 | TL/f | 0.88 |
| f1/f4 | −0.47 | TL/ImgH | 3.15 |

Furthermore, as shown in Table 3, the third lens element 230 has positive refractive power, and the Abbe number thereof is less than 30.

Moreover, as shown in Table 3, when an axial distance between the first lens element 210 and the second lens element 220 is T12, an axial distance between the second lens element 220 and the third lens element 230 is T23, an axial distance between the third lens element 230 and the fourth lens element 240 is T34, and an axial distance between the fourth lens element 240 and the fifth lens element 250 is T45, T45 is greater than T12, T23 and T34.

3rd Embodiment

Figure 5:
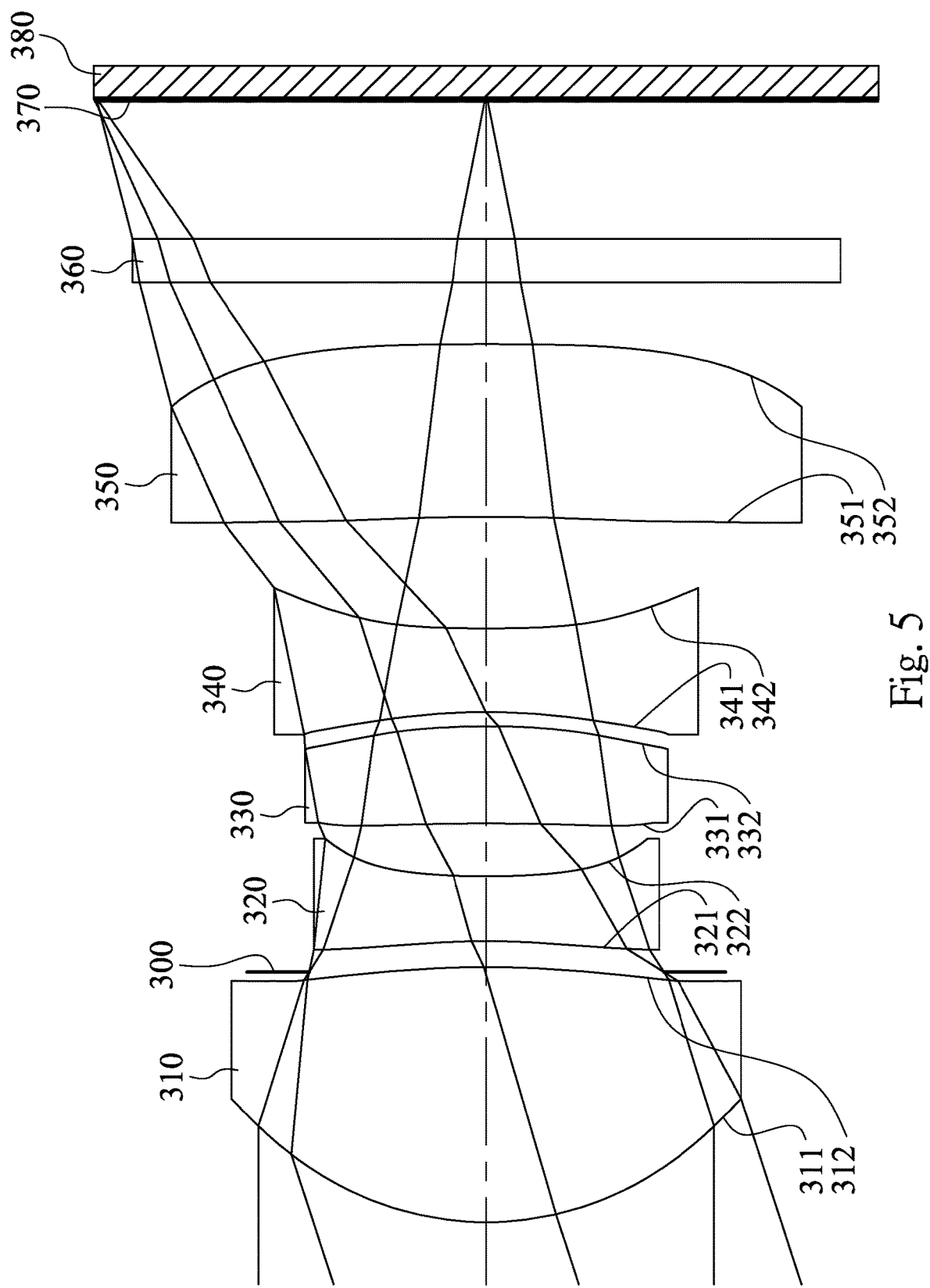
FIG. 5 is a schematic view of an image capturing device according to the 3rd embodiment of the present disclosure.
Figure 6:
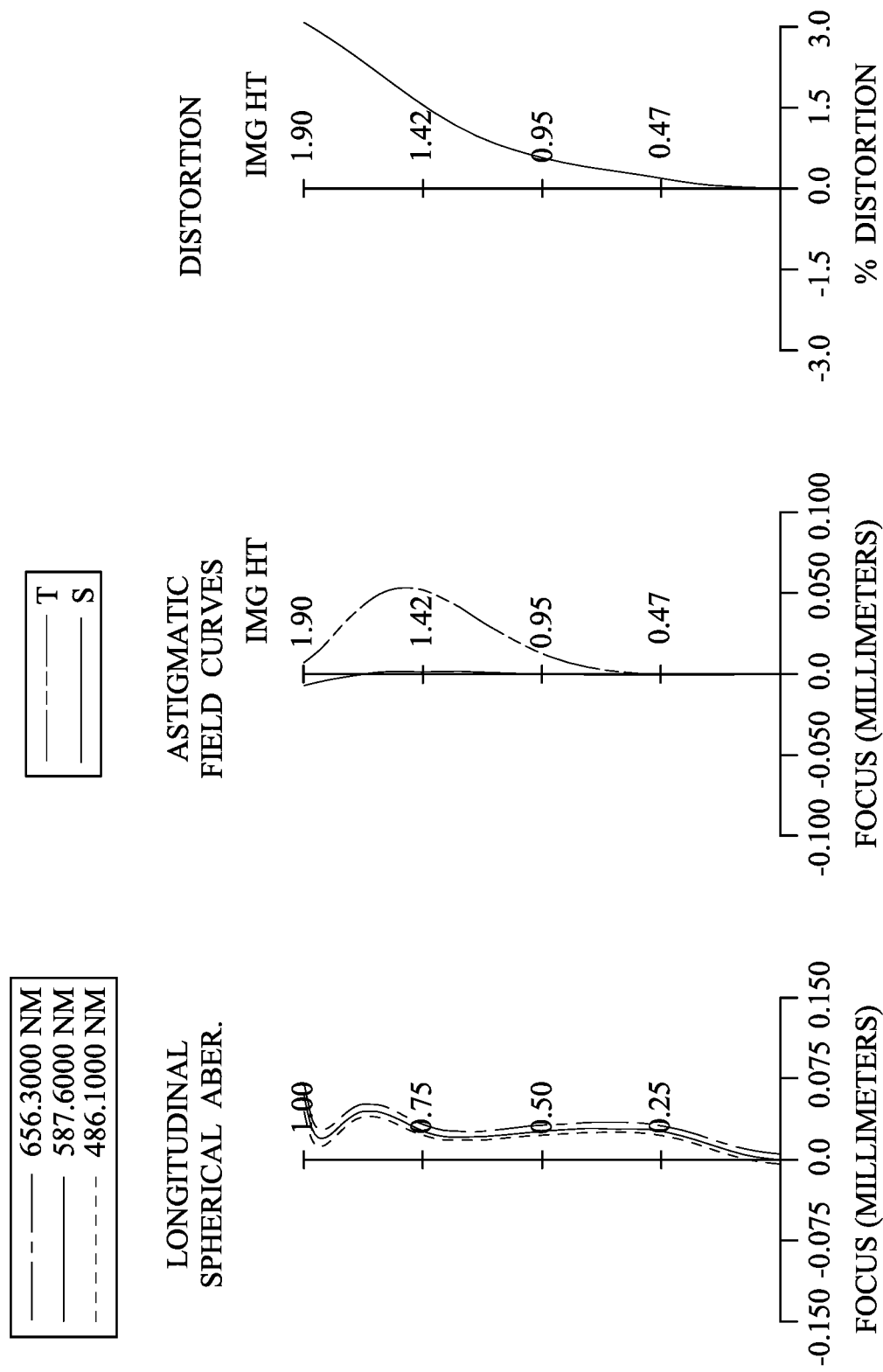
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an image capturing lens assembly (its reference numeral is omitted) and an image sensor 380. The image capturing lens assembly includes, in order from an object side to an image side, a first lens element 310, an aperture stop 300, a second lens element 320, a third lens element 330, a fourth lens element 340, a fifth lens element 350, an IR-cut filter 360 and an image surface 370, wherein the image sensor 380 is disposed on the image surface 370 of the image capturing lens assembly. The image capturing lens assembly has a total of five lens elements (310-350) with refractive power. There is an air space between any two of the first lens element 310, the second lens element 320, the third lens element 330, the fourth lens element 340 and the fifth lens element 350 that are adjacent to each other.

The first lens element 310 with positive refractive power has a convex object-side surface 311 and a convex image-side surface 312. The first lens element 310 is made of plastic material and has the object-side surface 311 and the image-side surface 312 being both aspheric. Furthermore, the object-side surface 311 of the first lens element 310 has at least one inflection point.

The second lens element 320 with negative refractive power has a concave object-side surface 321 and a concave image-side surface 322. The second lens element 320 is made of plastic material and has the object-side surface 321 and the image-side surface 322 being both aspheric. Furthermore, the object-side surface 321 of the second lens element 320 has at least one inflection point.

The third lens element 330 with positive refractive power has a concave object-side surface 331 and a convex image-side surface 332. The third lens element 330 is made of plastic material and has the object-side surface 331 and the image-side surface 332 being both aspheric. Furthermore, the object-side surface 331 of the third lens element 330 has at least one inflection point.

The fourth lens element 340 with negative refractive power has a concave object-side surface 341 and a concave image-side surface 342. The fourth lens element 340 is made of plastic material and has the object-side surface 341 and the image-side surface 342 being both aspheric.

The fifth lens element 350 with negative refractive power has a concave object-side surface 351 and a convex image-side surface 352. The fifth lens element 350 is made of plastic material and has the object-side surface 351 and the image-side surface 352 being both aspheric. Furthermore, the object-side surface 351 of the fifth lens element 350 has at least one inflection point.

Moreover, the refractive power of the first lens element 310 is stronger than the refractive power of the second lens element 320, the third lens element 330, the fourth lens element 340 and the fifth lens element 350.

The IR-cut filter 360 is made of glass material and disposed between the fifth lens element 350 and the image surface 370, and will not affect a focal length of the image capturing lens assembly.

The detailed optical data of the 3rd embodiment are shown in Table 5 and the aspheric surface data are shown in Table 6 below.

TABLE 5

3rd Embodiment
f = 5.62 mm, Fno = 2.55, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.490 | ASP | 1.236 | Plastic | 1.544 | 55.9 | 2.29 |
| 2 | | −5.350 | ASP | −0.024 | | | | |
| 3 | Ape. Stop | Plano | | 0.149 | | | | |
| 4 | Lens 2 | −4.136 | ASP | 0.316 | Plastic | 1.650 | 21.5 | −3.14 |
| 5 | | 4.156 | ASP | 0.256 | | | | |
| 6 | Lens 3 | −14.932 | ASP | 0.470 | Plastic | 1.650 | 21.5 | 10.87 |
| 7 | | −4.859 | ASP | 0.069 | | | | |
| 8 | Lens 4 | −3.367 | ASP | 0.407 | Plastic | 1.544 | 55.9 | −4.61 |
| 9 | | 10.259 | ASP | 0.540 | | | | |
| 10 | Lens 5 | −10.836 | ASP | 0.836 | Plastic | 1.544 | 55.9 | −30.20 |
| 11 | | −32.677 | ASP | 0.300 | | | | |
| 12 | IR-cut filter | Plano | | 0.210 | Glass | 1.517 | 64.2 | — |
| 13 | | Plano | | 0.676 | | | | |
| 14 | Image | Plano | | — | | | | |

Note:
Reference wavelength is 587.6 nm (d-line).

TABLE 6

Aspheric Coefficients

| Surface # | 1 | 2 | 4 | 5 | 6 |
|---|---|---|---|---|---|
| k= | −6.9952E+00 | −7.6590E+01 | −3.9205E+01 | 3.2776E+00 | 9.0000E+01 |
| A4= | 2.4970E−01 | −7.5195E−02 | −3.0650E−02 | 1.3626E−01 | −8.9615E−02 |
| A6= | −2.3667E−01 | 1.3821E−01 | 1.6642E−01 | 9.1059E−02 | 3.2912E−01 |
| A8= | 2.5107E−01 | −5.6098E−02 | 6.3159E−01 | 1.5167E+00 | −4.2788E−01 |
| A10= | −1.9439E−01 | −4.7451E−02 | −2.5639E+00 | −5.0579E+00 | 8.7460E−01 |
| A12= | 9.4591E−02 | 2.4864E−02 | 3.3320E+00 | 7.9639E+00 | −6.8134E−01 |
| A14= | −2.0785E−02 | 3.3262E−04 | −1.5899E+00 | −5.0041E+00 | |

| Surface # | 7 | 8 | 9 | 10 | 11 |
|---|---|---|---|---|---|
| k= | 1.4559E+01 | 5.2225E−01 | 8.5204E+01 | 9.9992E+00 | −8.2733E+01 |
| A4= | −3.7583E−01 | −1.6299E−01 | 2.3483E−01 | −5.9579E−03 | −5.9319E−02 |
| A6= | 1.5121E+00 | 1.1775E+00 | 1.6431E−01 | 6.7870E−02 | 2.3825E−03 |
| A8= | −3.6045E+00 | −2.6956E+00 | −9.4764E−01 | −4.9557E−02 | 1.3335E−02 |
| A10= | 4.7716E+00 | 1.8034E+00 | 1.1987E+00 | 9.9877E−03 | −9.0049E−03 |
| A12= | −2.4485E+00 | 1.6532E+00 | −6.7235E−01 | 3.1498E−04 | 1.9292E−03 |
| A14= | | −1.9676E+00 | 1.3754E−01 | −2.6707E−05 | −1.6427E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.62 | f4/f5 | 0.15 |
| Fno | 2.55 | f12/f45 | −1.05 |
| HFOV [deg.] | 18.0 | (f/R1) − (f/R2) + ((f × CT1)/(R1 × R2)) | 3.95 |
| Nmax | 1.650 | tan (2 × HFOV) | 0.73 |
| V4 + V5 | 111.8 | SD/TD | 0.72 |
| T34/T45 | 0.13 | f/ImgH | 2.96 |
| f/R1 | 3.77 | EPD/ImgH | 1.16 |
| (R1 + R2)/(R1 − R2) | −0.56 | TL [mm] | 5.44 |
| (R8 + R9)/(R8 − R9) | −0.03 | TL/f | 0.97 |
| f1/f4 | −0.50 | TL/ImgH | 2.87 |

Furthermore, as shown in Table 5, the third lens element 330 has positive refractive power, and the Abbe number thereof is less than 30.

Moreover, as shown in Table 5, when an axial distance between the first lens element 310 and the second lens element 320 is T12, an axial distance between the second lens element 320 and the third lens element 330 is T23, an axial distance between the third lens element 330 and the fourth lens element 340 is T34, and an axial distance between the fourth lens element 340 and the fifth lens element 350 is T45, T45 is greater than T12, T23 and T34.

4th Embodiment

Figure 7:
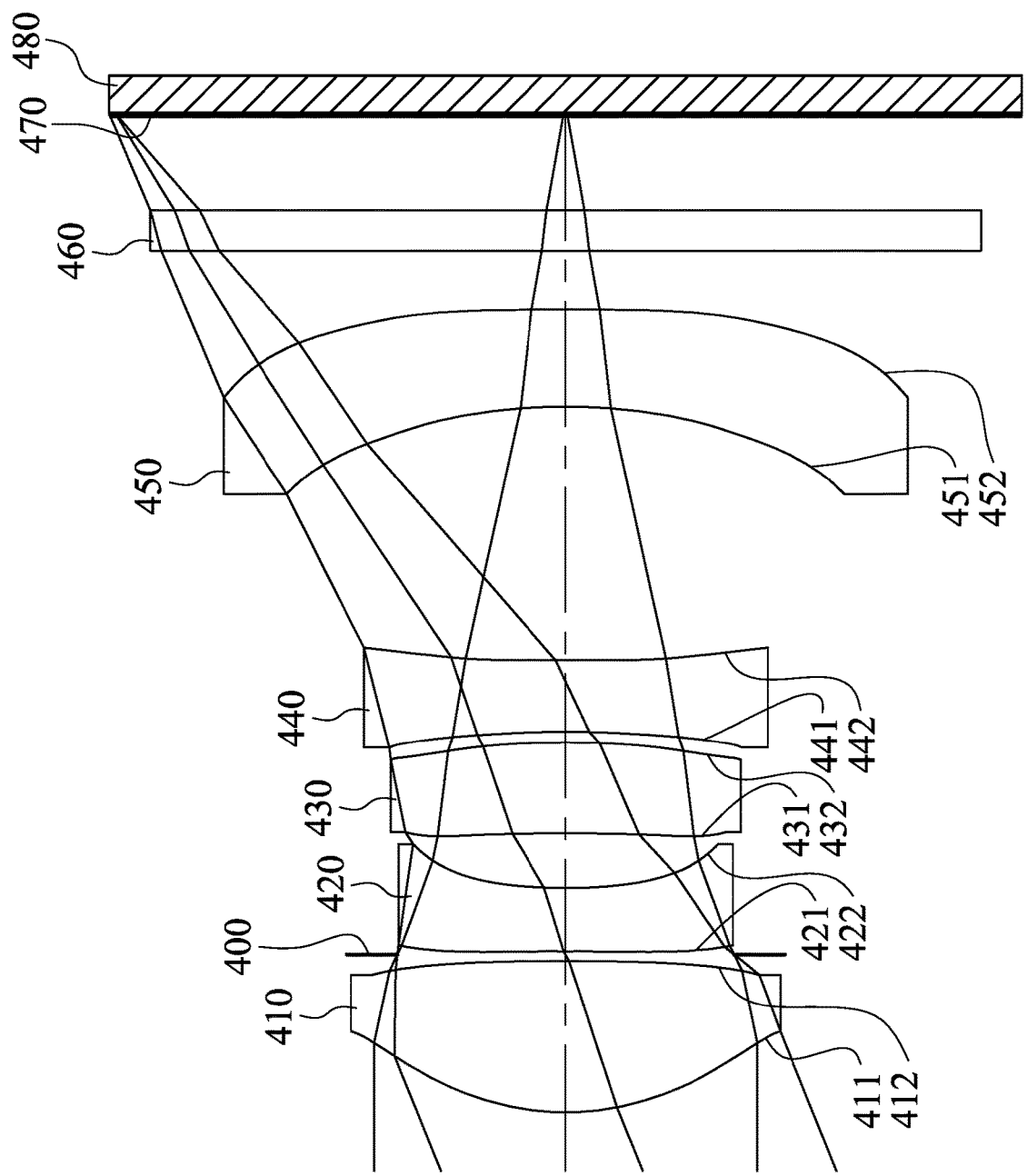
FIG. 7 is a schematic view of an image capturing device according to the 4th embodiment of the present disclosure.
Figure 8:
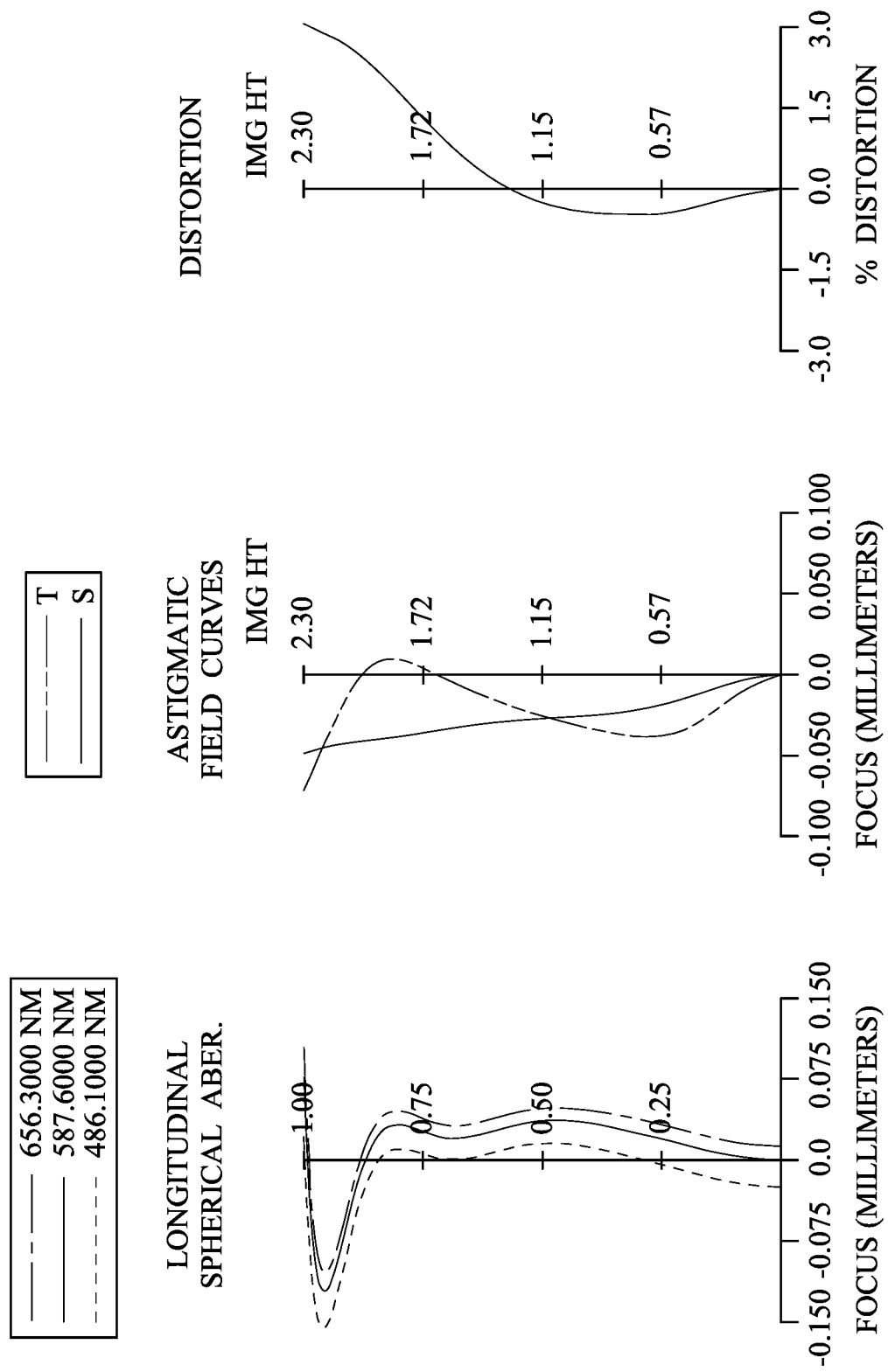
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an image capturing lens assembly (its reference numeral is omitted) and an image sensor 480. The image capturing lens assembly includes, in order from an object side to an image side, a first lens element 410, an aperture stop 400, a second lens element 420, a third lens element 430, a fourth lens element 440, a fifth lens element 450, an IR-cut filter 460 and an image surface 470, wherein the image sensor 480 is disposed on the image surface 470 of the image capturing lens assembly. The image capturing lens assembly has a total of five lens elements (410-450) with refractive power. There is an air space between any two of the first lens element 410, the second lens element 420, the third lens element 430, the fourth lens element 440 and the fifth lens element 450 that are adjacent to each other.

The first lens element 410 with positive refractive power has a convex object-side surface 411 and a convex image-side surface 412. The first lens element 410 is made of plastic material and has the object-side surface 411 and the image-side surface 412 being both aspheric. Furthermore, the object-side surface 411 of the first lens element 410 has at least one inflection point.

The second lens element 420 with negative refractive power has a concave object-side surface 421 and a concave image-side surface 422. The second lens element 420 is made of plastic material and has the object-side surface 421 and the image-side surface 422 being both aspheric. Furthermore, the object-side surface 421 of the second lens element 420 has at least one inflection point.

The third lens element 430 with positive refractive power has a concave object-side surface 431 and a convex image-side surface 432. The third lens element 430 is made of plastic material and has the object-side surface 431 and the image-side surface 432 being both aspheric. Furthermore, the object-side surface 431 and the image-side surface 432 of the third lens element 430 both have at least one inflection point.

The fourth lens element 440 with negative refractive power has a concave object-side surface 441 and a convex image-side surface 442. The fourth lens element 440 is made of plastic material and has the object-side surface 441 and the image-side surface 442 being both aspheric. Furthermore, the image-side surface 442 of the fourth lens element 440 has at least one inflection point.

The fifth lens element 450 with negative refractive power has a concave object-side surface 451 and a concave image-side surface 452. The fifth lens element 450 is made of plastic material and has the object-side surface 451 and the image-side surface 452 being both aspheric. Furthermore, the image-side surface 452 of the fifth lens element 450 has at least one inflection point.

Moreover, the refractive power of the first lens element 410 is stronger than the refractive power of the second lens element 420, the third lens element 430, the fourth lens element 440 and the fifth lens element 450.

The IR-cut filter 460 is made of glass material and disposed between the fifth lens element 450 and the image surface 470, and will not affect a focal length of the image capturing lens assembly.

The detailed optical data of the 4th embodiment are shown in Table 7 and the aspheric surface data are shown in Table 8 below.

Moreover, these parameters can be calculated from Table 7 and Table 8 as the following values and satisfy the following conditions:

| 4th Embodiment | | | |
|---|---|---|---|
| f [mm] | 5.48 | f4/f5 | 1.91 |
| Fno | 2.80 | f12/f45 | −1.17 |
| HFOV [deg.] | 22.0 | (f/R1) − (f/R2) + ((f × CT1)/(R1 × R2)) | 4.04 |
| Nmax | 1.639 | tan (2 × HFOV) | 0.97 |
| V4 + V5 | 111.6 | SD/TD | 0.80 |
| T34/T45 | 0.04 | f/ImgH | 2.39 |
| f/R1 | 3.95 | EPD/ImgH | 0.85 |
| (R1 + R2)/(R1 − R2) | −0.91 | TL [mm] | 5.10 |

TABLE 7

4th Embodiment
f = 5.48 mm, Fno = 2.80, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.387 | ASP | 0.774 | Plastic | 1.544 | 55.9 | 2.45 |
| 2 | | −27.828 | ASP | 0.034 | | | | |
| 3 | Ape. Stop | Plano | | 0.016 | | | | |
| 4 | Lens 2 | −35.038 | ASP | 0.323 | Plastic | 1.614 | 25.6 | −4.14 |
| 5 | | 2.754 | ASP | 0.280 | | | | |
| 6 | Lens 3 | −20.483 | ASP | 0.464 | Plastic | 1.639 | 23.5 | 16.56 |
| 7 | | −7.038 | ASP | 0.057 | | | | |
| 8 | Lens 4 | −5.608 | ASP | 0.365 | Plastic | 1.544 | 55.9 | −11.40 |
| 9 | | −59.962 | ASP | 1.298 | | | | |
| 10 | Lens 5 | −3.233 | ASP | 0.495 | Plastic | 1.535 | 55.7 | −5.98 |
| 11 | | 322.581 | ASP | 0.300 | | | | |
| 12 | IR-cut filter | Plano | | 0.210 | Glass | 1.517 | 64.2 | — |
| 13 | | Plano | | 0.487 | | | | |
| 14 | Image | Plano | | — | | | | |

Note:
Reference wavelength is 587.6 nm (d-line).

TABLE 8

| Aspheric Coefficients | | | | | |
|---|---|---|---|---|---|
| Surface # | 1 | 2 | 4 | 5 | 6 |
| k= | −5.8268E+00 | 2.0602E+01 | 9.0000E+01 | 5.1700E−01 | 9.0000E+01 |
| A4= | 2.5554E−01 | −1.0331E−01 | −1.8093E−02 | 1.4035E−01 | −1.4253E−01 |
| A6= | −2.4998E−01 | 1.2131E−01 | 1.6349E−01 | 8.7522E−02 | 3.1663E−01 |
| A8= | 2.4470E−01 | −3.7170E−02 | 6.1050E−01 | 1.3062E+00 | −3.2651E−01 |
| A10= | −1.9673E−01 | −8.0838E−02 | −2.5532E+00 | −5.0483E+00 | 7.8441E−01 |
| A12= | 9.1278E−02 | 5.2985E−02 | 3.5334E+00 | 9.2901E+00 | −5.3604E−01 |
| A14= | −2.7940E−02 | −8.4554E−03 | −1.7262E+00 | −6.1258E+00 | |

| Surface # | 7 | 8 | 9 | 10 | 11 |
|---|---|---|---|---|---|
| k= | −2.9484E−01 | −5.8665E+01 | −9.0000E+01 | −5.5910E+01 | −7.5487E+01 |
| A4= | −3.6938E−01 | −1.7220E−01 | 1.5629E−01 | −2.1463E−01 | −9.8513E−02 |
| A6= | 1.4572E+00 | 1.1366E+00 | 1.8766E−01 | 1.7268E−01 | 2.6127E−02 |
| A8= | −3.6270E+00 | −2.7395E+00 | −9.4301E−01 | −5.5252E−02 | 1.2463E−02 |
| A10= | 4.8630E+00 | 1.7421E+00 | 1.1954E+00 | 1.1542E−03 | −9.8563E−03 |
| A12= | −2.4713E+00 | 1.6822E+00 | −6.7128E−01 | −1.8740E−03 | 1.8562E−03 |
| A14= | | −1.8368E+00 | 1.4451E−01 | 1.1581E−03 | −1.0129E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

-continued

| 4th Embodiment | | | |
|---|---|---|---|
| (R8 + R9)/(R8 − R9) | 1.11 | TL/f | 0.93 |
| f1/f4 | −0.22 | TL/ImgH | 2.22 |

Furthermore, as shown in Table 7, the third lens element 430 has positive refractive power, and the Abbe number thereof is less than 30.

Moreover, as shown in Table 7, when an axial distance between the first lens element 410 and the second lens element 420 is T12, an axial distance between the second lens element 420 and the third lens element 430 is T23, an axial distance between the third lens element 430 and the fourth lens element 440 is T34, and an axial distance between the fourth lens element 440 and the fifth lens element 450 is T45, T45 is greater than T12, T23 and T34.

5th Embodiment

Figure 9:
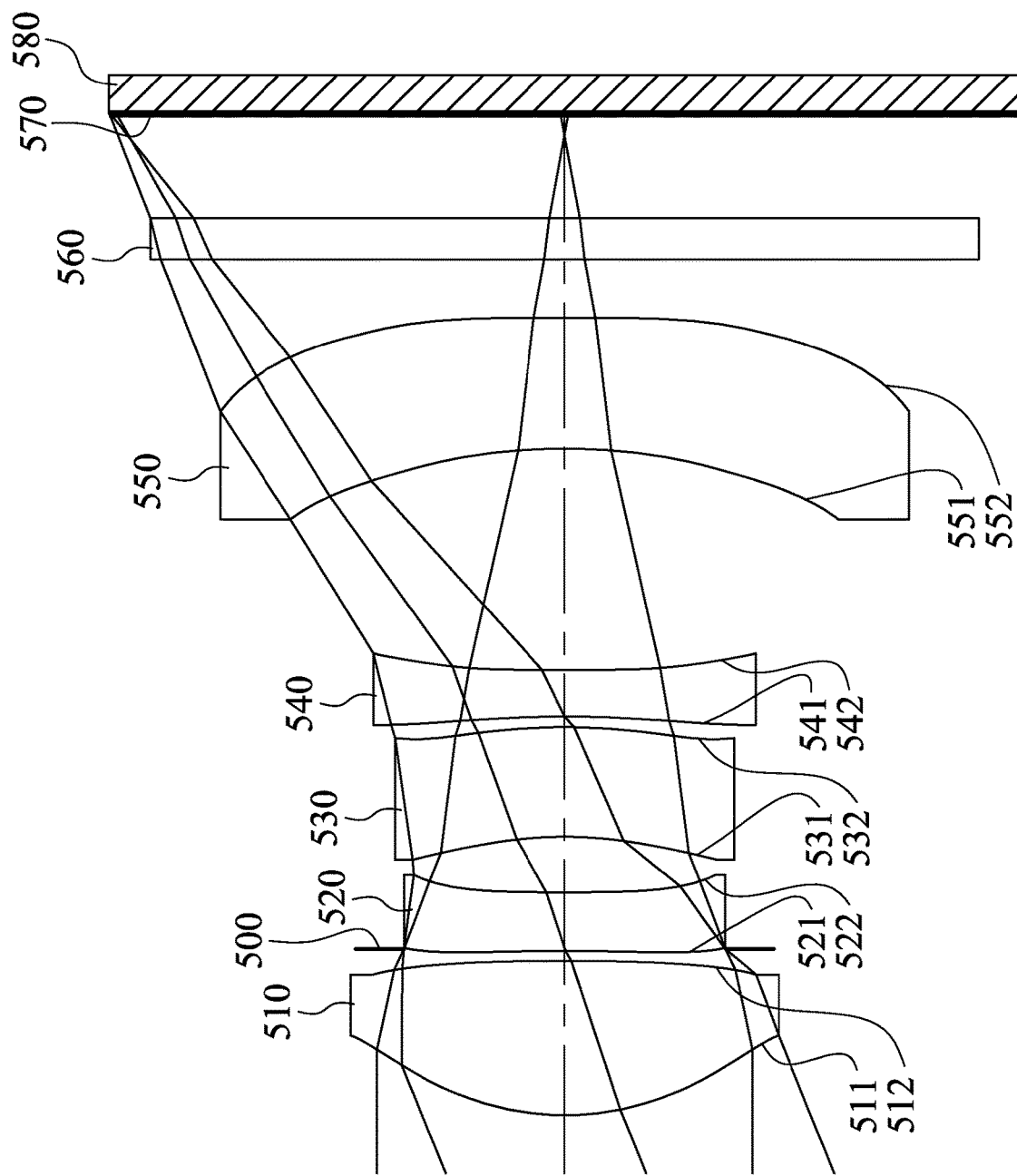
FIG. 9 is a schematic view of an image capturing device according to the 5th embodiment of the present disclosure.
Figure 10:
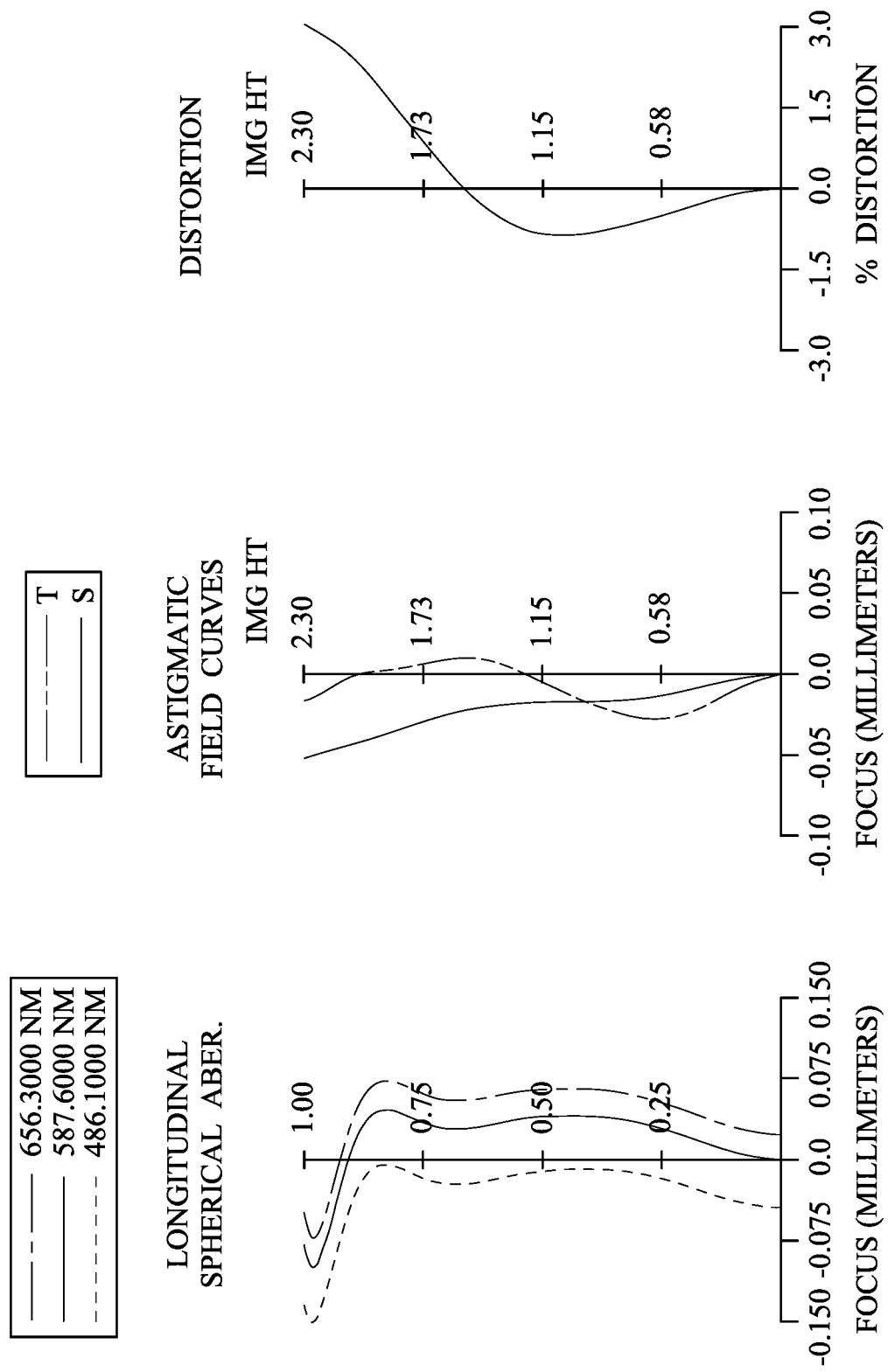
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an image capturing lens assembly (its reference numeral is omitted) and an image sensor 580. The image capturing lens assembly includes, in order from an object side to an image side, a first lens element 510, an aperture stop 500, a second lens element 520, a third lens element 530, a fourth lens element 540, a fifth lens element 550, an IR-cut filter 560 and an image surface 570, wherein the image sensor 580 is disposed on the image surface 570 of the image capturing lens assembly. The image capturing lens assembly has a total of five lens elements (510-550) with refractive power. There is an air space between any two of the first lens element 510, the second lens element 520, the third lens element 530, the fourth lens element 540 and the fifth lens element 550 that are adjacent to each other.

The first lens element 510 with positive refractive power has a convex object-side surface 511 and a convex image-side surface 512. The first lens element 510 is made of plastic material and has the object-side surface 511 and the image-side surface 512 being both aspheric. Furthermore, the object-side surface 511 of the first lens element 510 has at least one inflection point.

The second lens element 520 with negative refractive power has a concave object-side surface 521 and a concave image-side surface 522. The second lens element 520 is made of plastic material and has the object-side surface 521 and the image-side surface 522 being both aspheric. Furthermore, the object-side surface 521 of the second lens element 520 has at least one inflection point.

The third lens element 530 with negative refractive power has a concave object-side surface 531 and a convex image-side surface 532. The third lens element 530 is made of plastic material and has the object-side surface 531 and the image-side surface 532 being both aspheric. Furthermore, the image-side surface 532 of the third lens element 530 has at least one inflection point.

The fourth lens element 540 with negative refractive power has a concave object-side surface 541 and a convex image-side surface 542. The fourth lens element 540 is made of plastic material and has the object-side surface 541 and the image-side surface 542 being both aspheric. Furthermore, the object-side surface 541 and the image-side surface 542 of the fourth lens element 540 both have at least one inflection point.

The fifth lens element 550 with negative refractive power has a concave object-side surface 551 and a concave image-side surface 552. The fifth lens element 550 is made of plastic material and has the object-side surface 551 and the image-side surface 552 being both aspheric. Furthermore, the image-side surface 552 of the fifth lens element 550 has at least one inflection point.

Moreover, the refractive power of the first lens element 510 is stronger than the refractive power of the second lens element 520, the third lens element 530, the fourth lens element 540 and the fifth lens element 550.

The IR-cut filter 560 is made of glass material and disposed between the fifth lens element 550 and the image surface 570, and will not affect a focal length of the image capturing lens assembly.

The detailed optical data of the 5th embodiment are shown in Table 9 and the aspheric surface data are shown in Table 10 below.

TABLE 9

5th Embodiment
f = 5.48 mm, Fno = 2.85, HFOV = 22.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.421 | ASP | 0.790 | Plastic | 1.544 | 55.9 | 2.49 |
| 2 | | −23.256 | ASP | 0.062 | | | | |
| 3 | Ape. Stop | Plano | | −0.010 | | | | |
| 4 | Lens 2 | −13.528 | ASP | 0.300 | Plastic | 1.544 | 55.9 | −14.77 |
| 5 | | 19.941 | ASP | 0.286 | | | | |
| 6 | Lens 3 | −2.201 | ASP | 0.562 | Plastic | 1.650 | 21.4 | −10.64 |
| 7 | | −3.554 | ASP | 0.054 | | | | |
| 8 | Lens 4 | −5.571 | ASP | 0.239 | Plastic | 1.544 | 55.9 | −10.89 |
| 9 | | −95.115 | ASP | 1.134 | | | | |
| 10 | Lens 5 | −3.456 | ASP | 0.673 | Plastic | 1.535 | 55.7 | −6.34 |
| 11 | | 189.012 | ASP | 0.300 | | | | |
| 12 | IR-cut filter | Plano | | 0.210 | Glass | 1.517 | 64.2 | — |
| 13 | | Plano | | 0.535 | | | | |
| 14 | Image | Piano | | — | | | | |

Note:
Reference wavelength is 587.6 nm (d-line).

TABLE 10

Aspheric Coefficients

| Surface # | 1 | 2 | 4 | 5 | 6 |
|---|---|---|---|---|---|
| k= | −6.5843E+00 | −9.0000E+01 | 2.2640E+01 | 6.3815E+01 | −1.7588E+01 |
| A4= | 2.5894E−01 | −1.0217E−01 | −2.0156E−02 | 1.4128E−01 | −1.4730E−01 |
| A6= | −2.4881E−01 | 1.2154E−01 | 1.7066E−01 | 1.9159E−03 | 2.3453E−01 |
| A8= | 2.4474E−01 | −3.7263E−02 | 6.1821E−01 | 1.1783E+00 | −3.4711E−01 |
| A10= | −1.9678E−01 | −8.1034E−02 | −2.5463E+00 | −5.2036E+00 | 8.5103E−01 |
| A12= | 9.1308E−02 | 5.2825E−02 | 3.5413E+00 | 9.4421E+00 | −7.8289E−01 |
| A14= | −2.7866E−02 | −8.4649E−03 | −1.7114E+00 | −5.8941E+00 | |

| Surface # | 7 | 8 | 9 | 10 | 11 |
|---|---|---|---|---|---|
| k= | −4.3439E+01 | −7.8606E+01 | 9.0000E+01 | −5.5880E+01 | −7.5487E+01 |
| A4= | −3.1510E−01 | −1.6153E−01 | 1.7489E−01 | −1.9721E−01 | −1.0440E−01 |
| A6= | 1.4649E+00 | 1.1573E+00 | 1.9240E−01 | 1.7009E−01 | 2.3405E−02 |
| A8= | −3.6267E+00 | −2.7179E+00 | −9.4358E−01 | −5.5421E−02 | 1.4506E−02 |
| A10= | 4.8910E+00 | 1.7319E+00 | 1.1951E+00 | 1.3670E−03 | −9.8563E−03 |
| A12= | −2.4494E+00 | 1.6939E+00 | −6.7037E−01 | −1.7526E−03 | 1.8367E−03 |
| A14= | | −1.8073E+00 | 1.4654E−01 | 1.2019E−03 | −1.1817E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.48 | f4/f5 | 1.72 |
| Fno | 2.85 | f12/f45 | −0.77 |
| HFOV [deg.] | 22.0 | (f/R1) − (f/R2) + ((f × CT1)/(R1 × R2)) | 3.96 |
| Nmax | 1.650 | tan (2 × HFOV) | 0.97 |
| V4 + V5 | 111.6 | SD/TD | 0.79 |
| T34/T45 | 0.05 | f/ImgH | 2.39 |
| f/R1 | 3.86 | EPD/ImgH | 0.84 |
| (R1 + R2)/(R1 − R2) | −0.88 | TL [mm] | 5.13 |
| (R8 + R9)/(R8 − R9) | 1.08 | TL/f | 0.94 |
| f1/f4 | −0.23 | TL/ImgH | 2.24 |

Moreover, as shown in Table 9, when an axial distance between the first lens element 510 and the second lens element 520 is T12, an axial distance between the second lens element 520 and the third lens element 530 is T23, an axial distance between the third lens element 530 and the fourth lens element 540 is T34, and an axial distance between the fourth lens element 540 and the fifth lens element 550 is T45, T45 is greater than T12, T23 and T34.

6th Embodiment

Figure 11:
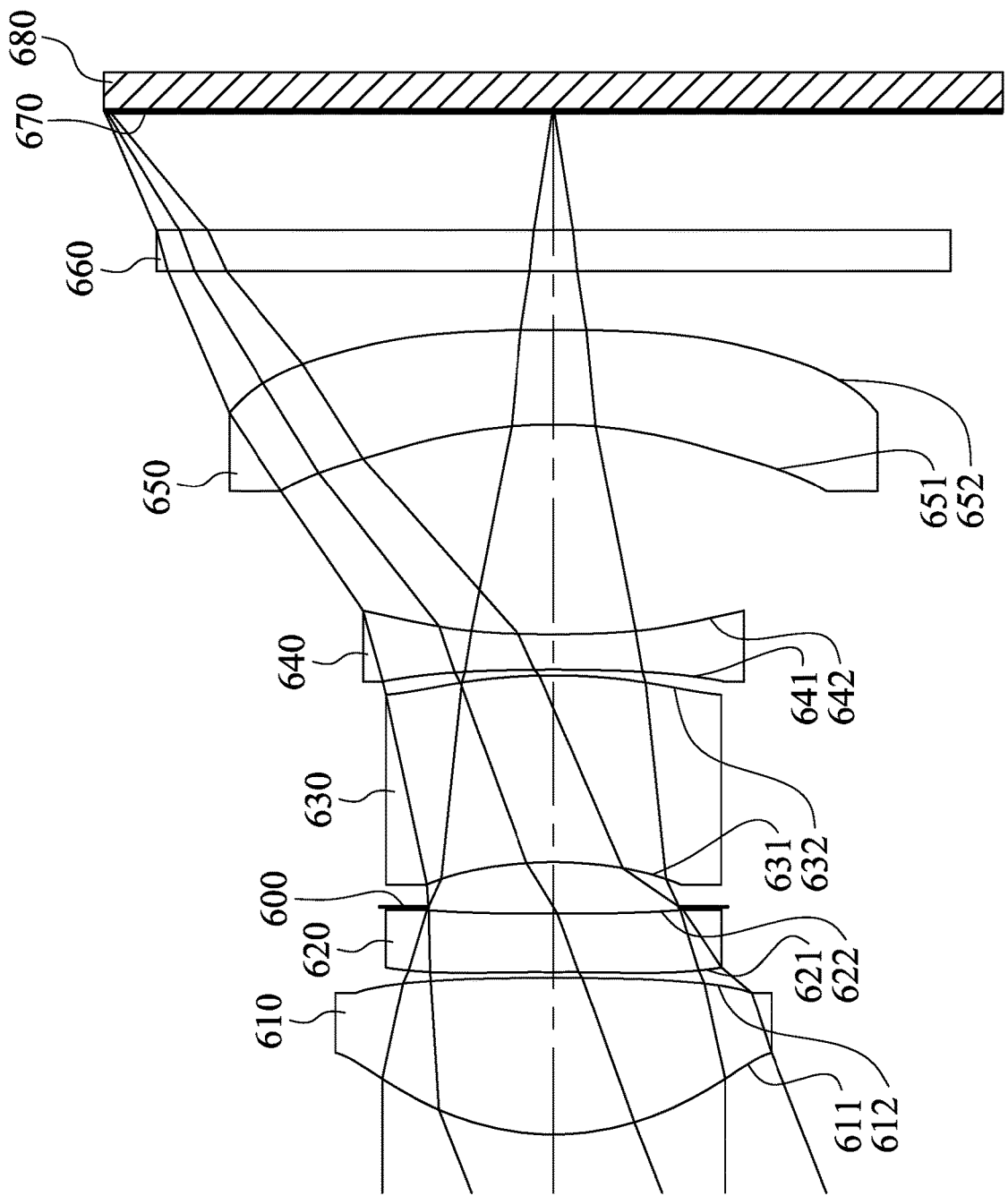
FIG. 11 is a schematic view of an image capturing device according to the 6th embodiment of the present disclosure.
Figure 12:
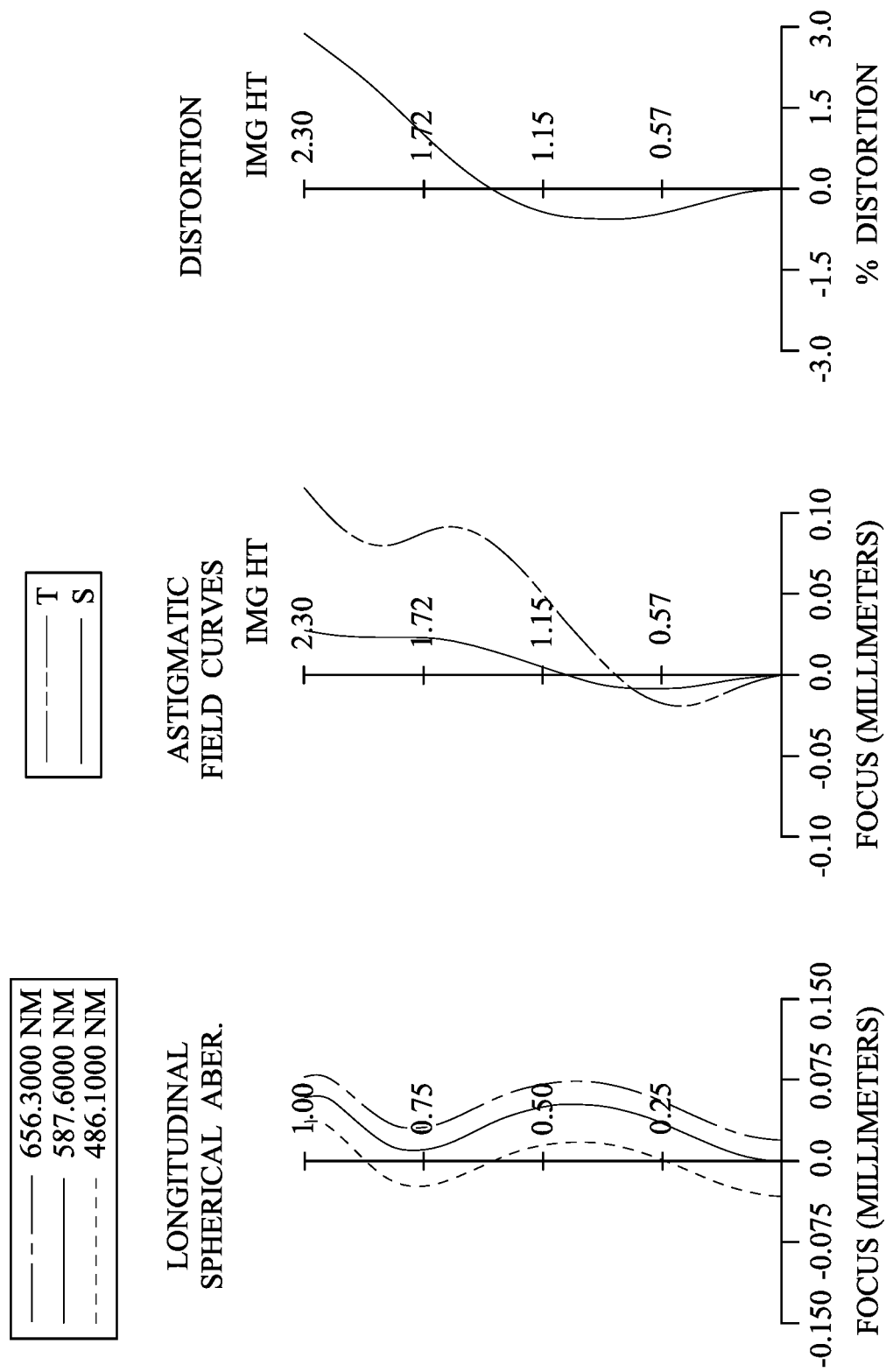
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an image capturing lens assembly (its reference numeral is omitted) and an image sensor 680. The image capturing lens assembly includes, in order from an object side to an image side, a first lens element 610, a second lens element 620, an aperture stop 600, a third lens element 630, a fourth lens element 640, a fifth lens element 650, an IR-cut filter 660 and an image surface 670, wherein the image sensor 680 is disposed on the image surface 670 of the image capturing lens assembly. The image capturing lens assembly has a total of five lens elements (610-650) with refractive power. There is an air space between any two of the first lens element 610, the second lens element 620, the third lens element 630, the fourth lens element 640 and the fifth lens element 650 that are adjacent to each other.

The first lens element 610 with positive refractive power has a convex object-side surface 611 and a convex image-side surface 612. The first lens element 610 is made of plastic material and has the object-side surface 611 and the image-side surface 612 being both aspheric. Furthermore, the object-side surface 611 of the first lens element 610 has at least one inflection point.

The second lens element 620 with negative refractive power has a concave object-side surface 621 and a concave image-side surface 622. The second lens element 620 is made of plastic material and has the object-side surface 621 and the image-side surface 622 being both aspheric. Furthermore, the object-side surface 621 and the image-side surface 622 of the second lens element 620 both have at least one inflection point.

The third lens element 630 with negative refractive power has a concave object-side surface 631 and a convex image-side surface 632. The third lens element 630 is made of plastic material and has the object-side surface 631 and the image-side surface 632 being both aspheric. Furthermore, the image-side surface 632 of the third lens element 630 has at least one inflection point.

The fourth lens element 640 with negative refractive power has a concave object-side surface 641 and a concave image-side surface 642. The fourth lens element 640 is made of plastic material and has the object-side surface 641 and the image-side surface 642 being both aspheric.

The fifth lens element 650 with negative refractive power has a concave object-side surface 651 and a convex image-side surface 652. The fifth lens element 650 is made of plastic material and has the object-side surface 651 and the image-side surface 652 being both aspheric.

Moreover, the refractive power of the first lens element 610 is stronger than the refractive power of the second lens element 620, the third lens element 630, the fourth lens element 640 and the fifth lens element 650.

The IR-cut filter 660 is made of glass material and disposed between the fifth lens element 650 and the image surface 670, and will not affect a focal length of the image capturing lens assembly.

The detailed optical data of the 6th embodiment are shown in Table 11 and the aspheric surface data are shown in Table 12 below.

TABLE 11

6th Embodiment
f = 5.63 mm, Fno = 3.20, HFOV = 21.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.420 | ASP | 0.805 | Plastic | 1.544 | 55.9 | 2.51 |
| 2 | | −29.294 | ASP | 0.030 | | | | |
| 3 | Lens 2 | −26.105 | ASP | 0.300 | Plastic | 1.544 | 55.9 | −34.30 |
| 4 | | 65.746 | ASP | 0.034 | | | | |
| 5 | Ape. Stop | Plano | | 0.230 | | | | |
| 6 | Lens 3 | −2.060 | ASP | 0.960 | Plastic | 1.650 | 21.4 | −10.78 |
| 7 | | −3.454 | ASP | 0.030 | | | | |
| 8 | Lens 4 | −11.175 | ASP | 0.180 | Plastic | 1.544 | 55.9 | −8.14 |
| 9 | | 7.375 | ASP | 1.079 | | | | |
| 10 | Lens 5 | −2.624 | ASP | 0.486 | Plastic | 1.535 | 55.7 | −6.16 |
| 11 | | −13.737 | ASP | 0.300 | | | | |
| 12 | IR-cut filter | Plano | | 0.210 | Glass | 1.517 | 64.2 | — |
| 13 | | Plano | | 0.613 | | | | |
| 14 | Image | Plano | | — | | | | |

Note:
Reference wavelength is 587.6 nm (d-line).

TABLE 12

Aspheric Coefficients

| Surface # | 1 | 2 | 3 | 4 | 6 |
|---|---|---|---|---|---|
| k= | −6.5525E+00 | −9.0000E+01 | 9.0000E+01 | −9.0000E+01 | −1.1820E+01 |
| A4= | 2.5908E−01 | −1.0176E−01 | −2.2507E−02 | 9.9487E−02 | −1.7711E−01 |
| A6= | −2.4860E−01 | 1.2149E−01 | 1.5894E−01 | −4.6635E−02 | 1.4276E−01 |
| A8= | 2.4502E−01 | −3.7443E−02 | 6.1127E−01 | 1.0950E+00 | −4.0957E−01 |
| A10= | −1.9651E−01 | −8.1243E−02 | −2.5563E+00 | −5.3420E+00 | 7.8243E−01 |
| A12= | 9.1530E−02 | 5.2610E−02 | 3.5226E+00 | 9.2193E+00 | −1.3300E+00 |
| A14= | −2.7692E−02 | −8.6777E−03 | −1.7175E+00 | −6.2623E+00 | |

| Surface # | 7 | 8 | 9 | 10 | 11 |
|---|---|---|---|---|---|
| k= | −2.7302E+01 | 6.3204E+01 | −3.0076E+01 | −2.9580E+01 | −7.5487E+01 |
| A4= | −3.4405E−01 | −1.9135E−01 | 1.5934E−01 | −1.8552E−01 | −8.2054E−02 |
| A6= | 1.4370E+00 | 1.1529E+00 | 1.8628E−01 | 1.7365E−01 | 1.8673E−02 |
| A8= | −3.6422E+00 | −2.7328E+00 | −9.5543E−01 | −5.4917E−02 | 1.4135E−02 |
| A10= | 4.8817E+00 | 1.7090E+00 | 1.1924E+00 | 1.2614E+00 | −9.8563E−03 |
| A12= | −2.4609E+00 | 1.6877E+00 | −6.5961E−01 | −1.8595E−03 | 1.8156E−03 |
| A14= | | −1.8135E+00 | 1.4384E−01 | 1.1460E−03 | −1.2427E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.63 | f4/f5 | 1.32 |
| Fno | 3.20 | f12/f45 | −0.81 |
| HFOV [deg.] | 21.5 | (f/R1) − (f/R2) + ((f × CT1)/(R1 × R2)) | 4.05 |
| Nmax | 1.650 | tan (2 × HFOV) | 0.93 |
| V4 + V5 | 111.6 | SD/TD | 0.72 |
| T34/T45 | 0.03 | f/ImgH | 2.45 |
| f/R1 | 3.97 | EPD/ImgH | 0.77 |
| (R1 + R2)/(R1 − R2) | −0.91 | TL [mm] | 5.26 |
| (R8 + R9)/(R8 − R9) | 0.48 | TL/f | 0.93 |
| f1/f4 | −0.31 | TL/ImgH | 2.29 |

Moreover, as shown in Table 11, when an axial distance between the first lens element 610 and the second lens element 620 is T12, an axial distance between the second lens element 620 and the third lens element 630 is T23, an axial distance between the third lens element 630 and the fourth lens element 640 is T34, and an axial distance between the fourth lens element 640 and the fifth lens element 650 is T45, T45 is greater than T12, T23 and T34.

7th Embodiment

Figure 13:
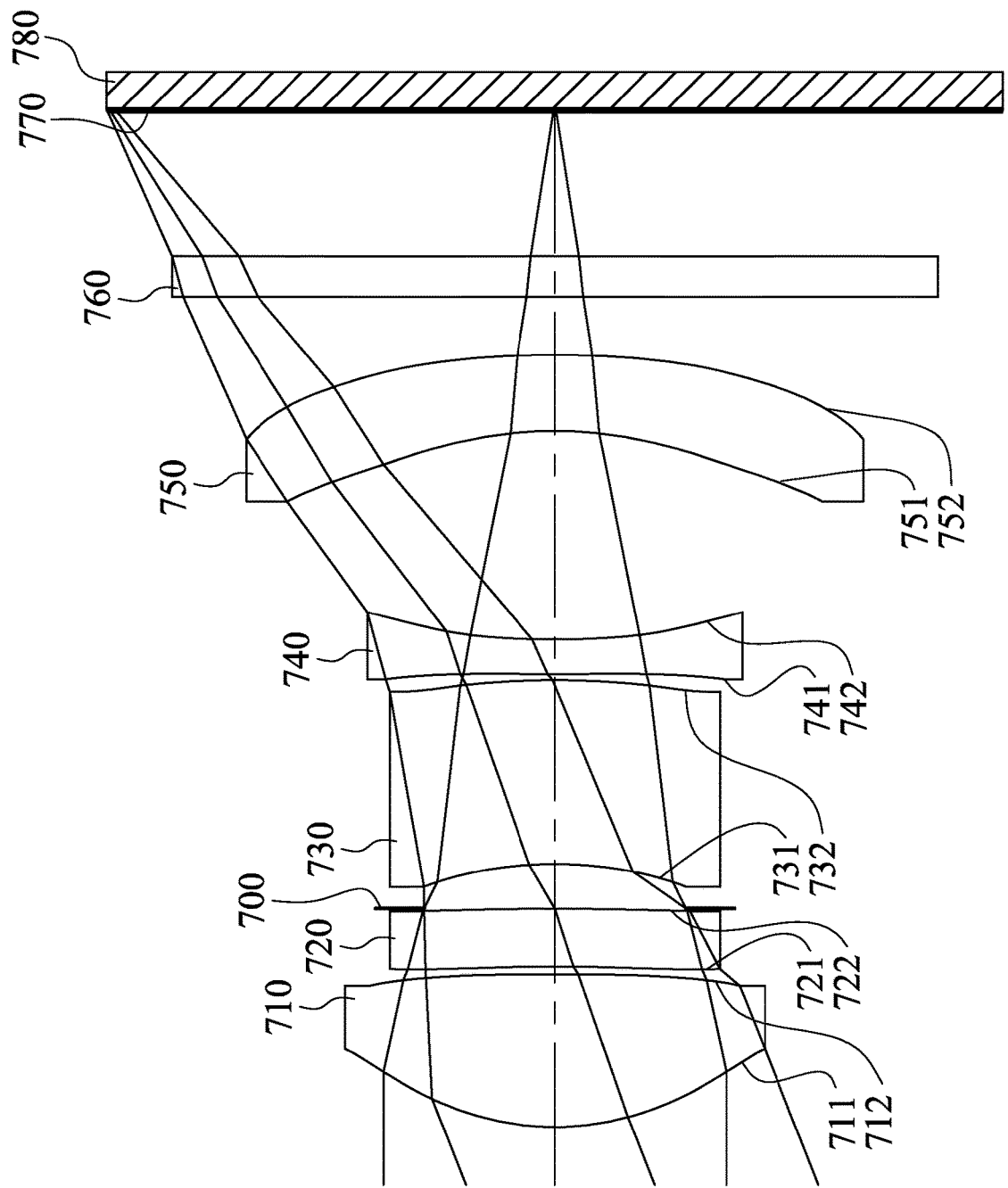
FIG. 13 is a schematic view of an image capturing device according to the 7th embodiment of the present disclosure.
Figure 14:
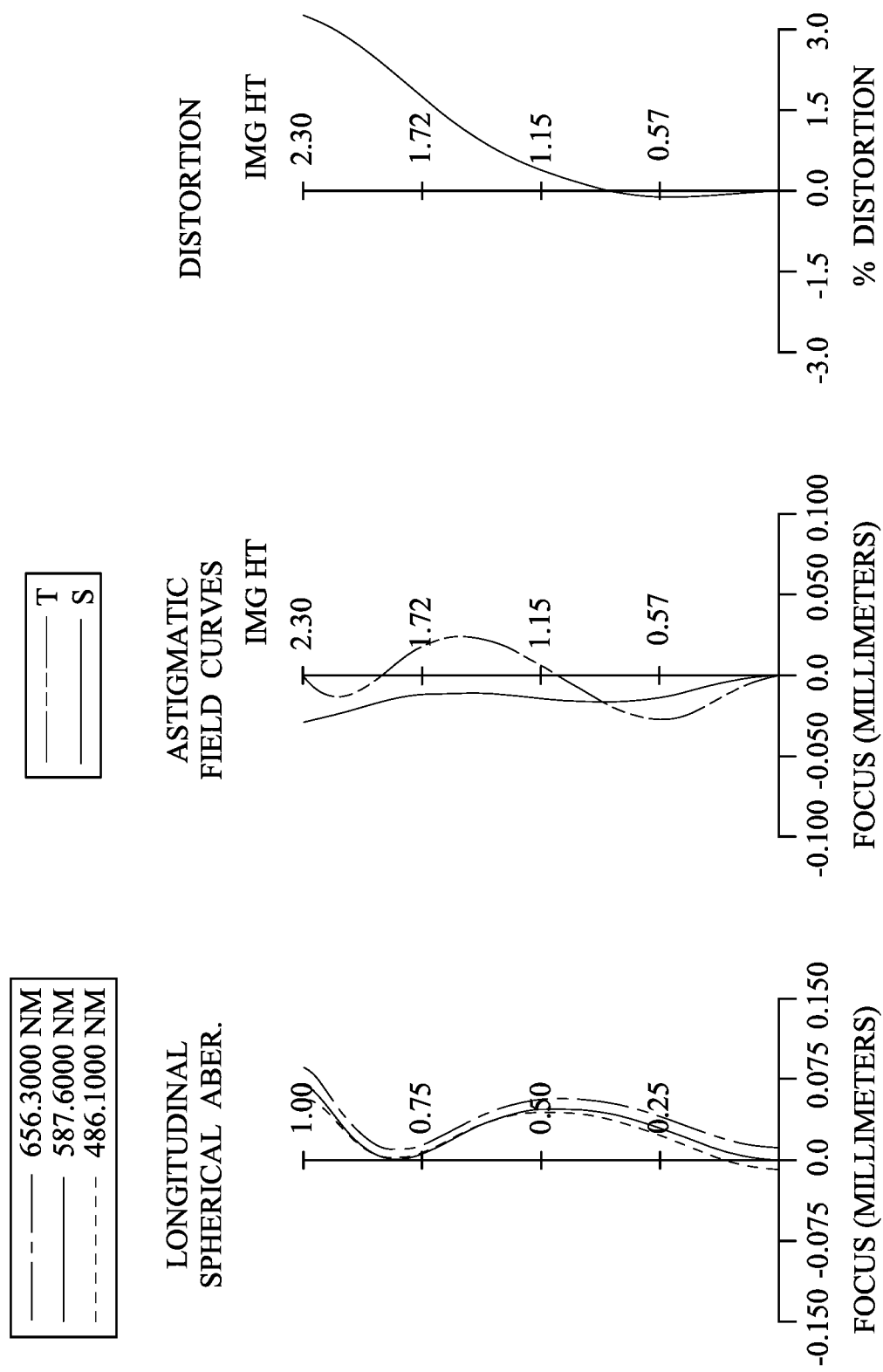
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an image capturing lens assembly (its reference numeral is omitted) and an image sensor 780. The image capturing lens assembly includes, in order from an object side to an image side, a first lens element 710, a second lens element 720, an aperture stop 700, a third lens element 730, a fourth lens element 740, a fifth lens element 750, an IR-cut filter 760 and an image surface 770, wherein the image sensor 780 is disposed on the image surface 770 of the image capturing lens assembly. The image capturing lens assembly has a total of five lens elements (710-750) with refractive power. There is an air space between any two of the first lens element 710, the second lens element 720, the third lens element 730, the fourth lens element 740 and the fifth lens element 750 that are adjacent to each other.

The first lens element 710 with positive refractive power has a convex object-side surface 711 and a convex image-side surface 712. The first lens element 710 is made of plastic material and has the object-side surface 711 and the image-side surface 712 being both aspheric. Furthermore, the object-side surface 711 of the first lens element 710 has at least one inflection point.

The second lens element 720 with positive refractive power has a concave object-side surface 721 and a convex image-side surface 722. The second lens element 720 is made of plastic material and has the object-side surface 721 and the image-side surface 722 being both aspheric. Furthermore, the object-side surface 721 and the image-side surface 722 of the second lens element 720 both have at least one inflection point.

The third lens element 730 with negative refractive power has a concave object-side surface 731 and a convex image-side surface 732. The third lens element 730 is made of plastic material and has the object-side surface 731 and the image-side surface 732 being both aspheric. Furthermore, the image-side surface 732 of the third lens element 730 has at least one inflection point.

The fourth lens element 740 with negative refractive power has a convex object-side surface 741 and a concave image-side surface 742. The fourth lens element 740 is made of plastic material and has the object-side surface 741 and the image-side surface 742 being both aspheric. Furthermore, the object-side surface 741 of the fourth lens element 740 has at least one inflection point.

The fifth lens element 750 with negative refractive power has a concave object-side surface 751 and a convex image-side surface 752. The fifth lens element 750 is made of plastic material and has the object-side surface 751 and the image-side surface 752 being both aspheric. Furthermore, the object-side surface 751 of the fifth lens element 750 has at least one inflection point.

Moreover, the refractive power of the first lens element 710 is stronger than the refractive power of the second lens element 720, the third lens element 730, the fourth lens element 740 and the fifth lens element 750.

The IR-cut filter 760 is made of glass material and disposed between the fifth lens element 750 and the image surface 770, and will not affect a focal length of the image capturing lens assembly.

The detailed optical data of the 7th embodiment are shown in Table 13 and the aspheric surface data are shown in Table 14 below.

TABLE 13

7th Embodiment
f = 5.60 mm, Fno = 3.20, HFOV = 21.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.442 | ASP | 0.788 | Plastic | 1.544 | 55.9 | 2.55 |
| 2 | | −29.749 | ASP | 0.040 | | | | |
| 3 | Lens 2 | −10.288 | ASP | 0.300 | Plastic | 1.640 | 23.3 | 126.39 |
| 4 | | −9.231 | ASP | 0.000 | | | | |
| 5 | Ape. Stop | Plano | | 0.230 | | | | |
| 6 | Lens 3 | −2.086 | ASP | 0.950 | Plastic | 1.650 | 21.4 | −5.80 |
| 7 | | −5.508 | ASP | 0.031 | | | | |
| 8 | Lens 4 | 21.019 | ASP | 0.180 | Plastic | 1.544 | 55.9 | −13.79 |
| 9 | | 5.513 | ASP | 1.077 | | | | |
| 10 | Lens 5 | −2.118 | ASP | 0.394 | Plastic | 1.544 | 55.9 | −6.52 |
| 11 | | −5.605 | ASP | 0.300 | | | | |
| 12 | IR-cut filter | Plano | | 0.210 | Glass | 1.517 | 64.2 | — |
| 13 | | Plano | | 0.753 | | | | |
| 14 | Image | Plano | | — | | | | |

Note:
Reference wavelength is 587.6 nm (d-line).

TABLE 14

Aspheric Coefficients

| Surface # | 1 | 2 | 3 | 4 | 6 |
|---|---|---|---|---|---|
| k= | −6.7127E+00 | −5.2281E+01 | 9.0000E+01 | 8.8287E+01 | −1.3850E+01 |
| A4= | 2.5847E−01 | −1.0151E−01 | −2.6998E−02 | 9.6634E−02 | −1.5136E−01 |

TABLE 14-continued

| Aspheric Coefficients | | | | | |
|---|---|---|---|---|---|
| A6= | −2.4854E−01 | 1.2157E−01 | 1.5718E−01 | −5.7996E−02 | 1.2834E−01 |
| A8= | 2.4517E−01 | −3.7558E−02 | 6.1159E−01 | 1.0863E+00 | −4.6720E−01 |
| A10= | −1.9644E−01 | −8.1387E−02 | −2.5595E+00 | −5.3241E+00 | 8.6315E−01 |
| A12= | 9.1573E−02 | 5.2471E−02 | 3.5140E+00 | 9.3055E+00 | −1.0375E+00 |
| A14= | −2.7622E−02 | −8.7886E−03 | −1.7306E+00 | −6.0383E+00 | |

| Surface # | 7 | 8 | 9 | 10 | 11 |
|---|---|---|---|---|---|
| k= | −9.0000E+01 | −9.0000E+01 | −2.6543E+01 | −1.8953E+01 | −7.5487E+01 |
| A4= | −3.4674E−01 | −2.5500E−01 | 1.6162E−01 | −1.8816E−01 | −8.2623E−02 |
| A6= | 1.4297E+00 | 1.1732E+00 | 1.9118E−01 | 1.7532E−01 | 1.7771E−02 |
| A8= | −3.6383E+00 | −2.7297E+00 | −9.5181E−01 | −5.4352E−02 | 1.4054E−02 |
| A10= | 4.9030E+00 | 1.7106E+00 | 1.1926E+00 | 1.4108E−03 | −9.8563E−03 |
| A12= | −2.4175E+00 | 1.6990E+00 | −6.6192E−01 | −1.8336E−03 | 1.7924E−03 |
| A14= | | −1.7889E+00 | 1.4074E−01 | 1.1390E−03 | −1.3997E−04 |

In the 7th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.60 | f4/f5 | 2.12 |
| Fno | 3.20 | f12/f45 | −0.60 |
| HFOV [deg.] | 21.5 | (f/R1) − (f/R2) + ((f × CT1)/(R1 × R2)) | 3.97 |
| Nmax | 1.650 | tan (2 × HFOV) | 0.93 |
| V4 + V5 | 111.8 | SD/TD | 0.72 |
| T34/T45 | 0.03 | f/ImgH | 2.44 |
| f/R1 | 3.89 | EPD/ImgH | 0.76 |
| (R1 + R2)/(R1 − R2) | −0.91 | TL [mm] | 5.25 |
| (R8 + R9)/(R8 − R9) | 0.44 | TL/f | 0.94 |
| f1/f4 | −0.18 | TL/ImgH | 2.29 |

Furthermore, as shown in Table 13, the second lens element 720 has positive refractive power, and the Abbe number thereof is less than 30.

Moreover, as shown in Table 13, when an axial distance between the first lens element 710 and the second lens element 720 is T12, an axial distance between the second lens element 720 and the third lens element 730 is T23, an axial distance between the third lens element 730 and the fourth lens element 740 is T34, and an axial distance between the fourth lens element 740 and the fifth lens element 750 is T45, T45 is greater than T12, T23 and T34.

8th Embodiment

Figure 15:
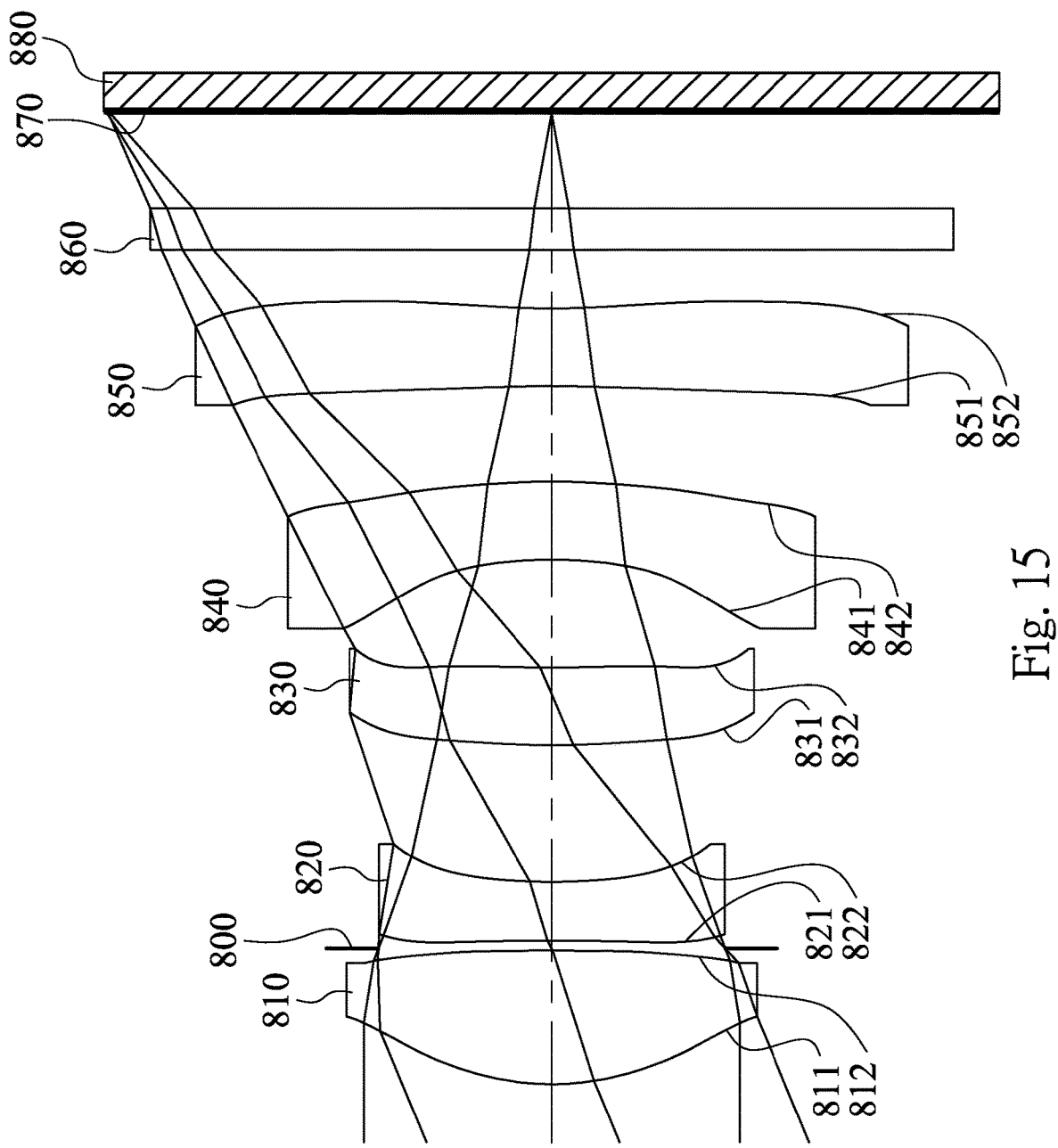
FIG. 15 is a schematic view of an image capturing device according to the 8th embodiment of the present disclosure.
Figure 16:
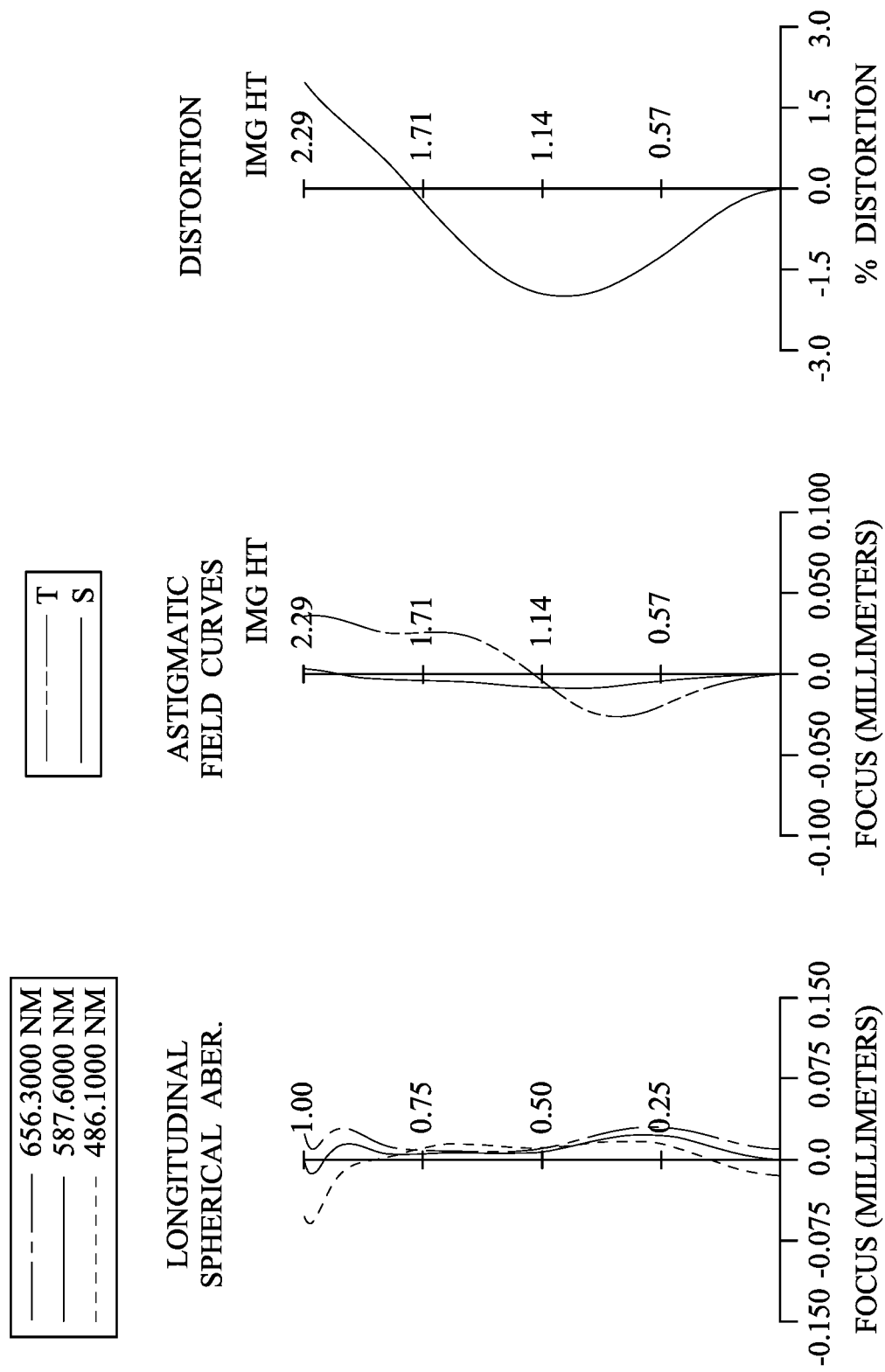
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes an image capturing lens assembly (its reference numeral is omitted) and an image sensor 880. The image capturing lens assembly includes, in order from an object side to an image side, a first lens element 810, an aperture stop 800, a second lens element 820, a third lens element 830, a fourth lens element 840, a fifth lens element 850, an IR-cut filter 860 and an image surface 870, wherein the image sensor 880 is disposed on the image surface 870 of the image capturing lens assembly. The image capturing lens assembly has a total of five lens elements (810-850) with refractive power. There is an air space between any two of the first lens element 810, the second lens element 820, the third lens element 830, the fourth lens element 840 and the fifth lens element 850 that are adjacent to each other.

The first lens element 810 with positive refractive power has a convex object-side surface 811 and a convex image-side surface 812. The first lens element 810 is made of plastic material and has the object-side surface 811 and the image-side surface 812 being both aspheric. Furthermore, the object-side surface 811 of the first lens element 810 has at least one inflection point.

The second lens element 820 with negative refractive power has a concave object-side surface 821 and a concave image-side surface 822. The second lens element 820 is made of plastic material and has the object-side surface 821 and the image-side surface 822 being both aspheric. Furthermore, the object-side surface 821 of the second lens element 820 has at least one inflection point.

The third lens element 830 with positive refractive power has a convex object-side surface 831 and a concave image-side surface 832. The third lens element 830 is made of plastic material and has the object-side surface 831 and the image-side surface 832 being both aspheric. Furthermore, the image-side surface 832 of the third lens element 830 has at least one inflection point.

The fourth lens element 840 with negative refractive power has a concave object-side surface 841 and a convex image-side surface 842. The fourth lens element 840 is made of plastic material and has the object-side surface 841 and the image-side surface 842 being both aspheric. Furthermore, the object-side surface 841 and the image-side surface 842 of fourth lens element 840 both have at least one inflection point.

The fifth lens element 850 with negative refractive power has a concave object-side surface 851 and a concave image-side surface 852. The fifth lens element 850 is made of plastic material and has the object-side surface 851 and the image-side surface 852 being both aspheric. Furthermore, the object-side surface 851 and the image-side surface 852 of the fifth lens element 850 both have at least one inflection point.

Moreover, the refractive power of the first lens element 810 is stronger than the refractive power of the second lens element 820, the third lens element 830, the fourth lens element 840 and the fifth lens element 850.

The IR-cut filter 860 is made of glass material and disposed between the fifth lens element 850 and the image surface 870, and will not affect a focal length of the image capturing lens assembly.

The detailed optical data of the 8th embodiment are shown in Table 15 and the aspheric surface data are shown in Table 16 below.

TABLE 15

8th Embodiment
f = 5.39 mm, Fno = 2.80, HFOV = 22.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.429 | ASP | 0.684 | Plastic | 1.544 | 55.9 | 2.59 |
| 2 | | −77.885 | ASP | 0.010 | | | | |
| 3 | Ape. Stop | Plano | | 0.040 | | | | |
| 4 | Lens 2 | −39.429 | ASP | 0.300 | Plastic | 1.639 | 23.5 | −4.23 |
| 5 | | 2.913 | ASP | 0.703 | | | | |
| 6 | Lens 3 | 4.201 | ASP | 0.398 | Plastic | 1.639 | 23.5 | 14.47 |
| 7 | | 7.413 | ASP | 0.555 | | | | |
| 8 | Lens 4 | −2.350 | ASP | 0.400 | Plastic | 1.544 | 55.9 | −20.10 |
| 9 | | −3.173 | ASP | 0.488 | | | | |
| 10 | Lens 5 | −8.155 | ASP | 0.401 | Plastic | 1.535 | 55.7 | −4.66 |
| 11 | | 3.656 | ASP | 0.300 | | | | |
| 12 | IR-cut filter | Plano | | 0.210 | Glass | 1.517 | 64.2 | — |
| 13 | | Plano | | 0.500 | | | | |
| 14 | Image | Plano | | — | | | | |

Note:
Reference wavelength is 587.6 nm (d-line).

TABLE 16

Aspheric Coefficients

| Surface # | 1 | 2 | 4 | 5 | 6 |
|---|---|---|---|---|---|
| k= | −6.5467E+00 | 1.0013E+01 | 6.9603E+01 | 1.0035E+01 | −2.4360E+01 |
| A4= | 2.5418E−01 | −2.3540E−01 | −2.1386E−01 | −4.9082E−02 | −7.7910E−02 |
| A6= | −2.4437E−01 | 6.1158E−01 | 8.9229E−01 | 3.3411E−01 | −1.2983E−01 |
| A8= | 2.0880E−01 | −1.3574E+00 | −1.8740E+00 | −2.7399E−01 | 6.0743E−01 |
| A10= | −1.8718E−01 | 2.1793E+00 | 3.1607E+00 | −1 5385E−01 | −4.4051E−01 |
| A12= | 7.7978E−02 | −1.9165E+00 | −2.8719E+00 | 1.2550E+00 | 9.1836E−02 |
| A14= | −1.8478E−02 | 6.5028E−01 | 1.0092E+00 | −1.3476E+00 | |

| Surface # | 7 | 8 | 9 | 10 | 11 |
|---|---|---|---|---|---|
| k= | −3.9936E+01 | 2.2456E+00 | −1.4124E+01 | −3.0237E+01 | −9.0000E+01 |
| A4= | −1.6815E−01 | 1.0473E−01 | 3.4598E−01 | 9.1088E−02 | −5.8393E−02 |
| A6= | −6.1882E−02 | −9.0265E−01 | −1.0408E+00 | −1.3897E−01 | 2.9158E−02 |
| A8= | 2.4615E−01 | 4.7390E−01 | 1.3353E+00 | 1.1706E−01 | −5.8927E−03 |
| A10= | 2.0401E−01 | 1.6123E+00 | −8.4742E−01 | −5.3348E−02 | −7.2236E−05 |
| A12= | −1.8775E−01 | −2.0464E+00 | 2.6410E+00 | 1.2249E−02 | −2.6351E−07 |
| A14= | | 6.9585E−01 | −3.2895E−02 | −1.1540E−03 | 1.7284E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.39 | f4/f5 | 4.31 |
| Fno | 2.80 | f12/f45 | −1.35 |

| 8th Embodiment | | | |
|---|---|---|---|
| HFOV [deg.] | 22.5 | (f/R1) − (f/R2) + ((f × CT1)/(R1 × R2)) | 3.81 |
| Nmax | 1.639 | tan (2 × HFOV) | 1.00 |
| V4 + V5 | 111.6 | SD/TD | 0.83 |
| T34/T45 | 1.14 | f/ImgH | 2.36 |
| f/R1 | 3.77 | EPD/ImgH | 0.84 |
| (R1 + R2)/(R1 − R2) | −0.96 | TL [mm] | 4.99 |
| (R8 + R9)/(R8 − R9) | −2.27 | TL/f | 0.93 |
| f1/f4 | −0.13 | TL/ImgH | 2.18 |

Furthermore, as shown in Table 15, the third lens element 830 has positive refractive power, and the Abbe number thereof is less than 30.

9th Embodiment

Figure 17:
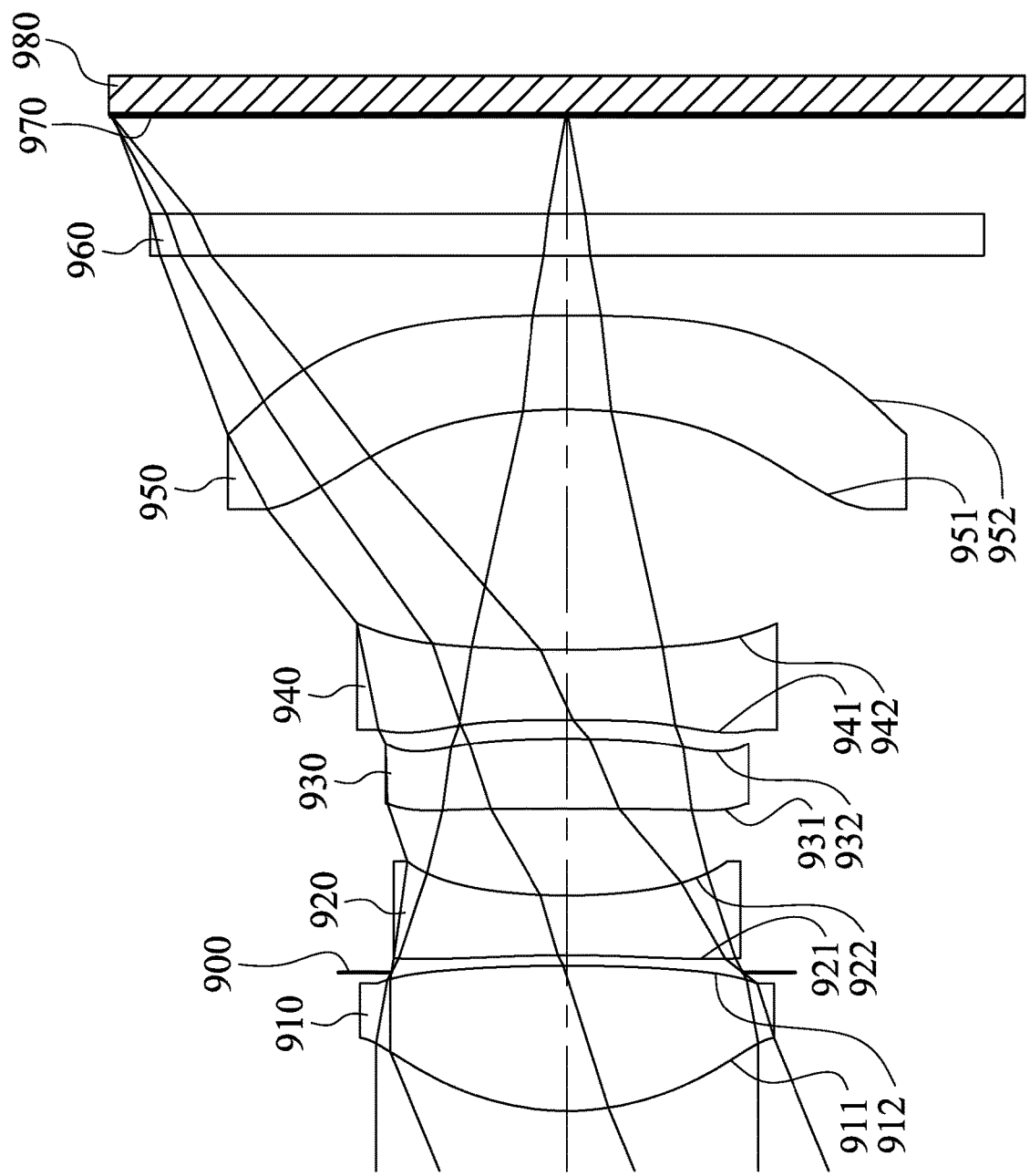
FIG. 17 is a schematic view of an image capturing device according to the 9th embodiment of the present disclosure.
Figure 18:
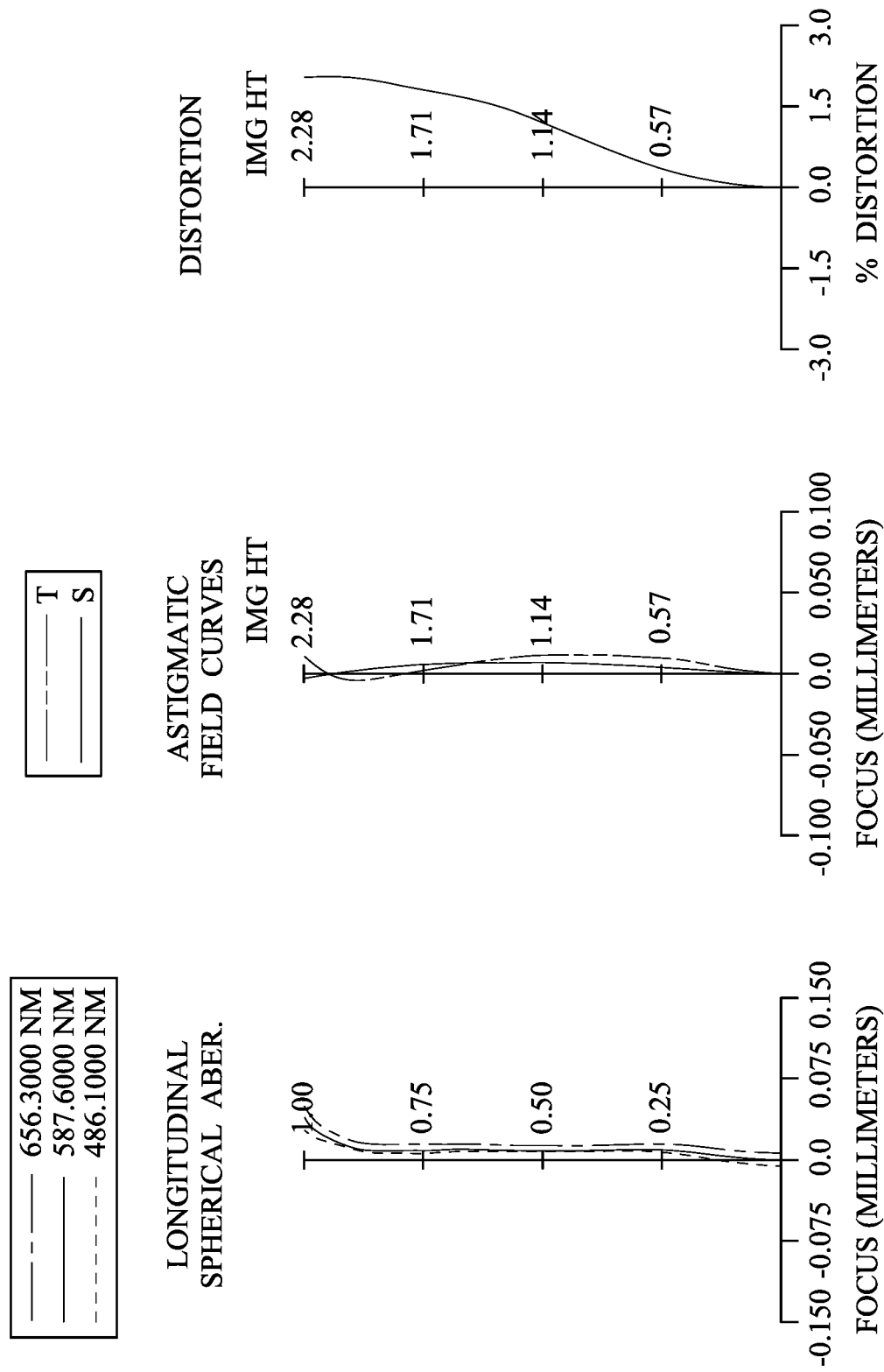
FIG. 18 shows spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows spherical aberration curves, astigmatic field curves and a distortion curve of the image capturing device according to the 9th embodiment. In FIG. 17, the image capturing device includes an image capturing lens assembly (its reference numeral is omitted) and an image sensor 980. The image capturing lens assembly includes, in order from an object side to an image side, a first lens element 910, an aperture stop 900, a second lens element 920, a third lens element 930, a fourth lens element 940, a fifth lens element 950, an IR-cut filter 960 and an image surface 970, wherein the image sensor 980 is disposed on the image surface 970 of the image capturing lens assembly. The image capturing lens assembly has a total of five lens elements (910-950) with refractive power. There is an air space between any two of the first lens element 910, the second lens element 920, the third lens element 930, the fourth lens element 940 and the fifth lens element 950 that are adjacent to each other.

The first lens element 910 with positive refractive power has a convex object-side surface 911 and a convex image-side surface 912. The first lens element 910 is made of plastic material and has the object-side surface 911 and the image-side surface 912 being both aspheric. Furthermore, the object-side surface 911 of the first lens element 910 has at least one inflection point.

The second lens element 920 with negative refractive power has a concave object-side surface 921 and a concave image-side surface 922. The second lens element 920 is made of plastic material and has the object-side surface 921 and the image-side surface 922 being both aspheric. Furthermore, the object-side surface 921 of the second lens element 920 has at least one inflection point.

The third lens element 930 with positive refractive power has a convex object-side surface 931 and a convex image-side surface 932. The third lens element 930 is made of plastic material and has the object-side surface 931 and the image-side surface 932 being both aspheric. Furthermore, the object-side surface 931 and the image-side surface 932 of the third lens element 930 both have at least one inflection point.

The fourth lens element 940 with negative refractive power has a concave object-side surface 941 and a concave image-side surface 942. The fourth lens element 940 is made of plastic material and has the object-side surface 941 and the image-side surface 942 being both aspheric. Furthermore, the object-side surface 941 of fourth lens element 940 has at least one inflection point.

The fifth lens element 950 with negative refractive power has a concave object-side surface 951 and a convex image-side surface 952. The fifth lens element 950 is made of plastic material and has the object-side surface 951 and the image-side surface 952 being both aspheric. Furthermore, the object-side surface 951 and the image-side surface 952 of the fifth lens element 950 both have at least one inflection point.

Moreover, the refractive power of the first lens element 910 is stronger than the refractive power of the second lens element 920, the third lens element 930, the fourth lens element 940 and the fifth lens element 950.

The IR-cut filter 960 is made of glass material and disposed between the fifth lens element 950 and the image surface 970, and will not affect a focal length of the image capturing lens assembly.

The detailed optical data of the 9th embodiment are shown in Table 17 and the aspheric surface data are shown in Table 18 below.

TABLE 17

9th Embodiment
f = 5.39 mm, Fno = 2.82, HFOV = 22.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.398 | ASP | 0.729 | Plastic | 1.544 | 55.9 | 2.33 |
| 2 | | −11.374 | ASP | −0.034 | | | | |
| 3 | Ape. Stop | Plano | | 0.084 | | | | |
| 4 | Lens 2 | −13.137 | ASP | 0.300 | Plastic | 1.639 | 23.5 | −3.59 |
| 5 | | 2.805 | ASP | 0.435 | | | | |
| 6 | Lens 3 | 61.197 | ASP | 0.350 | Plastic | 1.639 | 23.5 | 12.60 |
| 7 | | −9.250 | ASP | 0.096 | | | | |
| 8 | Lens 4 | −25.691 | ASP | 0.350 | Plastic | 1.544 | 55.9 | −9.90 |
| 9 | | 6.847 | ASP | 1.205 | | | | |
| 10 | Lens 5 | −2.826 | ASP | 0.471 | Plastic | 1.535 | 55.7 | −7.03 |
| 11 | | −12.041 | ASP | 0.300 | | | | |
| 12 | IR-cut filter | Plano | | 0.210 | Glass | 1.517 | 64.2 | — |
| 13 | | Plano | | 0.494 | | | | |
| 14 | Image | Plano | | — | | | | |

Note:
Reference wavelength is 587.6 nm (d-line).

TABLE 18

Aspheric Coefficients

| Surface # | 1 | 2 | 4 | 5 | 6 |
|---|---|---|---|---|---|
| k= | −5.6187E+00 | 1.0013E+01 | 6.9603E+01 | 8.6872E+00 | −2.4360E+01 |
| A4= | 2.4927E−01 | −1.9672E−01 | −2.3111E−01 | −1.1715E−01 | −1.3244E−01 |
| A6= | −2.3306E−01 | 8.1586E−01 | 1.2256E+00 | 5.5172E−01 | 2.4396E−01 |

TABLE 18-continued

| Aspheric Coefficients | | | | | |
|---|---|---|---|---|---|
| A8= | 2.5288E−01 | −1.7076E+00 | −2.7139E+00 | −1.1053E+00 | −6.4785E−01 |
| A10= | −2.1530E−01 | 1.7882E+00 | 3.3943E+00 | 1.2425E+00 | 1.3320E+00 |
| A12= | 1.0315E−01 | −9.9628E−01 | −2.2632E+00 | −3.2075E−01 | −7.3696E−01 |
| A14= | −5.3022E−02 | 2.3004E−01 | 6.5698E−01 | −1.6104E−01 | |

| Surface # | 7 | 8 | 9 | 10 | 11 |
|---|---|---|---|---|---|
| k= | 8.0367E+01 | 1.0918E+01 | −8.3513E+00 | 1.3784E+00 | −7.5487E+01 |
| A4= | −2.8444E−01 | −3.5567E−01 | −3.7359E−02 | −1.0085E−01 | −1.1199E−01 |
| A6= | 4.1139E−01 | 4.2007E−01 | 5.5524E−02 | 1.1390E−01 | 7.4741E−02 |
| A8= | −8.6588E−01 | −1.1710E+00 | −7.1449E−02 | −1.4142E−01 | −6.3162E−02 |
| A10= | 2.0179E+00 | 3.7082E+00 | 2.4250E−01 | 1.0234E−01 | 3.0262E−02 |
| A12= | −1.1727E+00 | −4.1488E+00 | −3.3161E−01 | −3.1498E−02 | −7.5352E−03 |
| A14= | | 1.5364E+00 | 1.1961E−01 | 3.5206E−03 | 7.8482E−04 |

In the 9th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.39 | f4/f5 | 1.41 |
| Fno | 2.82 | f12/f45 | −1.16 |
| HFOV [deg.] | 22.5 | (f/R1) − (f/R2) + ((f × CT1)/(R1 × R2)) | 4.08 |
| Nmax | 1.639 | tan (2 × HFOV) | 1.00 |
| V4 + V5 | 111.6 | SD/TD | 0.83 |
| T34/T45 | 0.08 | f/ImgH | 2.36 |
| f/R1 | 3.86 | EPD/ImgH | 0.84 |
| (R1 + R2)/(R1 − R2) | −0.78 | TL [mm] | 4.99 |
| (R8 + R9)/(R8 − R9) | 0.42 | TL/f | 0.93 |
| f1/f4 | −0.24 | TL/ImgH | 2.18 |

Furthermore, as shown in Table 17, the third lens element 930 has positive refractive power, and the Abbe number thereof is less than 30.

Moreover, as shown in Table 17, when an axial distance between the first lens element 910 and the second lens element 920 is T12, an axial distance between the second lens element 920 and the third lens element 930 is T23, an axial distance between the third lens element 930 and the fourth lens element 940 is T34, and an axial distance between the fourth lens element 940 and the fifth lens element 950 is T45, T45 is greater than T12, T23 and T34.

10th Embodiment

Figure 19:
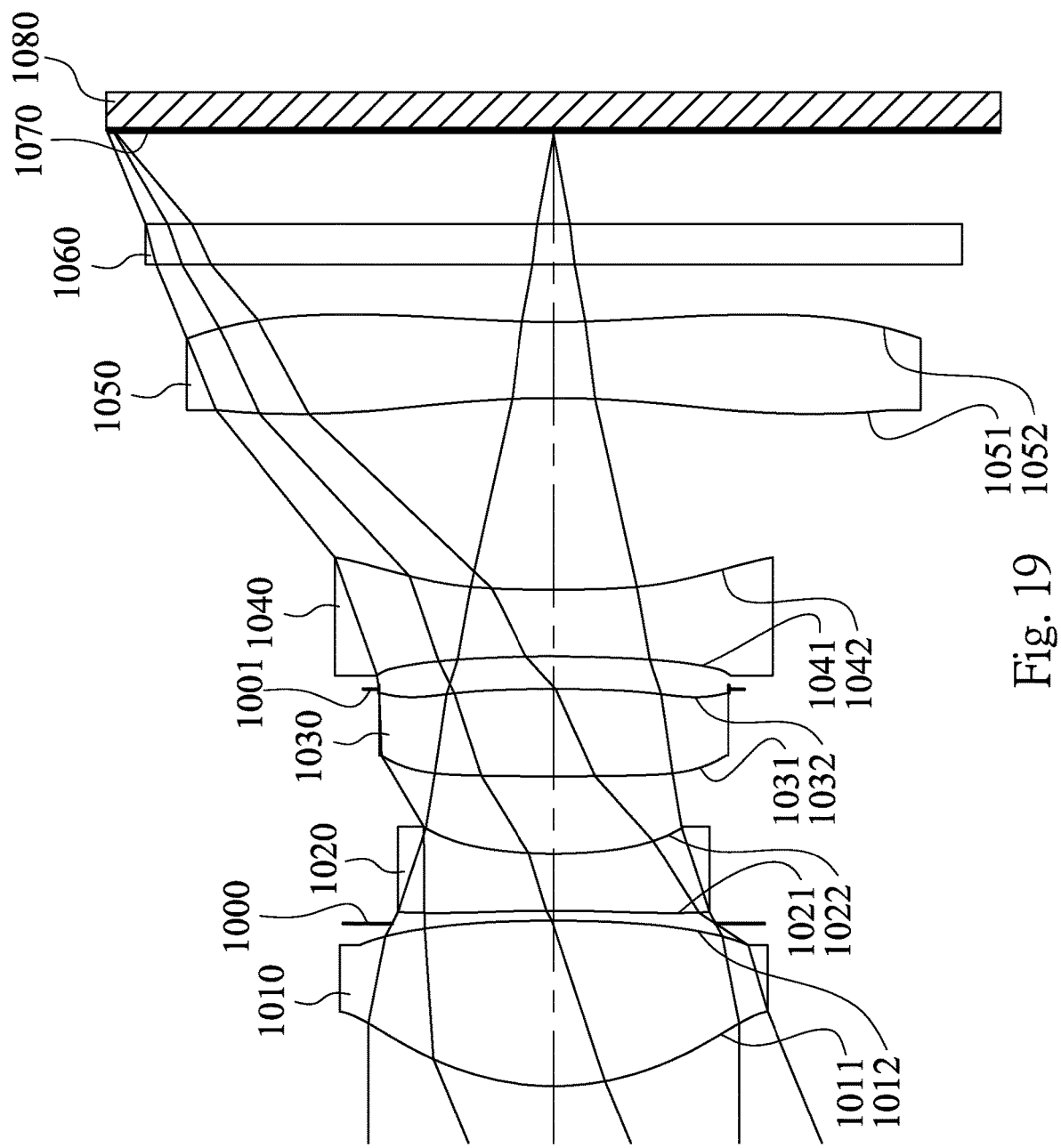
FIG. 19 is a schematic view of an image capturing device according to the 10th embodiment of the present disclosure.
Figure 20:
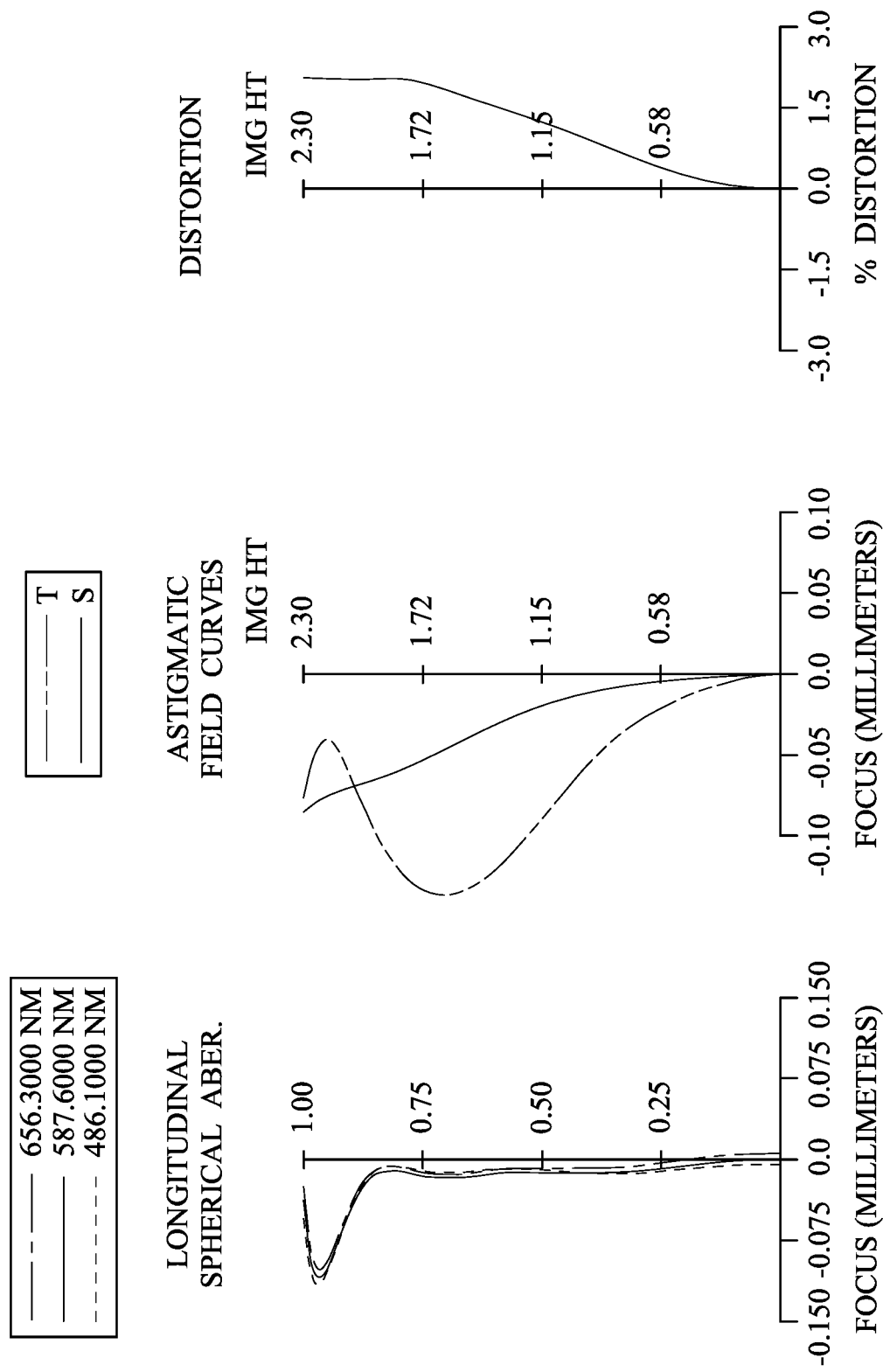
FIG. 20 shows spherical aberration curves, astigmatic field curves and a distortion curve of the image capturing device according to the 10th embodiment.

FIG. 19 is a schematic view of an image capturing device according to the 10th embodiment of the present disclosure. FIG. 20 shows spherical aberration curves, astigmatic field curves and a distortion curve of the image capturing device according to the 10th embodiment. In FIG. 19, the image capturing device includes an image capturing lens assembly (its reference numeral is omitted) and an image sensor 1080. The image capturing lens assembly includes, in order from an object side to an image side, a first lens element 1010, an aperture stop 1000, a second lens element 1020, a third lens element 1030, a stop 1001, a fourth lens element 1040, a fifth lens element 1050, an IR-cut filter 1060 and an image surface 1070, wherein the image sensor 1080 is disposed on the image surface 1070 of the image capturing lens assembly. The image capturing lens assembly has a total of five lens elements (1010-1050) with refractive power. There is an air space between any two of the first lens element 1010, the second lens element 1020, the third lens element 1030, the fourth lens element 1040 and the fifth lens element 1050 that are adjacent to each other.

The first lens element 1010 with positive refractive power has a convex object-side surface 1011 and a convex image-side surface 1012. The first lens element 1010 is made of plastic material and has the object-side surface 1011 and the image-side surface 1012 being both aspheric. Furthermore, the object-side surface 1011 of the first lens element 1010 has at least one inflection point.

The second lens element 1020 with negative refractive power has a concave object-side surface 1021 and a concave image-side surface 1022. The second lens element 1020 is made of plastic material and has the object-side surface 1021 and the image-side surface 1022 being both aspheric. Furthermore, the object-side surface 1021 of the second lens element 1020 has at least one inflection point.

The third lens element 1030 with positive refractive power has a convex object-side surface 1031 and a convex image-side surface 1032. The third lens element 1030 is made of plastic material and has the object-side surface 1031 and the image-side surface 1032 being both aspheric. Furthermore, the image-side surface 1032 of the third lens element 1030 has at least one inflection point.

The fourth lens element 1040 with negative refractive power has a concave object-side surface 1041 and a concave image-side surface 1042. The fourth lens element 1040 is made of plastic material and has the object-side surface 1041 and the image-side surface 1042 being both aspheric. Furthermore, the image-side surface 1042 of fourth lens element 1040 has at least one inflection point.

The fifth lens element 1050 with negative refractive power has a concave object-side surface 1051 and a concave image-side surface 1052. The fifth lens element 1050 is made of plastic material and has the object-side surface 1051 and the image-side surface 1052 being both aspheric. Furthermore, the object-side surface 1051 and the image-side surface 1052 of the fifth lens element 1050 both have at least one inflection point.

Moreover, the refractive power of the first lens element 1010 is stronger than the refractive power of the second lens element 1020, the third lens element 1030, the fourth lens element 1040 and the fifth lens element 1050.

The IR-cut filter 1060 is made of glass material and disposed between the fifth lens element 1050 and the image surface 1070, and will not affect a focal length of the image capturing lens assembly.

The detailed optical data of the 10th embodiment are shown in Table 19 and the aspheric surface data are shown in Table 20 below.

TABLE 19

10th Embodiment
f = 5.45 mm, Fno = 2.82, HFOV = 22.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.451 | ASP | 0.862 | Plastic | 1.544 | 55.9 | 2.33 |
| 2 | | −7.892 | ASP | −0.016 | | | | |
| 3 | Ape. Stop | Plano | | 0.066 | | | | |
| 4 | Lens 2 | −11.463 | ASP | 0.300 | Plastic | 1.639 | 23.5 | −3.30 |
| 5 | | 2.606 | ASP | 0.403 | | | | |
| 6 | Lens 3 | 14.458 | ASP | 0.455 | Plastic | 1.639 | 23.5 | 11.31 |
| 7 | | −14.275 | ASP | 0.000 | | | | |
| 8 | Stop | Plano | | 0.171 | | | | |
| 9 | Lens 4 | −8.933 | ASP | 0.350 | Plastic | 1.544 | 55.9 | −10.48 |
| 10 | | 15.979 | ASP | 0.997 | | | | |
| 11 | Lens 5 | −5.533 | ASP | 0.400 | Plastic | 1.535 | 55.7 | −5.22 |
| 12 | | 5.790 | ASP | 0.300 | | | | |
| 13 | IR-cut filter | Plano | | 0.210 | Glass | 1.517 | 64.2 | — |
| 14 | | Plano | | 0.487 | | | | |
| 15 | Image | Plano | | — | | | | |

Note:
Reference wavelength is 587.6 nm (d-line).
The effective radius of the surface 8 is 0.911 mm.

TABLE 20

Aspheric Coefficients

| Surface # | 1 | 2 | 4 | 5 | 6 |
|---|---|---|---|---|---|
| k= | −6.1050E+00 | 9.6382E+00 | 7.4988E+01 | 4.2624E+00 | −9.6336E+00 |
| A4= | 2.4272E−01 | −1.0470E−01 | −3.0103E−02 | 1.1592E−01 | −9.3674E−02 |
| A6= | −2.5071E−01 | 1.2093E−01 | 1.5793E−01 | 6.2025E−02 | 3.4450E−01 |
| A8= | 2.4592E−01 | −3.7416E−02 | 6.1529E−01 | 1.2814E+00 | −3.5136E−01 |
| A10= | −1.9648E−01 | −8.0927E−02 | −2.5474E+00 | −5.0702E+00 | 7.4918E−01 |
| A12= | 9.0929E−02 | 5.3253E−02 | 3.5335E+00 | 9.2247E+00 | −5.2668E−01 |
| A14= | −2.8597E−02 | −7.7552E−03 | −1.7448E+00 | −6.2975E+00 | |

| Surface # | 7 | 9 | 10 | 11 | 12 |
|---|---|---|---|---|---|
| k= | 2.7452E+01 | −3.3305E+00 | −5.2779E+00 | −8.9331E+01 | −7.5487E+01 |
| A4= | −4.0353E−01 | −2.0991E−01 | 2.1711E−01 | −6.1319E−02 | −2.5083E−02 |
| A6= | 1.4771E+00 | 1.1906E+00 | 1.7701E−01 | 8.6926E−02 | −8.4826E−03 |
| A8= | −3.5615E+00 | −2.7711E+00 | −9.5283E−01 | −4.3518E−02 | 1.6544E−02 |
| A10= | 4.9269E+00 | 1.7196E+00 | 1.1913E+00 | 9.6963E−03 | −8.7640E−03 |
| A12= | −2.4719E+00 | 1.6700E+00 | −6.7123E−01 | −6.1726E−04 | 1.9603E−03 |
| A14= | | −1.8097E+00 | 1.4481E−01 | −4.9237E−05 | −1.6121E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table as the following values and satisfy the following conditions:

| 10th Embodiment | | | |
|---|---|---|---|
| f [mm] | 5.45 | f4/f5 | 2.01 |
| Fno | 2.82 | f12/f45 | −1.44 |
| HFOV [deg.] | 22.6 | (f/R1) − (f/R2) + ((f × CT1)/(R1 × R2)) | 4.03 |

-continued

| 10th Embodiment | | | |
|---|---|---|---|
| Nmax | 1.639 | tan (2 × HFOV) | 1.00 |
| V4 + V5 | 111.6 | SD/TD | 0.79 |
| T34/T45 | 0.17 | f/ImgH | 2.37 |
| f/R1 | 3.75 | EPD/ImgH | 0.84 |
| (R1 + R2)/(R1 − R2) | −0.69 | TL [mm] | 4.98 |
| (R8 + R9)/(R8 − R9) | 0.49 | TL/f | 0.92 |
| f1/f4 | −0.22 | TL/ImgH | 2.17 |

Furthermore, as shown in Table 19, the third lens element 1030 has positive refractive power, and the Abbe number thereof is less than 30.

Moreover, as shown in Table 19, when an axial distance between the first lens element 1010 and the second lens element 1020 is T12, an axial distance between the second lens element 1020 and the third lens element 1030 is T23, an axial distance between the third lens element 1030 and the fourth lens element 1040 is T34, and an axial distance between the fourth lens element 1040 and the fifth lens element 1050 is T45, T45 is greater than T12, T23 and T34.

11th Embodiment

Figure 21:
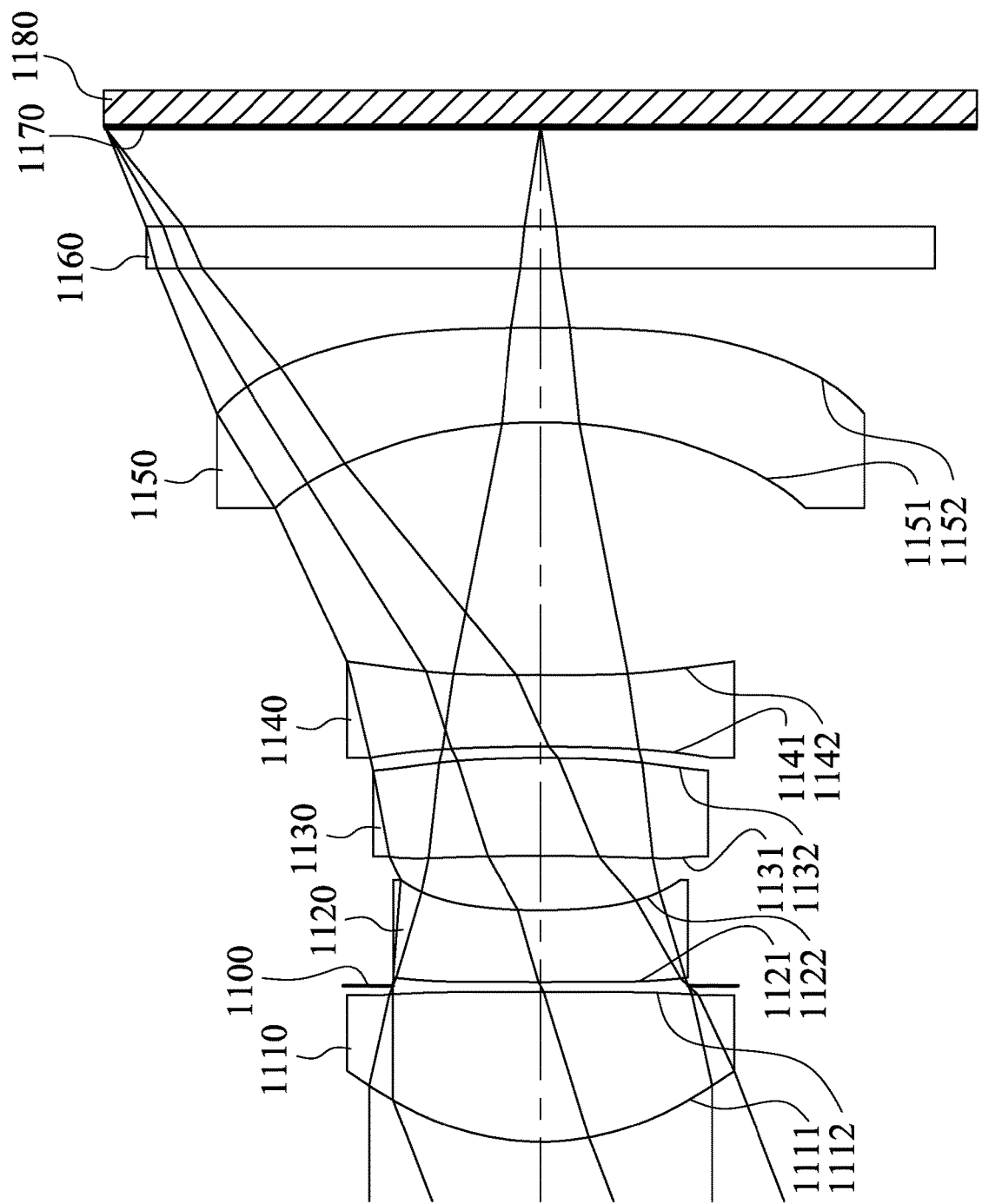
FIG. 21 is a schematic view of an image capturing device according to the 11th embodiment of the present disclosure.
Figure 22:
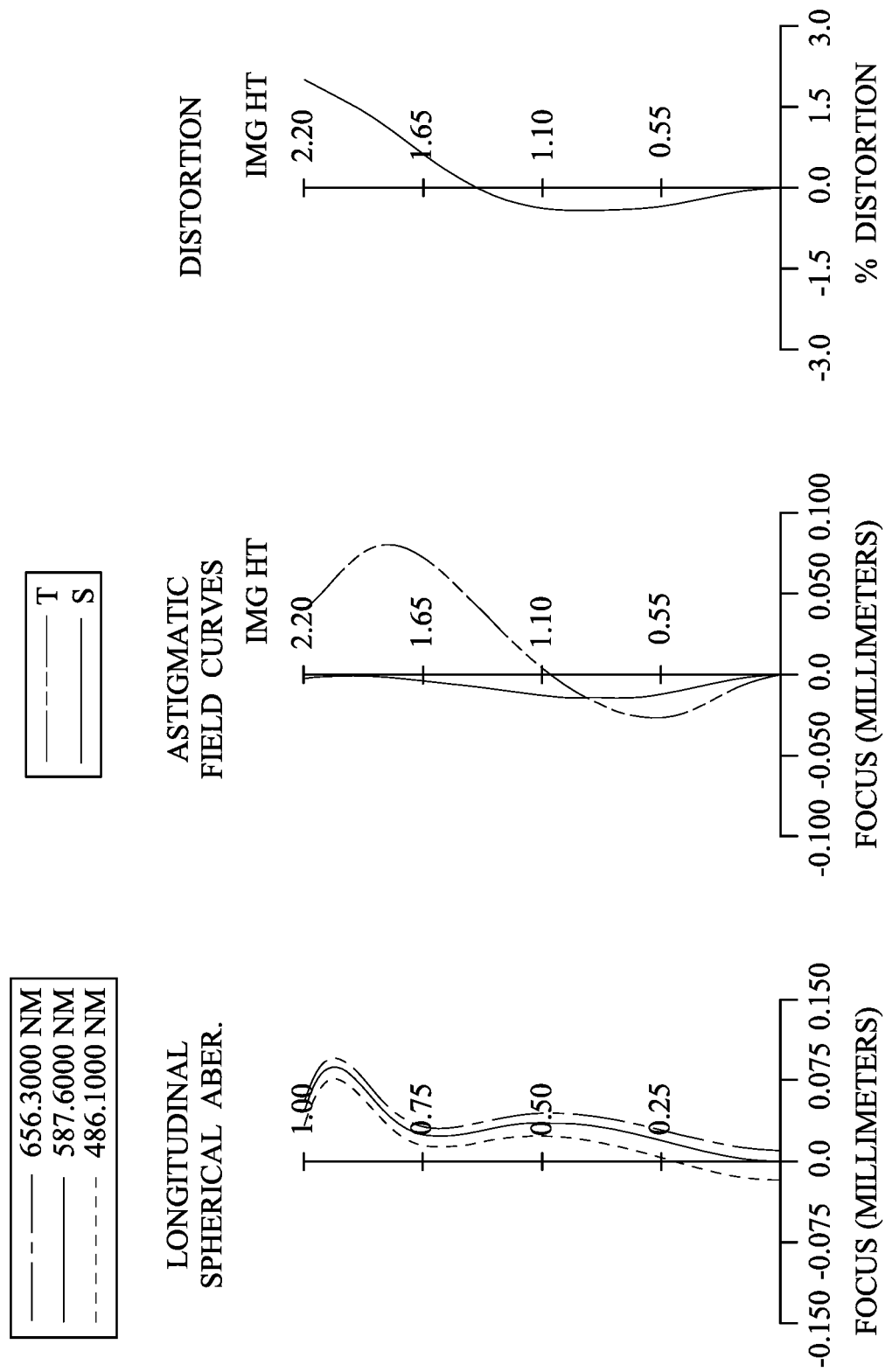
FIG. 22 shows spherical aberration curves, astigmatic field curves and a distortion curve of the image capturing device according to the 11th embodiment.

FIG. 21 is a schematic view of an image capturing device according to the 11th embodiment of the present disclosure. FIG. 22 shows spherical aberration curves, astigmatic field curves and a distortion curve of the image capturing device according to the 11th embodiment. In FIG. 21, the image capturing device includes an image capturing lens assembly (its reference numeral is omitted) and an image sensor 1180. The image capturing lens assembly includes, in order from an object side to an image side, a first lens element 1110, an aperture stop 1100, a second lens element 1120, a third lens element 1130, a fourth lens element 1140, a fifth lens element 1150, an IR-cut filter 1160 and an image surface 1170, wherein the image sensor 1180 is disposed on the image surface 1170 of the image capturing lens assembly. The image capturing lens assembly has a total of five lens elements (1110-1150) with refractive power. There is an air space between any two of the first lens element 1110, the second lens element 1120, the third lens element 1130, the fourth lens element 1140 and the fifth lens element 1150 that are adjacent to each other.

The first lens element 1110 with positive refractive power has a convex object-side surface 1111 and a concave image-side surface 1112. The first lens element 1110 is made of plastic material and has the object-side surface 1111 and the image-side surface 1112 being both aspheric. Furthermore, the object-side surface 1111 and the image-side surface 1112 of the first lens element 1110 both have at least one inflection point.

The second lens element 1120 with negative refractive power has a convex object-side surface 1121 and a concave image-side surface 1122. The second lens element 1120 is made of plastic material and has the object-side surface 1121 and the image-side surface 1122 being both aspheric.

The third lens element 1130 with positive refractive power has a concave object-side surface 1131 and a convex image-side surface 1132. The third lens element 1130 is made of plastic material and has the object-side surface 1131 and the image-side surface 1132 being both aspheric. Furthermore, the object-side surface 1131 of the third lens element 1130 has at least one inflection point.

The fourth lens element 1140 with negative refractive power has a concave object-side surface 1141 and a concave image-side surface 1142. The fourth lens element 1140 is made of plastic material and has the object-side surface 1141 and the image-side surface 1142 being both aspheric. Furthermore, the image-side surface 1142 of fourth lens element 1140 has at least one inflection point.

The fifth lens element 1150 with negative refractive power has a concave object-side surface 1151 and a convex image-side surface 1152. The fifth lens element 1150 is made of plastic material and has the object-side surface 1151 and the image-side surface 1152 being both aspheric.

Moreover, the refractive power of the first lens element 1110 is stronger than the refractive power of the second lens element 1120, the third lens element 1130, the fourth lens element 1140 and the fifth lens element 1150.

The IR-cut filter 1160 is made of glass material and disposed between the fifth lens element 1150 and the image surface 1170, and will not affect a focal length of the image capturing lens assembly.

The detailed optical data of the 11th embodiment are shown in Table 21 and the aspheric surface data are shown in Table 22 below.

TABLE 21

11th Embodiment
f = 5.53 mm, Fno = 3.20, HFOV = 21.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.374 | ASP | 0.758 | Plastic | 1.544 | 55.9 | 2.59 |
| 2 | | 45.995 | ASP | 0.031 | | | | |
| 3 | Ape. Stop | Plano | | 0.019 | | | | |
| 4 | Lens 2 | 82.637 | ASP | 0.361 | Plastic | 1.640 | 23.3 | −4.66 |
| 5 | | 2.876 | ASP | 0.277 | | | | |
| 6 | Lens 3 | −26.613 | ASP | 0.494 | Plastic | 1.639 | 23.5 | 30.31 |
| 7 | | −11.291 | ASP | 0.059 | | | | |
| 8 | Lens 4 | −9.114 | ASP | 0.359 | Plastic | 1.514 | 56.8 | −16.07 |
| 9 | | 88.675 | ASP | 1.278 | | | | |
| 10 | Lens 5 | −2.757 | ASP | 0.479 | Plastic | 1.535 | 55.7 | −5.85 |
| 11 | | −24.528 | ASP | 0.300 | | | | |
| 12 | IR-cut filter | Plano | | 0.210 | Glass | 1.517 | 64.2 | — |
| 13 | | Plano | | 0.502 | | | | |
| 14 | Image | Plano | | — | | | | |

Note:
Reference wavelength is 587.6 nm (d-line).

TABLE 22

Aspheric Coefficients

| Surface # | 1 | 2 | 4 | 5 | 6 |
|---|---|---|---|---|---|
| k= | −5.7654E+00 | −3.5082E+01 | 1.0254E+01 | −2.3143E−01 | 4.5106E+01 |
| A4= | 2.5795E−01 | −1.0447E−01 | −1.8040E−02 | 1.3401E−01 | −1.4119E−01 |
| A6= | −2.4849E−01 | 1.2135E−01 | 1.5924E−01 | 9.1214E−02 | 3.1697E−01 |
| A8= | 2.4507E−01 | −3.7799E−02 | 6.0597E−01 | 1.3194E+00 | −3.2851E−01 |
| A10= | −1.9675E−01 | −8.4338E−02 | −2.5529E+00 | −5.0213E+00 | 7.7854E−01 |
| A12= | 9.1014E−02 | 4.3908E−02 | 3.5472E+00 | 9.3781E+00 | −5.2973E−01 |
| A14= | −2.7595E−02 | −5.5258E−03 | −1.7504E+00 | −6.3257E+00 | |

| Surface # | 7 | 8 | 9 | 10 | 11 |
|---|---|---|---|---|---|
| k= | −1.7476E+00 | −3.4179E+01 | 9.0000E+01 | −3.1616E+01 | −9.9922E−01 |
| A4= | −3.7925E−01 | −1.8349E−01 | 1.5514E−01 | −2.1533E−01 | −9.7426E−02 |
| A6= | 1.4551E+00 | 1.1412E+00 | 1.8665E−01 | 1.6816E−01 | 2.4235E−02 |
| A8= | −3.6285E+00 | −2.7400E+00 | −9.4354E−01 | −5.5603E−02 | 1.2008E−02 |
| A10= | 4.8626E+00 | 1.7387E+00 | 1.1952E+00 | 1.2342E−03 | −9.8865E−03 |
| A12= | −2.4732E+00 | 1.6776E+00 | −6.7143E−01 | −1.8231E−03 | 1.8653E−03 |
| A14= | | −1.8365E+00 | 1.4435E−01 | 1.1800E−03 | −9.5914E−05 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 5.53 | f4/f5 | 2.75 |
| Fno | 3.20 | f12/f45 | −1.05 |
| HFOV [deg.] | 21.1 | (f/R1) − (f/R2) + ((f × CT1)/(R1 × R2)) | 3.97 |
| Nmax | 1.640 | tan (2 × HFOV) | 0.91 |
| V4 + V5 | 112.5 | SD/TD | 0.81 |
| T34/T45 | 0.05 | f/ImgH | 2.52 |
| f/R1 | 4.03 | EPD/ImgH | 0.79 |
| (R1 + R2)/(R1 − R2) | −1.06 | TL [mm] | 5.13 |
| (R8 + R9)/(R8 − R9) | 0.94 | TL/f | 0.93 |
| f1/f4 | −0.16 | TL/ImgH | 2.33 |

Furthermore, as shown in Table 21, the third lens element 1130 has positive refractive power, and the Abbe number thereof is less than 30.

Moreover, as shown in Table 21, when an axial distance between the first lens element 1110 and the second lens element 1120 is T12, an axial distance between the second lens element 1120 and the third lens element 1130 is T23, an axial distance between the third lens element 1130 and the fourth lens element 1140 is T34, and an axial distance between the fourth lens element 1140 and the fifth lens element 1150 is T45, T45 is greater than T12, T23 and T34.

12th Embodiment

Figure 23:
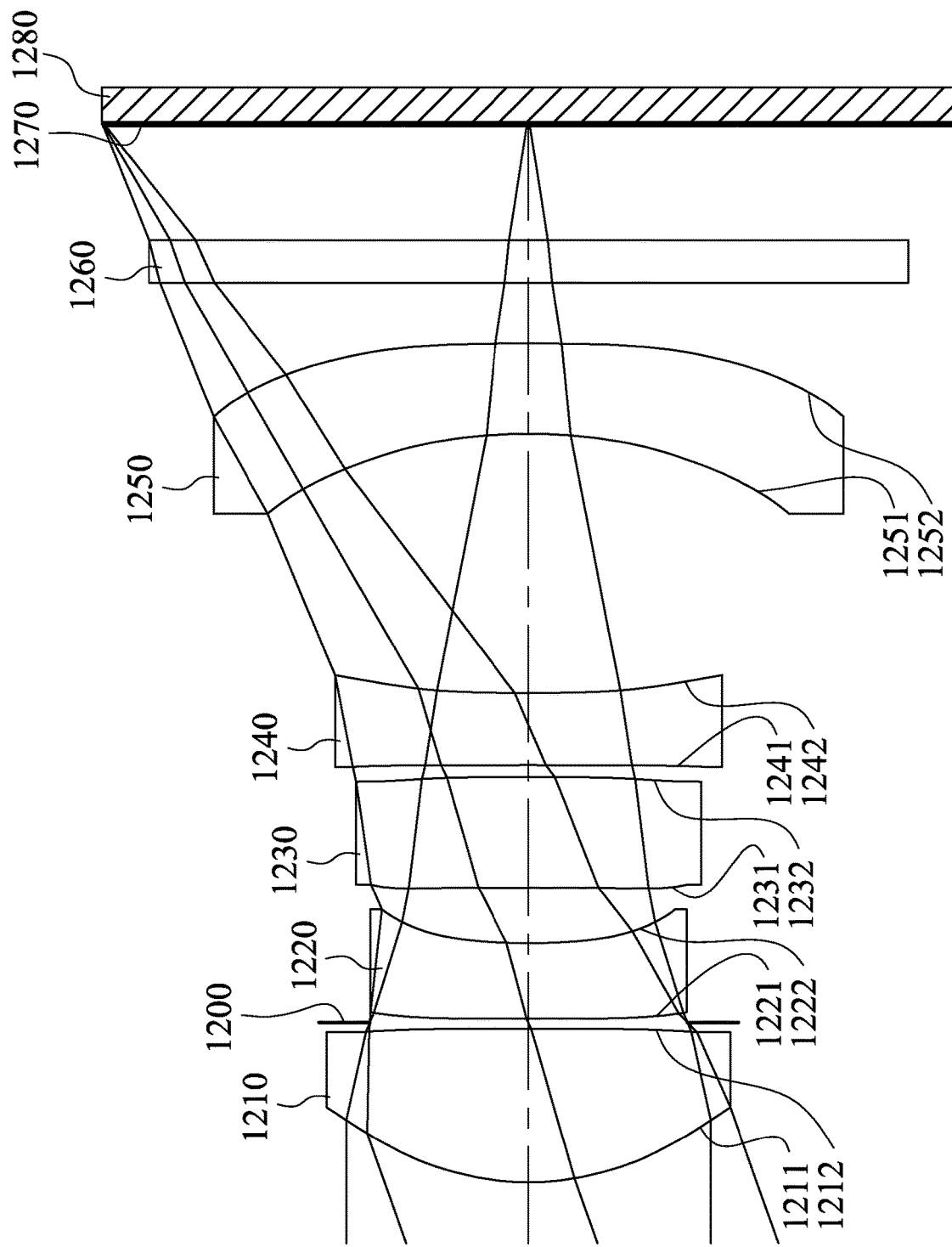
FIG. 23 is a schematic view of an image capturing device according to the 12th embodiment of the present disclosure.
Figure 24:
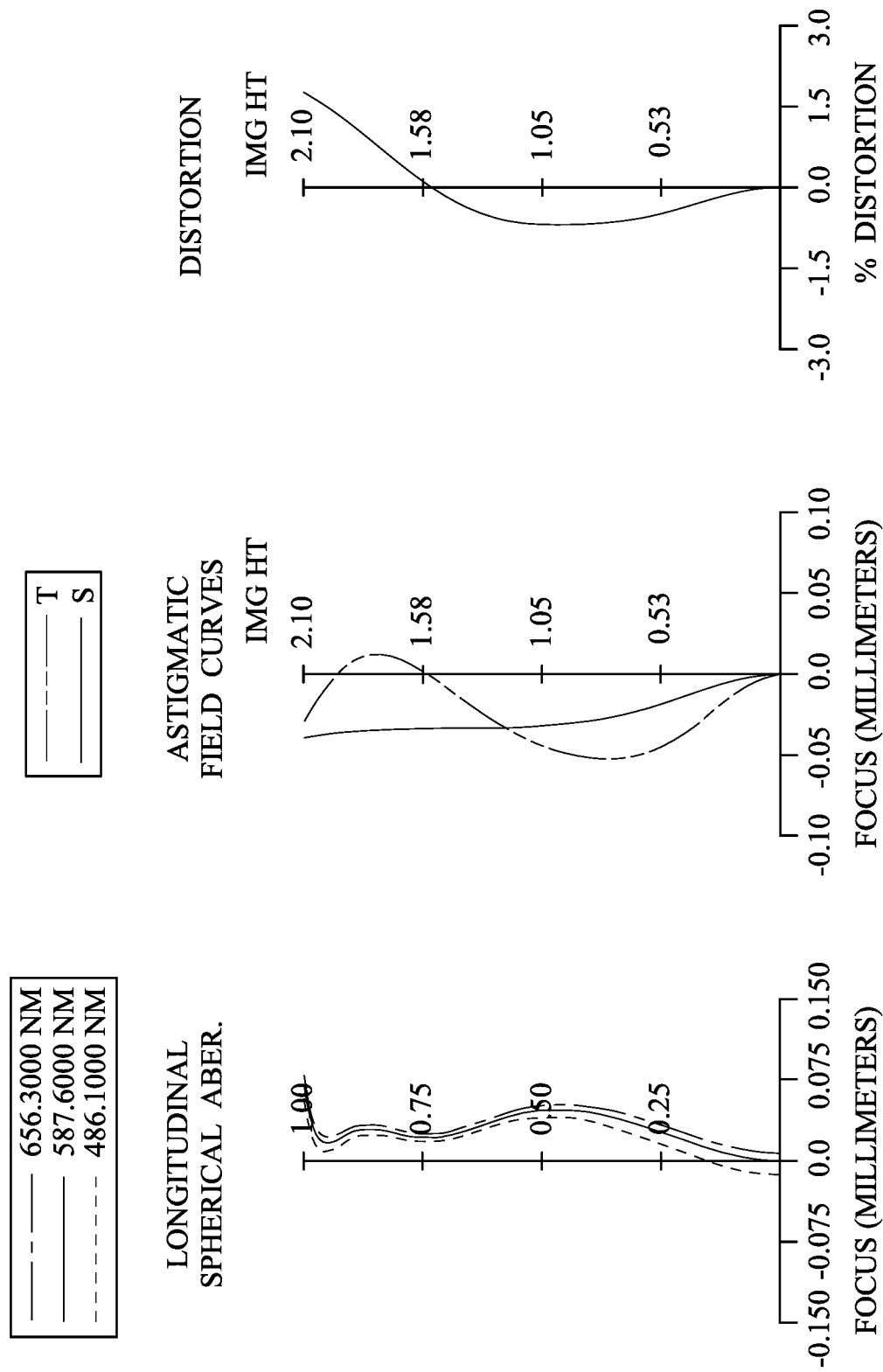
FIG. 24 shows spherical aberration curves, astigmatic field curves and a distortion curve of the image capturing device according to the 12th embodiment.

FIG. 23 is a schematic view of an image capturing device according to the 12th embodiment of the present disclosure. FIG. 24 shows spherical aberration curves, astigmatic field curves and a distortion curve of the image capturing device according to the 12th embodiment. In FIG. 23, the image capturing device includes an image capturing lens assembly (its reference numeral is omitted) and an image sensor 1280. The image capturing lens assembly includes, in order from an object side to an image side, a first lens element 1210, an aperture stop 1200, a second lens element 1220, a third lens element 1230, a fourth lens element 1240, a fifth lens element 1250, an IR-cut filter 1260 and an image surface 1270, wherein the image sensor 1280 is disposed on the image surface 1270 of the image capturing lens assembly. The image capturing lens assembly has a total of five lens elements (1210-1250) with refractive power. There is an air space between any two of the first lens element 1210, the second lens element 1220, the third lens element 1230, the fourth lens element 1240 and the fifth lens element 1250 that are adjacent to each other.

The first lens element 1210 with positive refractive power has a convex object-side surface 1211 and a concave image-side surface 1212. The first lens element 1210 is made of plastic material and has the object-side surface 1211 and the image-side surface 1212 being both aspheric. Furthermore, the object-side surface 1211 and the image-side surface 1212 of the first lens element 1210 both have at least one inflection point.

The second lens element 1220 with negative refractive power has a convex object-side surface 1221 and a concave image-side surface 1222. The second lens element 1220 is made of plastic material and has the object-side surface 1221 and the image-side surface 1222 being both aspheric.

The third lens element 1230 with negative refractive power has a convex object-side surface 1231 and a concave image-side surface 1232. The third lens element 1230 is made of plastic material and has the object-side surface 1231 and the image-side surface 1232 being both aspheric. Furthermore, the object-side surface 1231 and the image-side surface 1232 of the third lens element 1230 both have at least one inflection point.

The fourth lens element 1240 with negative refractive power has a concave object-side surface 1241 and a concave image-side surface 1242. The fourth lens element 1240 is made of plastic material and has the object-side surface 1241 and the image-side surface 1242 being both aspheric. Furthermore, the object-side surface 1241 and the image-side surface 1242 of fourth lens element 1240 both have at least one inflection point.

The fifth lens element 1250 with negative refractive power has a concave object-side surface 1251 and a convex image-side surface 1252. The fifth lens element 1250 is made of plastic material and has the object-side surface 1251 and the image-side surface 1252 being both aspheric.

Moreover, the refractive power of the first lens element 1210 is stronger than the refractive power of the second lens element 1220, the third lens element 1230, the fourth lens element 1240 and the fifth lens element 1250.

The IR-cut filter 1260 is made of glass material and disposed between the fifth lens element 1250 and the image surface 1270, and will not affect a focal length of the image capturing lens assembly.

The detailed optical data of the 12th embodiment are shown in Table 23 and the aspheric surface data are shown in Table 24 below.

TABLE 23

12th Embodiment
f = 5.75 mm, Fno = 3.20, HFOV = 19.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.373 | ASP | 0.758 | Plastic | 1.535 | 55.7 | 2.65 |
| 2 | | 35.573 | ASP | 0.031 | | | | |
| 3 | Ape. Stop | Plano | | 0.019 | | | | |
| 4 | Lens 2 | 51.756 | ASP | 0.371 | Plastic | 1.640 | 23.3 | −4.75 |
| 5 | | 2.861 | ASP | 0.277 | | | | |
| 6 | Lens 3 | 113.987 | ASP | 0.545 | Plastic | 1.639 | 23.5 | −200.79 |
| 7 | | 60.249 | ASP | 0.059 | | | | |
| 8 | Lens 4 | −207.683 | ASP | 0.355 | Plastic | 1.514 | 56.8 | −32.76 |
| 9 | | 18.321 | ASP | 1.279 | | | | |
| 10 | Lens 5 | −2.750 | ASP | 0.447 | Plastic | 1.535 | 55.7 | −5.85 |
| 11 | | −23.903 | ASP | 0.300 | | | | |
| 12 | IR-cut filter | Plano | | 0.210 | Glass | 1.517 | 64.2 | — |
| 13 | | Plano | | 0.573 | | | | |
| 14 | Image | Plano | | — | | | | |

Note:
Reference wavelength is 587.6 nm (d-line).

TABLE 24

Aspheric Coefficients

| Surface # | 1 | 2 | 4 | 5 | 6 |
|---|---|---|---|---|---|
| k= | −5.7629E+00 | −2.5124E+01 | 7.4069E+01 | −3.8162E−01 | 4.2135E+01 |
| A4= | 2.5797E−01 | −1.0445E−01 | −1.8005E−02 | 1.3437E−01 | −1.4116E−01 |
| A6= | −2.4842E−01 | 1.2139E−01 | 1.5921E−01 | 9.1286E−02 | 3.1641E−01 |
| A8= | 2.4506E−01 | −3.7721E−02 | 6.0584E−01 | 1.3196E+00 | −3.2858E−01 |
| A10= | −1.9676E−01 | −5.6591E−02 | −2.5947E+00 | −5.0209E+00 | 7.7844E−01 |
| A12= | 9.0998E−02 | −1.4955E−02 | 3.8029E+00 | 9.3786E+00 | −5.2987E−01 |
| A14= | −2.7615E−02 | 3.0143E−02 | −2.0394E+00 | −6.3249E+00 | |

| Surface # | 7 | 8 | 9 | 10 | 11 |
|---|---|---|---|---|---|
| k= | −8.5557E−01 | −3.5909E+01 | 8.9505E+01 | −3.3999E+01 | −8.8137E−01 |
| A4= | −3.7216E−01 | −1.5753E−01 | 1.5497E−01 | −2.1520E−01 | −9.7645E−02 |
| A6= | 1.4544E+00 | 1.1407E+00 | 1.8664E−01 | 1.6360E−01 | 2.4152E−02 |
| A8= | −3.6284E+00 | −2.7407E+00 | −9.4356E−01 | −5.4648E−02 | 1.1993E−02 |
| A10= | 4.8627E+00 | 1.7384E+00 | 1.1951E+00 | 1.2459E−03 | −9.9641E−03 |
| A12= | −2.4732E+00 | 1.6774E+00 | −6.7148E−01 | −1.8169E−03 | 1.8807E−03 |
| A14= | | −1.8366E+00 | 1.4429E−01 | 1.1843E−03 | −9.6556E−05 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 5.75 | f4/f5 | 5.60 |
| Fno | 3.20 | f12/f45 | −0.90 |
| HFOV [deg.] | 19.6 | (f/R1) − (f/R2) + ((f × CT1)/(R1 × R2)) | 4.12 |
| Nmax | 1.640 | tan (2 × HFOV) | 0.82 |
| V4 + V5 | 112.5 | SD/TD | 0.81 |
| T34/T45 | 0.05 | f/ImgH | 2.74 |
| f/R1 | 4.19 | EPD/ImgH | 0.86 |
| (R1 + R2)/(R1 − R2) | −1.08 | TL [mm] | 5.22 |

-continued

| 12th Embodiment | | | |
|---|---|---|---|
| (R8 + R9)/(R8 − R9) | 0.74 | TL/f | 0.91 |
| f1/f4 | −0.08 | TL/ImgH | 2.49 |

Moreover, as shown in Table 23, when an axial distance between the first lens element 1210 and the second lens element 1220 is T12, an axial distance between the second lens element 1220 and the third lens element 1230 is T23, an axial distance between the third lens element 1230 and the fourth lens element 1240 is T34, and an axial distance between the fourth lens element 1240 and the fifth lens element 1250 is T45, T45 is greater than T12, T23 and T34.

13th Embodiment

Figure 25:
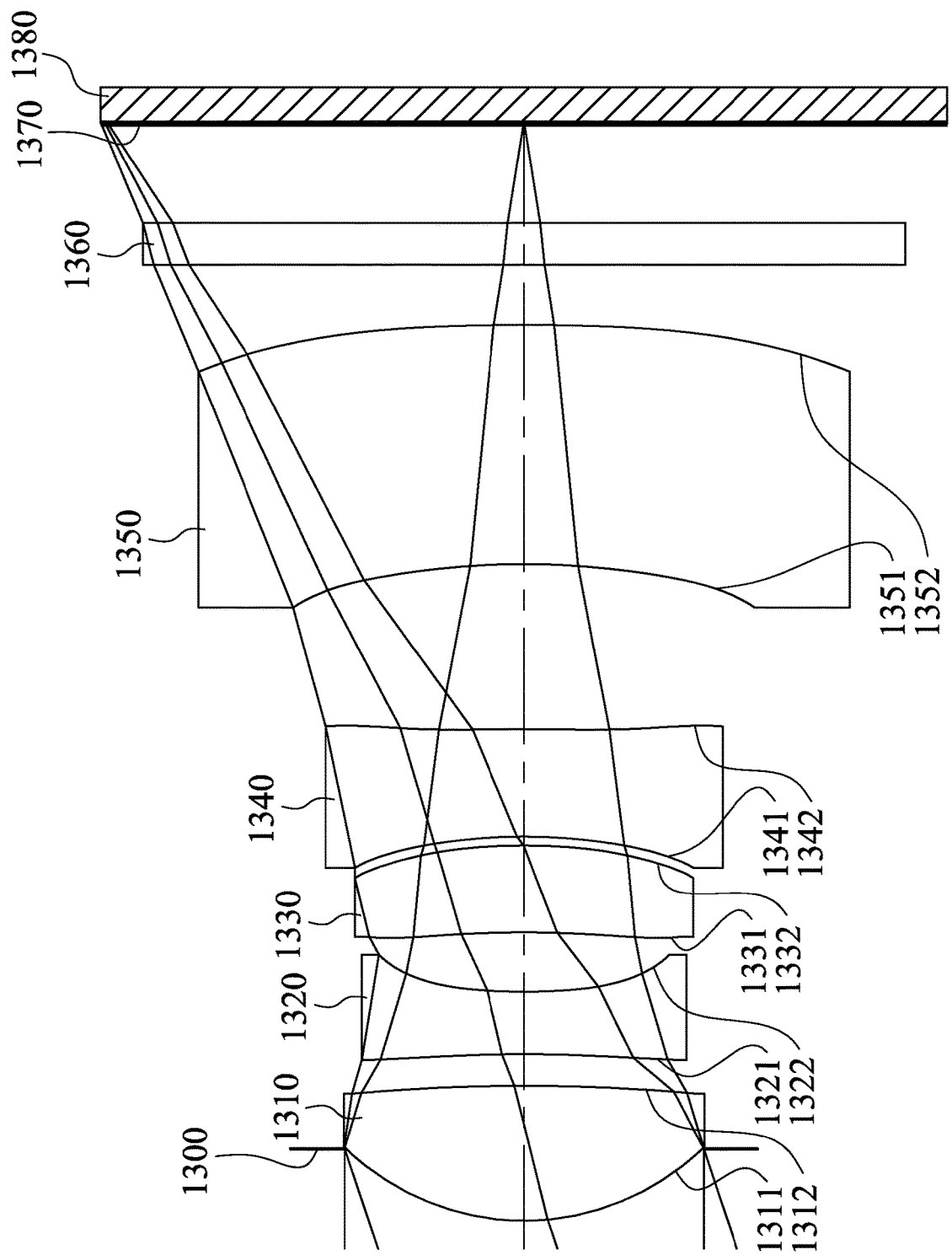
FIG. 25 is a schematic view of an image capturing device according to the 13th embodiment of the present disclosure.
Figure 26:
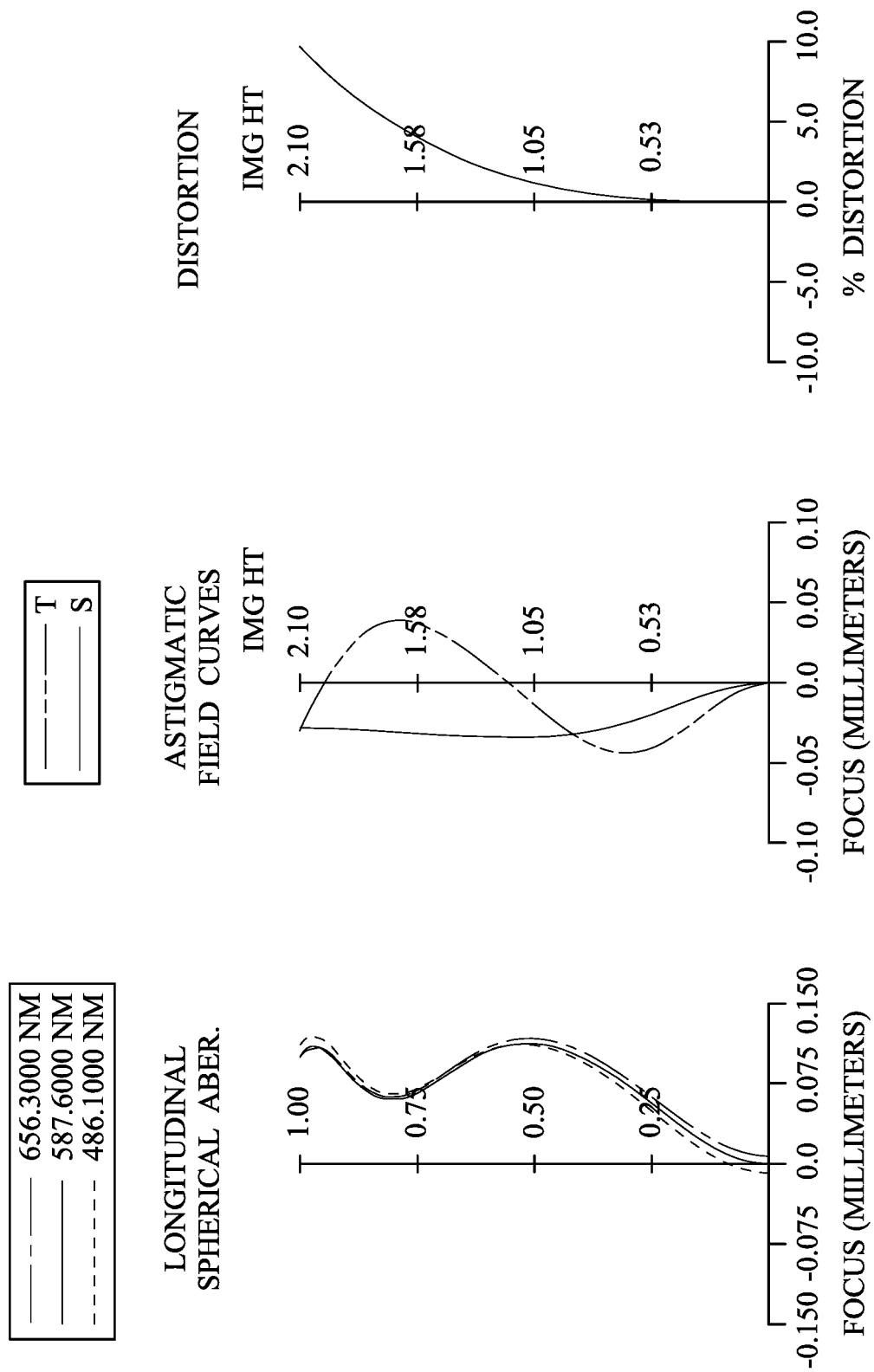
FIG. 26 shows spherical aberration curves, astigmatic field curves and a distortion curve of the image capturing device according to the 13th embodiment.

FIG. 25 is a schematic view of an image capturing device according to the 13th embodiment of the present disclosure. FIG. 26 shows spherical aberration curves, astigmatic field curves and a distortion curve of the image capturing device according to the 13th embodiment. In FIG. 25, the image capturing device includes an image capturing lens assembly (its reference numeral is omitted) and an image sensor 1380. The image capturing lens assembly includes, in order from an object side to an image side, an aperture stop 1300, a first lens element 1310, a second lens element 1320, a third lens element 1330, a fourth lens element 1340, a fifth lens element 1350, an IR-cut filter 1360 and an image surface 1370, wherein the image sensor 1380 is disposed on the image surface 1370 of the image capturing lens assembly. The image capturing lens assembly has a total of five lens elements (1310-1350) with refractive power. There is an air space between any two of the first lens element 1310, the second lens element 1320, the third lens element 1330, the fourth lens element 1340 and the fifth lens element 1350 that are adjacent to each other.

The first lens element 1310 with positive refractive power has a convex object-side surface 1311 and a convex image-side surface 1312. The first lens element 1310 is made of plastic material and has the object-side surface 1311 and the image-side surface 1312 being both aspheric.

The second lens element 1320 with negative refractive power has a concave object-side surface 1321 and a concave image-side surface 1322. The second lens element 1320 is made of plastic material and has the object-side surface 1321 and the image-side surface 1322 being both aspheric. Furthermore, the object-side surface 1321 of the second lens element 1320 has at least one inflection point.

The third lens element 1330 with positive refractive power has a concave object-side surface 1331 and a convex image-side surface 1332. The third lens element 1330 is made of plastic material and has the object-side surface 1331 and the image-side surface 1332 being both aspheric. Furthermore, the object-side surface 1331 of the third lens element 1330 has at least one inflection point.

The fourth lens element 1340 with negative refractive power has a concave object-side surface 1341 and a convex image-side surface 1342. The fourth lens element 1340 is made of plastic material and has the object-side surface 1341 and the image-side surface 1342 being both aspheric. Furthermore, the image-side surface 1342 of the fourth lens element 1340 has at least one inflection point.

The fifth lens element 1350 with negative refractive power has a concave object-side surface 1351 and a convex image-side surface 1352. The fifth lens element 1350 is made of plastic material and has the object-side surface 1351 and the image-side surface 1352 being both aspheric. Furthermore, the image-side surface 1352 of the fifth lens element 1350 has at least one inflection point.

Moreover, the refractive power of the first lens element 1310 is stronger than the refractive power of the second lens element 1320, the third lens element 1330, the fourth lens element 1340 and the fifth lens element 1350.

The IR-cut filter 1360 is made of glass material and disposed between the fifth lens element 1350 and the image surface 1370, and will not affect a focal length of the image capturing lens assembly.

The detailed optical data of the 13th embodiment are shown in Table 25 and the aspheric surface data are shown in Table 26 below.

TABLE 25

13th Embodiment
f = 5.58 mm, Fno = 3.10, HFOV = 18.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.360 | | | | |
| 2 | Lens 1 | 1.268 | ASP | 0.678 | Plastic | 1.530 | 55.8 | 2.24 |
| 3 | | −15.237 | ASP | 0.158 | | | | |
| 4 | Lens 2 | −9.173 | ASP | 0.313 | Plastic | 1.640 | 23.3 | −3.56 |
| 5 | | 3.069 | ASP | 0.298 | | | | |
| 6 | Lens 3 | −5.905 | ASP | 0.436 | Plastic | 1.639 | 23.5 | 14.10 |
| 7 | | −3.670 | ASP | 0.045 | | | | |
| 8 | Lens 4 | −2.933 | ASP | 0.539 | Plastic | 1.530 | 55.8 | −7.71 |
| 9 | | −11.058 | ASP | 0.828 | | | | |
| 10 | Lens 5 | −3.902 | ASP | 1.200 | Plastic | 1.530 | 55.8 | −11.60 |
| 11 | | −11.816 | ASP | 0.300 | | | | |
| 12 | IR-cut filter | Plano | | 0.210 | Glass | 1.517 | 64.2 | — |
| 13 | | Plano | | 0.501 | | | | |
| 14 | Image | Plano | | — | | | | |

Note:
Reference wavelength is 587.6 nm (d-line).

TABLE 26

Aspheric Coefficients

| Surface # | 2 | 3 | 4 | 5 | 6 |
|---|---|---|---|---|---|
| k= | −5.1650E+00 | −4.7861E+01 | 6.3562E+01 | 6.4419E+00 | 1.2368E+01 |
| A4= | 2.9161E−01 | −9.4126E−02 | −6.1392E−02 | 1.6018E−01 | −3.2905E−02 |

TABLE 26-continued

| Aspheric Coefficients | | | | |
|---|---|---|---|---|
| A6= | −2.2545E−01 | 1.3505E−01 | 1.7390E−01 | 5.9750E−02 | 2.2809E−01 |
| A8= | 2.5696E−01 | −3.0325E−02 | 6.0834E−01 | 1.3251E+00 | −3.4222E−01 |
| A10= | −1.9087E−01 | −8.0395E−02 | −2.5832E+00 | −4.9902E+00 | 8.3654E−01 |
| A12= | 9.4414E−02 | 5.1581E−02 | 3.4932E+00 | 9.4169E+00 | −5.8703E−01 |
| A14= | −2.6504E−02 | −6.0818E−03 | −1.6609E+00 | −6.0085E+00 | |

| Surface # | 7 | 8 | 9 | 10 | 11 |
|---|---|---|---|---|---|
| k= | 1.3261E+01 | 5.8492E+00 | 8.7742E+01 | −5.8678E+01 | 2.7878E+01 |
| A4= | −3.3753E−01 | −1.2600E−01 | 1.7575E−01 | −9.7311E−02 | −1.5125E−02 |
| A6= | 1.4567E+00 | 1.1044E+00 | 1.8763E−01 | 1.0669E−01 | −1.1608E−02 |
| A8= | −3.6661E+00 | −2.7296E+00 | −9.5792E−01 | −6.8564E−02 | 1.7306E−02 |
| A10= | 4.8207E+00 | 1.7429E+00 | 1.1904E+00 | −1.3576E−04 | −9.1025E−03 |
| A12= | −2.4979E+00 | 1.6553E+00 | −6.6840E−01 | −3.2452E−04 | 1.9191E−03 |
| A14= | | −1.8980E+00 | 1.4473E−01 | 2.8711E−03 | −1.1383E−04 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 5.58 | f4/f5 | 0.66 |
| Fno | 3.10 | f12/f45 | −0.89 |
| HFOV [deg.] | 18.5 | (f/R1) − (f/R2) + ((f × CT1)/(R1 × R2)) | 4.57 |
| Nmax | 1.640 | tan (2 × HFOV) | 0.75 |
| V4 + V5 | 111.6 | SD/TD | 0.92 |
| T34/T45 | 0.05 | f/ImgH | 2.66 |
| f/R1 | 4.40 | EPD/ImgH | 0.86 |
| (R1 + R2)/(R1 − R2) | −0.85 | TL [mm] | 5.51 |
| (R8 + R9)/(R8 − R9) | 2.09 | TL/f | 0.99 |
| f1/f4 | −0.29 | TL/ImgH | 2.62 |

Furthermore, as shown in Table 25, the third lens element 1330 has positive refractive power, and the Abbe number thereof is less than 30.

Moreover, as shown in Table 25, when an axial distance between the first lens element 1310 and the second lens element 1320 is T12, an axial distance between the second lens element 1320 and the third lens element 1330 is T23, an axial distance between the third lens element 1330 and the fourth lens element 1340 is T34, and an axial distance between the fourth lens element 1340 and the fifth lens element 1350 is T45, T45 is greater than T12, T23 and T34.

14th Embodiment

Figure 29:
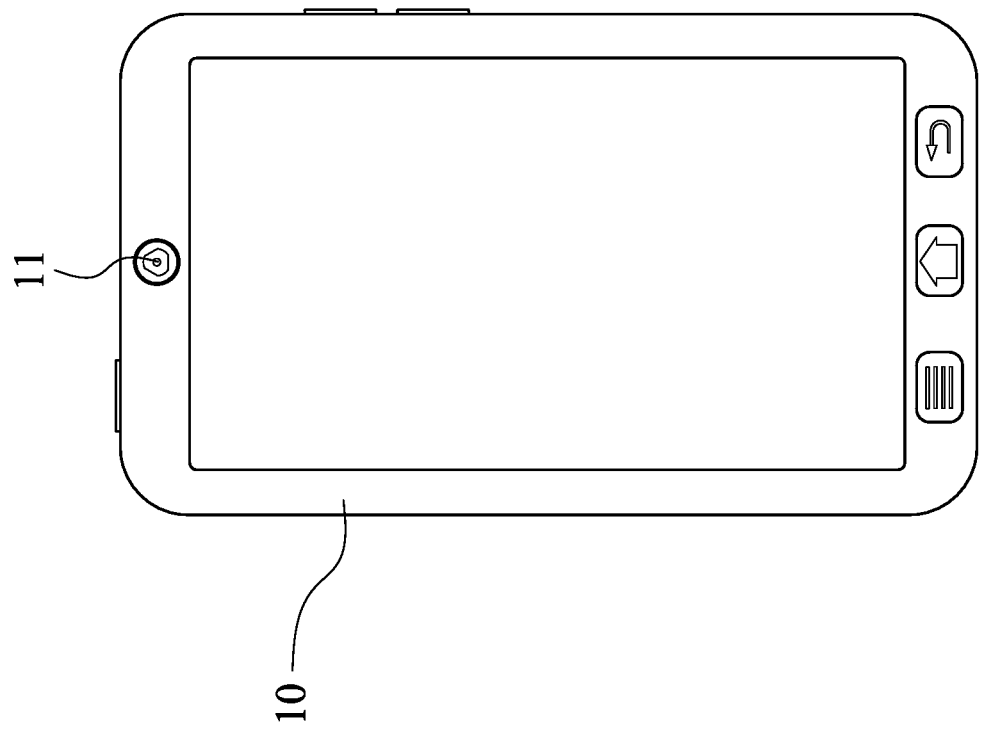
FIG. 29 is a schematic view of an electronic device according to the 14th embodiment of the present disclosure.

FIG. 29 is a schematic view of an electronic device 10 according to the 14th embodiment of the present disclosure. The electronic device 10 of the 14th embodiment is a smart phone, wherein the electronic device 10 includes an image capturing device 11. The image capturing device 11 includes an image capturing lens assembly (not shown herein) according to the present disclosure and an image sensor (not shown herein), wherein the image sensor is disposed on or near an image surface of the image capturing lens assembly. The image capturing device 11 can further include a prism (not shown herein).

15th Embodiment

Figure 30:
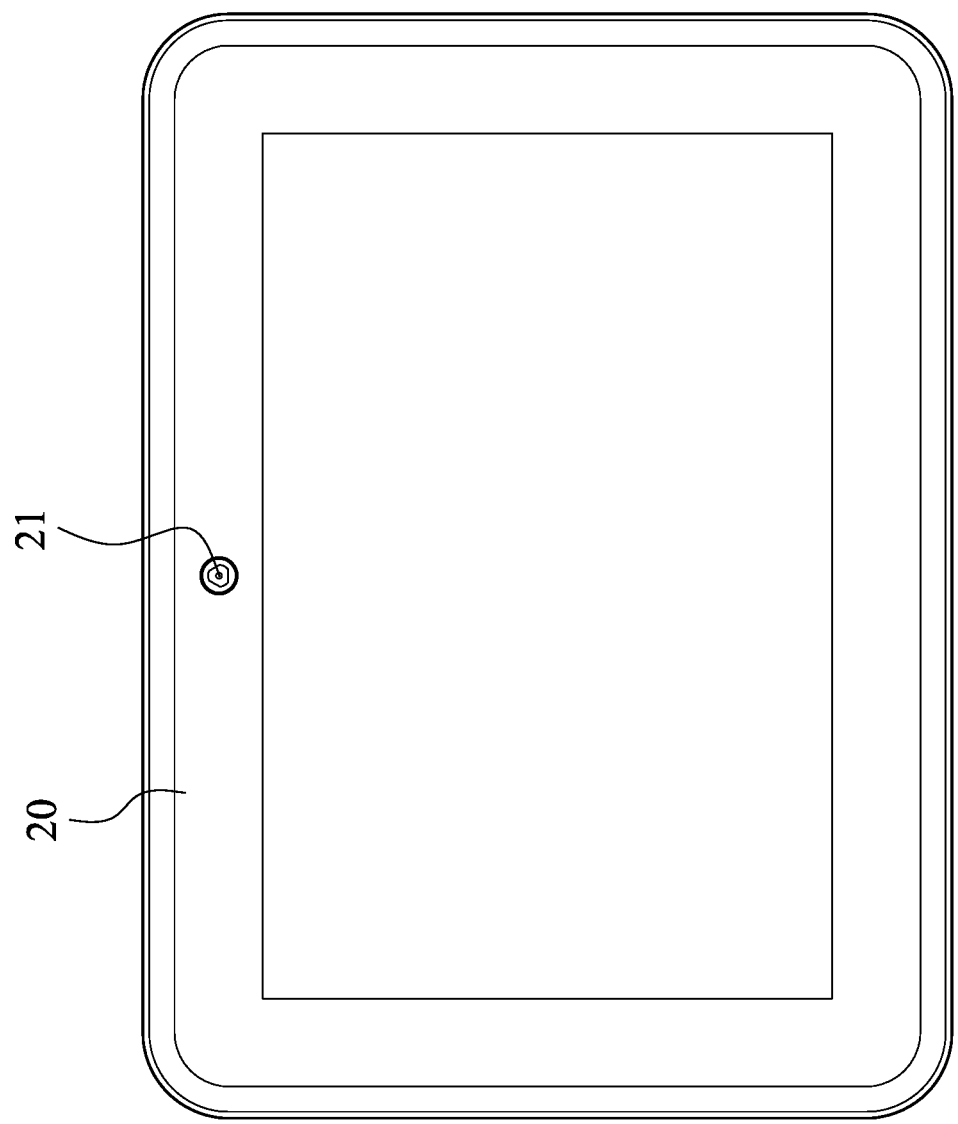
FIG. 30 is a schematic view of an electronic device according to the 15th embodiment of the present disclosure.

FIG. 30 is a schematic view of an electronic device 20 according to the 15th embodiment of the present disclosure. The electronic device 20 of the 15th embodiment is a tablet personal computer, wherein the electronic device 20 includes an image capturing device 21. The image capturing device 21 includes an image capturing lens assembly (not shown herein) according to the present disclosure and an image sensor (not shown herein), wherein the image sensor is disposed on or near an image surface of the image capturing lens assembly. The image capturing device 21 can further include a prism (not shown herein).

16th Embodiment

Figure 31:
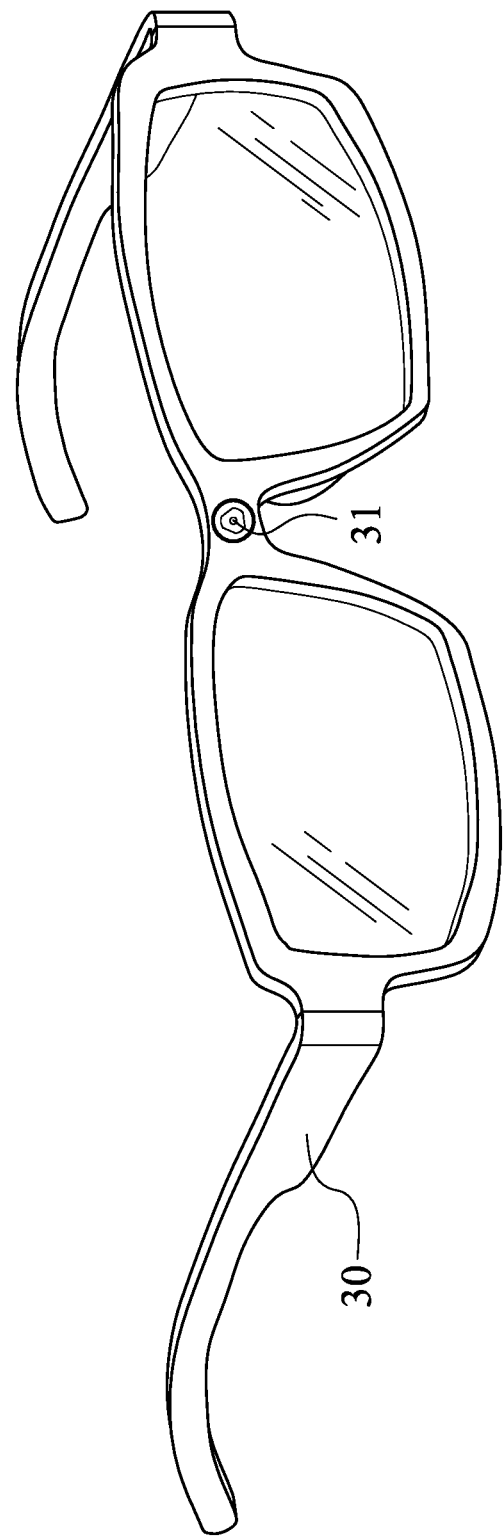
FIG. 31 is a schematic view of an electronic device according to the 16th embodiment of the present disclosure.

FIG. 31 is a schematic view of an electronic device 30 according to the 16th embodiment of the present disclosure. The electronic device 30 of the 16th embodiment is a head-mounted display, wherein the electronic device 30 includes an image capturing device 31. The image capturing device 31 includes an image capturing lens assembly (not shown herein) according to the present disclosure and an image sensor (not shown herein), wherein the image sensor is disposed on or near an image surface of the image capturing lens assembly. The image capturing device 31 can further include a prism (not shown herein).

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image capturing lens assembly comprising five lens elements, the five lens elements being, in order from an object side to an image side:
   a first lens element, a second lens element, a third lens element, a fourth lens element and a fifth lens element;
   each of the five lens elements having an object-side surface facing toward the object side and an image-side surface facing toward the image side;
   wherein the object-side surface of the second lens element is concave in a paraxial region thereof; the object-side surface of the fifth lens element is concave in a paraxial region thereof, the image-side surface of the fifth lens element is convex in a paraxial region thereof, at least one of the object-side surface and the image-side surface of each of the five lens elements is aspheric;

wherein an absolute value of a focal length of the fifth lens element is greater than an absolute value of a focal length of the second lens element; a central thickness of the fifth lens element is greater than a central thickness of the fourth lens element; an absolute value of a curvature radius of the image-side surface of the second lens element is greater than an absolute value of a curvature radius of the object-side surface of the first lens element;

wherein a total number of the lens elements in the image capturing lens assembly is five; the curvature radius of the object-side surface of the first lens element is R1, a curvature radius of the image-side surface of the first lens element is R2, a refractive index of the first lens element is N1, a refractive index of the second lens element is N2, a refractive index of the third lens element is N3, a refractive index of the fourth lens element is N4, a refractive index of the fifth lens element is N5, a maximum of N1, N2, N3, N4 and N5 is Nmax, an entrance pupil diameter of the image capturing lens assembly is EPD, a maximum image height of the image capturing lens assembly is ImgH, and the following relationships are satisfied:

−1.5<(R1+R2)/(R1−R2)<0;
1.50<Nmax<1.70; and
0.7<EPD/ImgH<2.0.

2. The image capturing lens assembly of claim 1, wherein the second lens element has negative refractive power, the object-side surface of the second lens element is concave in a paraxial region thereof; the image-side surface of the fourth lens element is concave in a paraxial region thereof; there is an air gap between each of adjacent lens elements of the five lens elements.

3. The image capturing lens assembly of claim 1, wherein at least one of the five lens elements comprises at least one inflection point; a focal length of the image capturing lens assembly is f, the maximum image height of the image capturing lens assembly is ImgH, and the following relationship is satisfied:

2.3<f/ImgH<6.0.

4. The image capturing lens assembly of claim 1, wherein a curvature radius of the image-side surface of the third lens element and a curvature radius of the image-side surface of the fourth lens element have different signs; a focal length of the first lens element is f1, a focal length of the fourth lens element is f4, and the following relationship is satisfied:

−1.0<f1/f4<0.

5. The image capturing lens assembly of claim 1, wherein a curvature radius of the image-side surface of the fourth lens element is R8, a curvature radius of the object-side surface of the fifth lens element is R9, a focal length of the fourth lens element is f4, a focal length of the fifth lens element is f5, and the following relationships are satisfied:

−0.1<(R8+R9)/(R8−R9); and
0<f4/f5.

6. The image capturing lens assembly of claim 1, wherein the central thickness of the fifth lens element is greater than an axial distance between the second lens element and the third lens element.

7. The image capturing lens assembly of claim 1, wherein an absolute value of a curvature radius of the object-side surface of the third lens element is greater than an absolute value of a curvature radius of the image-side surface of the fourth lens element.

8. The image capturing lens assembly of claim 1, wherein the first lens element has positive refractive power; the fourth lens element has negative refractive power; the fifth lens element has negative refractive power.

9. An image capturing device, comprising:
the image capturing lens assembly of claim 1; and
an image sensor disposed on an image surface of the image capturing lens assembly.

10. An electronic device, comprising:
the image capturing device of claim 9.

11. An image capturing lens assembly comprising five lens elements, the five lens elements being, in order from an object side to an image side:

a first lens element, a second lens element, a third lens element, a fourth lens element and a fifth lens element; each of the five lens elements having an object-side surface facing toward the object side and an image-side surface facing toward the image side;

wherein the second lens element has negative refractive power; the image-side surface of the fifth lens element is convex in a paraxial region thereof;

wherein an absolute value of a focal length of the fifth lens element is greater than an absolute value of a focal length of the second lens element; an absolute value of a curvature radius of the object-side surface of the third lens element is greater than an absolute value of a curvature radius of the image-side surface of the fourth lens element; a curvature radius of the object-side surface of the second lens element and the curvature radius of the image-side surface of the fourth lens element have different signs;

wherein a total number of the lens elements in the image capturing lens assembly is five; a curvature radius of the object-side surface of the first lens element is R1, a curvature radius of the image-side surface of the first lens element is R2, the curvature radius of the image-side surface of the fourth lens element is R8, a curvature radius of the object-side surface of the fifth lens element is R9, a refractive index of the first lens element is N1, a refractive index of the second lens element is N2, a refractive index of the third lens element is N3, a refractive index of the fourth lens element is N4, a refractive index of the fifth lens element is N5, a maximum of N1, N2, N3, N4 and N5 is Nmax, a half of a maximal field of view of the image capturing lens assembly is HFOV, and the following relationships are satisfied:

−1.5<(R1+R2)/(R1−R2)<0;
1.50<Nmax<1.70;
−0.1<(R8+R9)/(R8−R9); and
0.3<tan(2×HFOV)<1.1.

12. The image capturing lens assembly of claim 11, wherein the object-side surface of the first lens element is convex in a paraxial region thereof; the object-side surface of the fifth lens element is concave in a paraxial region thereof; the image-side surface of the fifth lens element is convex in a paraxial region thereof; there is an air gap between each of adjacent lens elements of the five lens elements.

13. The image capturing lens assembly of claim 11, wherein an entrance pupil diameter of the image capturing lens assembly is EPD, a maximum image height of the image capturing lens assembly is ImgH, a focal length of the fourth lens element is f4, the focal length of the fifth lens element is f5, and the following relationships are satisfied:

0.7<EPD/ImgH<2.0; and
0<f4/f5.

14. The image capturing lens assembly of claim 11, wherein at least one of the five lens elements comprises at least one inflection point; an Abbe number of the fourth lens element is V4, an Abbe number of the fifth lens element is V5, the following relationship is satisfied:

$90<V4+V5<130$.

15. The image capturing lens assembly of claim 11, wherein a curvature radius of the image-side surface of the third lens element and the curvature radius of the image-side surface of the fourth lens element have different signs; the absolute value of the curvature radius of the object-side surface of the third lens element is greater than an absolute value of a curvature radius of the image-side surface of the fifth lens element.

16. The image capturing lens assembly of claim 11, further comprising:

an aperture stop disposed on an object side of the fifth lens element; a central thickness of the first lens element is greater than a central thickness of the fourth lens element.

17. The image capturing lens assembly of claim 11, wherein the first lens element has positive refractive power; the fourth lens element has negative refractive power; the fifth lens element has negative refractive power.

18. An image capturing lens assembly comprising five lens elements, the five lens elements being, in order from an object side to an image side:

a first lens element, a second lens element, a third lens element, a fourth lens element and a fifth lens element; each of the five lens elements having an object-side surface facing toward the object side and an image-side surface facing toward the image side;

wherein the image-side surface of the third lens element is convex in a paraxial region thereof; the image-side surface of the fourth lens element is concave in a paraxial region thereof; the object-side surface of the fifth lens element is concave in a paraxial region thereof, the image-side surface of the fifth lens element is convex in a paraxial region thereof; at least one of the object-side surface and the image-side surface of each of the five lens elements is aspheric;

wherein an absolute value of a curvature radius of the object-side surface of the third lens element is greater than an absolute value of a curvature radius of the object-side surface of the second lens element; the absolute value of the curvature radius of the object-side surface of the third lens element is greater than an absolute value of a curvature radius of the image-side surface of the fourth lens element;

wherein a total number of the lens elements in the image capturing lens assembly is five; a curvature radius of the object-side surface of the first lens element is R1, a curvature radius of the image-side surface of the first lens element is R2, an Abbe number of the fourth lens element is V4, an Abbe number of the fifth lens element is V5, and the following relationships are satisfied:

$-1.5<(R1+R2)/(R1-R2)<0$; and $90<V4+V5<130$.

19. The image capturing lens assembly of claim 18, wherein a focal length of the fourth lens element is f4, a focal length of the fifth lens element is f5, and the following relationship is satisfied:

$0<f4/f5$.

20. The image capturing lens assembly of claim 18, wherein the curvature radius of the image-side surface of the fourth lens element is R8, a curvature radius of the object-side surface of the fifth lens element is R9, and the following relationship is satisfied:

$-0.1<(R8+R9)/(R8-R9)$.

21. The image capturing lens assembly of claim 18, wherein a focal length of the image capturing lens assembly is f, a maximum image height of the image capturing lens assembly is ImgH, an entrance pupil diameter of the image capturing lens assembly is EPD, and the following relationships are satisfied:

$2.3<f/ImgH<6.0$; and $0.7<EPD/ImgH<2.0$.

22. The image capturing lens assembly of claim 18, wherein the first lens element has positive refractive power; the fourth lens element has negative refractive power; the fifth lens element has negative refractive power; there is an air gap between each of adjacent lens elements of the five lens elements.

23. An image capturing device, comprising:

the image capturing lens assembly of claim 18;

a prism disposed at an optical path between an object and an image surface of the image capturing lens assembly; and an image sensor disposed on an image surface of the image capturing lens assembly.

24. An image capturing lens assembly comprising five lens elements, the five lens elements being, in order from an object side to an image side:

a first lens element, a second lens element, a third lens element, a fourth lens element and a fifth lens element; each of the five lens elements having an object-side surface facing toward the object side and an image-side surface facing toward the image side;

wherein the object-side surface of the second lens element is concave in a paraxial region thereof; the image-side surface of the fourth lens element is concave in a paraxial region thereof; the object-side surface of the fifth lens element is concave in a paraxial region thereof; at least one of the object-side surface and the image-side surface of each of the five lens elements is aspheric;

wherein the image capturing lens assembly further comprises an aperture stop disposed on an object side of the fifth lens element; an absolute value of a curvature radius of the object-side surface of the third lens element is greater than an absolute value of a curvature radius of the image-side surface of the fourth lens element; the absolute value of the curvature radius of the object-side surface of the third lens element is greater than an absolute value of a curvature radius of the object-side surface of the second lens element;

wherein a total number of the lens elements in the image capturing lens assembly is five; a curvature radius of the object-side surface of the first lens element is R1, a curvature radius of the image-side surface of the first lens element is R2, a focal length of the fourth lens element is f4, a focal length of the fifth lens element is f5, and the following relationships are satisfied:

$-1.5<(R1+R2)/(R1-R2)<0$; and $0<f4/f5$.

25. The image capturing lens assembly of claim 24, wherein the object-side surface of the first lens element is convex in a paraxial region thereof; the second lens element has negative refractive power; there is an air gap between each of adjacent lens elements of the five lens elements.

26. The image capturing lens assembly of claim 24, wherein a focal length of the first lens element is f1, the focal length of the fourth lens element is f4, and the following relationship is satisfied:

$-1.0 < f1/f4 < 0$.

27. The image capturing lens assembly of claim 24, wherein an entrance pupil diameter of the image capturing lens assembly is EPD, a maximum image height of the image capturing lens assembly is ImgH, and the following relationship is satisfied:

$0.7 < EPD/ImgH < 2.0$.

28. The image capturing lens assembly of claim 24, wherein a refractive index of the first lens element is N1, a refractive index of the second lens element is N2, a refractive index of the third lens element is N3, a refractive index of the fourth lens element is N4, a refractive index of the fifth lens element is N5, a maximum of N1, N2, N3, N4 and N5 is Nmax, a focal length of the image capturing lens assembly is f, a maximum image height of the image capturing lens assembly is ImgH, and the following relationships are satisfied:

$1.50 < Nmax < 1.70$; and $2.3 < f/ImgH < 6.0$.

29. The image capturing lens assembly of claim 24, wherein the first lens element has positive refractive power; the fourth lens element has negative refractive power; the fifth lens element has negative refractive power.

* * * * *